United States Patent
Yamagishi

(10) Patent No.: US 9,213,894 B2
(45) Date of Patent: Dec. 15, 2015

(54) IMAGE EVALUATION DEVICE, IMAGE EVALUATION METHOD AND PROGRAM STORAGE MEDIUM

(71) Applicant: FUJIFILM Corporation, Tokyo (JP)

(72) Inventor: Hideki Yamagishi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 120 days.

(21) Appl. No.: 14/036,165

(22) Filed: Sep. 25, 2013

(65) Prior Publication Data

US 2014/0093139 A1    Apr. 3, 2014

(30) Foreign Application Priority Data

Sep. 28, 2012  (JP) ................................ 2012-218710

(51) Int. Cl.
 *G06K 9/00* (2006.01)
 *H04N 1/00* (2006.01)

(52) U.S. Cl.
 CPC ........ *G06K 9/00483* (2013.01); *H04N 1/00005* (2013.01); *H04N 1/0005* (2013.01); *H04N 1/00015* (2013.01); *H04N 1/00034* (2013.01); *H04N 1/00047* (2013.01); *H04N 1/00074* (2013.01)

(58) Field of Classification Search
 CPC .......... G06T 2207/30144; G06T 2207/30168; G06T 2207/30176; G06T 7/0002; G06T 7/001; G06K 15/02
 See application file for complete search history.

(56) References Cited

U.S. PATENT DOCUMENTS

| 2010/0110116 A1* | 5/2010 | Kobayashi | 347/1 |
| 2010/0188714 A1* | 7/2010 | Yamakawa | 358/504 |
| 2010/0290791 A1* | 11/2010 | Sonoda et al. | 399/12 |

(Continued)

FOREIGN PATENT DOCUMENTS

| JP | H09-311030 A | 12/1997 |
| JP | H09-311031 A | 12/1997 |
| JP | 2006-26943 A | 2/2006 |

(Continued)

OTHER PUBLICATIONS

Japanese Office Action dated Aug. 19, 2014, with English Translation thereof.

(Continued)

*Primary Examiner* — Amir Alavi
*Assistant Examiner* — Kenny Cese
(74) *Attorney, Agent, or Firm* — McGinn IP Law Group, PLLC

(57) ABSTRACT

An image evaluation device includes a storage unit that stores sample image data that represent a virtual sample image simulating a sample image included in a sample printout that is recognized as a non-defective printout; a reading unit that reads an inspection object image included in an inspection object printout obtained by printing the sample image on a recording medium by a printing device using image data representing the sample image; an extraction unit that extracts a line defect including a linear pattern formed in a specific direction from the inspection object image represented by inspection object image data, based on a difference value between the sample image data and the inspection object image data; and an evaluation unit that evaluates a visibility of the line defect extracted by the extraction unit.

32 Claims, 35 Drawing Sheets

(56) References Cited

U.S. PATENT DOCUMENTS

2012/0154837 A1\* 6/2012 Yamazaki .................... 358/1.9
2012/0206756 A1\* 8/2012 Nakashio ................... 358/1.14

FOREIGN PATENT DOCUMENTS

| JP | 2006-139777 A | 6/2006 |
| JP | 2007-33247 A | 2/2007 |
| JP | 2007-172512 A | 7/2007 |

OTHER PUBLICATIONS

Peter G. Engeldrum, "Psychometric Scaling: a toolkit for imaging systems development", pp. 8-17., Imcotek Press, Winchester, MA, USA, 2000.

\* cited by examiner

FIG.25

| DIFFERENCE VALUE | SUBJECTIVE LINE DEFECT INTENSITY | THRESHOLD |
|---|---|---|
| $X^1$ | $Y^1$ | $Z^1$ |
| $X^2$ | $Y^2$ | $Z^2$ |
| $X^3$ | $Y^3$ | $Z^3$ |
| ⋮ | ⋮ | ⋮ |

| APPLICATION | CUSTOMER NAME | Job ID | RECEPTION DATE | COST C | DELIVERY DATE D | CONTENT TYPE | TOTAL IMAGE QUALITY | IMAGE QUALITY ATTRIBUTE a | b | c | d | DETERMINATION |
|---|---|---|---|---|---|---|---|---|---|---|---|---|
| PHOTOGRAPH COLLECTION | CUSTOMER 1 | 1 |  | Ca11 | Da11 | p PHOTOGRAPH | Qa11p |  |  |  |  | OK |
|  |  |  |  |  |  | l LETTER, LINE DRAWING | Qa11l |  |  |  |  | OK |
|  |  | 2 |  | Ca12 | Da12 | p PHOTOGRAPH | Qa121p |  |  |  |  | NG |
|  |  |  |  | Ca12 | Da12 | p PHOTOGRAPH | Qa121p |  |  |  |  | OK |
|  |  |  |  | Ca12 | Da12 | l LETTER, LINE DRAWING | Qa122l |  |  |  |  | OK |
|  |  |  |  | .. | .. |  |  |  |  |  |  |  |
|  | CUSTOMER 2 |  |  | Ca21 | Da21 | p PHOTOGRAPH | Qa21 |  |  |  |  | .. |
|  | .. |  |  | .. | .. | i ILLUSTRATION | .. |  |  |  |  | .. |
| CATALOG | CUSTOMER 1 |  |  | Cb11 | Db11 | l LETTER, LINE DRAWING | Qb11 |  |  |  |  | .. |
|  |  |  |  | Cb12 | Db12 | g GRAPH | Qb12 |  |  |  |  | .. |
|  |  |  |  | .. | .. |  | .. |  |  |  |  | .. |
|  | CUSTOMER 3 |  |  | Cb31 | Db31 |  | Qb31 |  |  |  |  | .. |
|  | .. |  |  | .. | .. |  |  |  |  |  |  |  |
| LEAFLET |  |  |  |  |  |  |  |  |  |  |  |  |
| .. |  |  |  |  |  |  |  |  |  |  |  |  |

IMAGE EVALUATION DEVICE, IMAGE EVALUATION METHOD AND PROGRAM STORAGE MEDIUM

CROSS-REFERENCE TO RELATED APPLICATION

This application claims priority under 35 USC 119 from Japanese Patent Application No. 2012-218710 filed on Sep. 28, 2012, the disclosure of which is incorporated by reference herein.

BACKGROUND OF THE INVENTION

1. Technical Field

The present invention relates to an image evaluation device, an image evaluation method, and a program storage medium.

2. Related Art

There is a case in which part of printouts printed by a printing machine are defective printouts. Therefore, an inspection method of determining the quality of a printout is proposed, in which images are obtained by scanning and reading printouts, and determination is made as to whether or not there is an image of defective printouts that cannot be ignored in the read images (for example, see Japanese Patent Application Laid-Open (JP-A) Nos. 2007-033247 and 2006-139777).

JP-A No. 2007-033247 discloses an inspection method of determining image quality by forming a simulation image from a master image through correction factors (e.g., error factors of a reading device or printing processing of a printout) and comparing the simulation image with an object image to be inspected that is obtained by reading.

JP-A No. 2006-139777 discloses a method of detecting a surface non-uniformity in a flat panel display using a visual model. This method includes recognizing a taken image of a test panel and a reference image that is simulated by a background by a difference recognition system, and evaluating the quality of the display using a visual model.

When an image included in a printout is read for the purpose of detection by a device such as a scanner, there is a case in which the obtained image (an image for detection) includes a defect in a line form (hereinafter, referred to a "line defect"). The line defect is caused by, for example, a problem such as a structural problem of the printing machine. Further, most of line defects caused by the problem of the printing machine tend to appear in a line form along a specific direction. The degree of this kind of line defect often exceeds an acceptable range.

However, the methods disclosed in the above documents do not provide quick and accurate determination of whether or not a line defect caused by the structural problem of the printing machine is an inacceptable line defect.

SUMMARY

The present invention has been made in consideration of the above circumstance, and provides an image evaluation device, an image evaluation method, and a program storage medium that may quickly and accurately determine whether or not a printout includes an image having an inacceptable line defect.

A first aspect of the invention is an image evaluation device including: a storage unit that stores sample image data that represent a virtual sample image simulating a sample image included in a sample printout that is recognized as a non-defective printout; a reading unit that reads an inspection object image included in an inspection object printout obtained by printing an image corresponding to the sample image on a recording medium by a printing device using image data representing the image; an extraction unit that extracts a line defect including a linear pattern formed in a specific direction from the inspection object image represented by inspection object image data, based on a difference value between the sample image data and the inspection object image data; and an evaluation unit that evaluates a visibility of the line defect extracted by the extraction unit.

Accordingly, it is possible to quickly and accurately determine whether or not a printout includes an image having an inacceptable line defect as compared to a case in which this configuration is not provided.

In the first aspect, the sample image data may be image data from which an influence of characteristics of the reading unit is eliminated, and the inspection object image data may be image data from which an influence of the characteristics of the reading unit is eliminated.

Accordingly, it is possible to accurately extract a line defect as compared to a case in which this configuration is not provided.

In the first aspect, the sample image data may be image data from which an influence of non-formation factor characteristics, is eliminated, the non-formation factor characteristics may be characteristics of the printing device that are not factors of formation of the line defect, and the inspection object image data may be image data from which an influence of the non-formation factor characteristics is eliminated.

Accordingly, it is possible to more accurately extract a line defect as compared to a case in which this configuration is not provided.

In the first aspect, an influence of at least one of characteristics of the printing device or characteristics of the reading unit may be reflected in the sample image data.

Accordingly, it is possible to accurately extract a line defect as compared to a case in which this configuration is not provided.

In the first aspect, the line defect may be a line defect of which spatial frequencies of human visual characteristics are considered.

Accordingly, it is possible to improve the evaluation accuracy of the visibility of a line defect as compared to a case in which this configuration is not provided.

In the first aspect, the line defect may be a line defect of which a color space of human visual characteristics is considered.

Accordingly, it is possible to improve the evaluation accuracy of the visibility of a line defect as compared to a case in which this configuration is not provided.

In the first aspect, the extraction unit may extract the line defect from a predetermined region of the inspection object image that is represented by the inspection object image data.

Accordingly, it is possible to reduce the load of processing as compared to a case in which this configuration is not provided.

In the first aspect, the predetermined region may be an expected region in which the line defect is expected to be formed.

Accordingly, it is possible to reduce the load of processing while preventing a deterioration of the evaluation accuracy as compared to a case in which this configuration is not provided.

In the first aspect, the predetermined region may correspond to a region of the inspection object image in which a difference value between the inspection object image data and the sample image data exceeds a threshold.

Accordingly, it is possible to reduce the load of the processing while further preventing a deterioration of the evaluation accuracy as compared to a case in which this configuration is not provided.

In the first aspect, the expected region may be determined based on characteristics of at least one of the printing device or the reading unit.

Accordingly, it is possible to accurately extract a line defect that is formed in the specific direction by a simple configuration as compared to a case in which this configuration is not provided.

In the first aspect, the characteristics of the printing device may include time degradation characteristics of components of the printing device.

Accordingly, it is possible to more accurately extract a line defect that is formed in the specific direction, as compared to a case in which this configuration is not provided.

In the first aspect, the characteristics of the reading unit may include time degradation characteristics of components of the reading unit.

Accordingly, it is possible to more accurately extract a line defect that is formed in the specific direction, as compared to a case in which this configuration is not provided.

In the first aspect, the specific direction may be a conveying direction of the recording medium in the printing device.

Accordingly, it is possible to accurately extract a line defect that is formed in the specific direction, as compared to a case in which this configuration is not provided.

In the first aspect, a printing method of the printing device may be a single-pass method.

Accordingly, it is possible to more accurately extract a line defect that is formed in the specific direction, as compared to a case in which this configuration is not provided.

In the first aspect, the printing device may perform printing by dividing the inspection object image into plural lines and recording each of the plural lines on the recording medium, and the specific direction may be a main scanning direction of the printing device.

Accordingly, it is possible to accurately extract a line defect that is formed in the specific direction, as compared to a case in which this configuration is not provided.

In the first aspect a printing method of the printing device may be a shuttle-scan method.

Accordingly, it is possible to more accurately extract a line defect that is formed in the specific direction, as compared to a case in which this configuration is not provided.

In the first aspect, the reading unit may read the inspection object image with a resolution of the inspection object image in the specific direction that is lower than a resolution of the inspection object image in a direction crossing the specific direction.

Accordingly, it is possible to reduce the load of reading processing while preventing a deterioration of the evaluation accuracy as compared to a case in which this configuration is not provided.

In the first aspect, the extraction unit may extract the line defect from the inspection object image after adjusting the resolution in the specific direction of the inspection object image represented by the inspection object image data to be the same as the resolution in the direction crossing the specific direction.

Accordingly, it is possible to more accurately extract a line defect that is formed in the specific direction, as compared to a case in which this configuration is not provided.

In the first aspect, the evaluation unit may evaluate the visibility of the line defect using a mask effect-visual model.

Accordingly, it is possible to more accurately determine whether or not a printout includes an image having an inacceptable line defect, as compared to a case in which this configuration is not provided.

In the first aspect, the evaluation unit may combine the line defect extracted by the extraction unit, with the virtual sample image represented by the sample image data, and may evaluate the visibility of the line defect based on a combined image obtained by the combination and the virtual sample image using the mask effect-visual model.

Accordingly, it is possible to improve the evaluation accuracy of the visibility of a line defect as compared to a case in which this configuration is not provided.

In the first aspect, the evaluation unit may evaluate the visibility of the line defect using the mask effect-visual model based on decomposed images that are obtained by respectively decomposing the combined image and the virtual sample image into at least one of plural spatial frequency components or plural directional components.

Accordingly, it is possible to improve the evaluation accuracy of the visibility of a line defect as compared to a case in which this configuration is not provided.

In the first aspect, the evaluation unit may evaluate the visibility of the line defect using a mask effect-visual model in the specific direction based on the decomposed images.

Accordingly, it is possible to improve the evaluation accuracy of the visibility of a line defect by a simple configuration as compared to a case in which this configuration is not provided.

In the first aspect, the evaluation unit may evaluate the visibility of the line defect using a statistical method.

Accordingly, it is possible to improve the evaluation accuracy of the visibility of a line defect as compared to a case in which this configuration is not provided.

In the first aspect, the evaluation using the statistical method may be based on evaluation results obtained by performing in advance visual observations of plural evaluation object images corresponding to the inspection object image and respectively including different line defects, by at least one tester and evaluating the level of the visibility of the line defect for each of the plural evaluation object images.

Accordingly, it is possible to further improve the evaluation accuracy of the visibility of a line defect as compared to a case in which this configuration is not provided.

In the first aspect, the evaluation using the statistical method may be based on a multiple regression equation determined according to the evaluation results.

Accordingly, it is possible to improve the evaluation accuracy of the visibility of a line defect by a simple configuration as compared to a case which his configuration is not provided.

The first aspect may further include a warning unit that performs warning if the evaluation unit determines that the line defect is a visible line defect.

Accordingly, it is possible for a user to easily recognize that an inspection object printout includes an inacceptable line defect, as compared to a case in which this configuration is not provided.

In the first aspect, the warning unit may perform the warning by directly processing the inspection object printout that includes the line defect determined to be a visible line defect.

Accordingly, it is possible for a user to identify an inspection object printout including an inacceptable line defect by a simple configuration, as compared to a case in which this configuration is not provided.

In the first aspect, the warning unit may perform the warning by applying on the inspection object printout an identification aiding mark that facilitates identification of a position of the line defect in the inspection object printout.

Accordingly, it is possible for a user to easily recognize the position of a line defect by a simple configuration as compared to a case in which this configuration is not provided.

In the first aspect, the warning unit may perform the warning by applying the identification aiding mark at a position on an extended line of the line defect of the inspection object printout in the specific direction.

Accordingly, it is possible for a user to more easily recognize the position of a line defect as compared to a case in which this configuration is not provided.

In the first aspect a type of the identification aiding mark may be determined according to the level of the visibility of the line defect.

Accordingly, it is possible for a user to more easily recognize the level of the visibility of a line defect as compared to a case in which this configuration is not provided.

In the first aspect, the warning unit may perform the warning by causing a display unit to display predetermined information if the line defect is determined to be a visible line defect by the evaluation unit.

Accordingly, it is possible for a user to easily recognize that an inspection object printout includes an inacceptable line defect, as compared to a case in which this configuration is not provided.

In the first aspect, the predetermined information may include identification information that identifies the inspection object printout including the line defect that is determined to be a visible line defect.

Accordingly, it is possible for a user to identify an inspection object printout including an inacceptable line defect by a simple configuration, as compared to a case in which this configuration is not provided.

In the first aspect, the predetermined information may include the inspection object image that includes the line defect and an identification aiding image that facilitates identification of a position of the line defect in the inspection object image.

Accordingly, it is possible for a user to easily recognize the position of a line defect by a simple configuration, as compared to a case in which this configuration is not provided.

A second aspect of the invention is an image evaluation method including: storing sample image data that represents a virtual sample image simulating a sample image included in a sample printout that is recognized as a non-defective printout; acquiring inspection object image data by reading an inspection object image included in an inspection object printout that is obtained by printing an image corresponding to the sample image on a recording medium by a printing device using image data representing the image; extracting a line defect including a linear pattern formed in a specific direction, from the inspection object image represented by the inspection object image data, based on a difference value between the sample image data and the inspection object image data; and evaluating a visibility of the extracted line defect.

Accordingly, it is possible to quickly and accurately determine whether or not a printout includes an image having an inacceptable line defect, as compared to a case in which this configuration is not provided.

A third aspect of the invention is a non-transitory computer-readable storage medium storing a program that causes a computer to execute image evaluation processing, the image evaluation processing including: storing sample image data that represents a virtual sample image simulating a sample image included in a sample printout that is recognized as a non-defective printout; acquiring inspection object image data by reading an inspection object image included in an inspection object printout that is obtained by printing an image corresponding to the sample image on a recording medium by a printing device using image date representing the image; extracting a line defect including a linear pattern formed in a specific direction, from the inspection object image represented by the inspection object image data, based on a difference value between the sample image data and the inspection object image data; and evaluating a visibility of the extracted line defect.

Accordingly, it is possible to quickly and accurately determine whether or not a printout includes an image having an inacceptable line defect, as compared to a case in which this configuration is not provided.

According to the above aspects, it is possible to quickly and accurately determine whether or not a printout includes an image having an inacceptable line defect.

BRIEF DESCRIPTION OF THE DRAWINGS

Exemplary embodiments of the present invention will be described in detail based on the following figures, wherein:

FIG. 25 is a schematic view illustrating an example of the structure of a statistical model DB that is included in the image evaluation device according to the second embodiment;

FIG. 33 is a schematic view illustrating an example of the structure of the customer characteristic DB that is included in the image evaluation device according to the third embodiment;

DETAILED DESCRIPTION

First Embodiment

Figure 1:
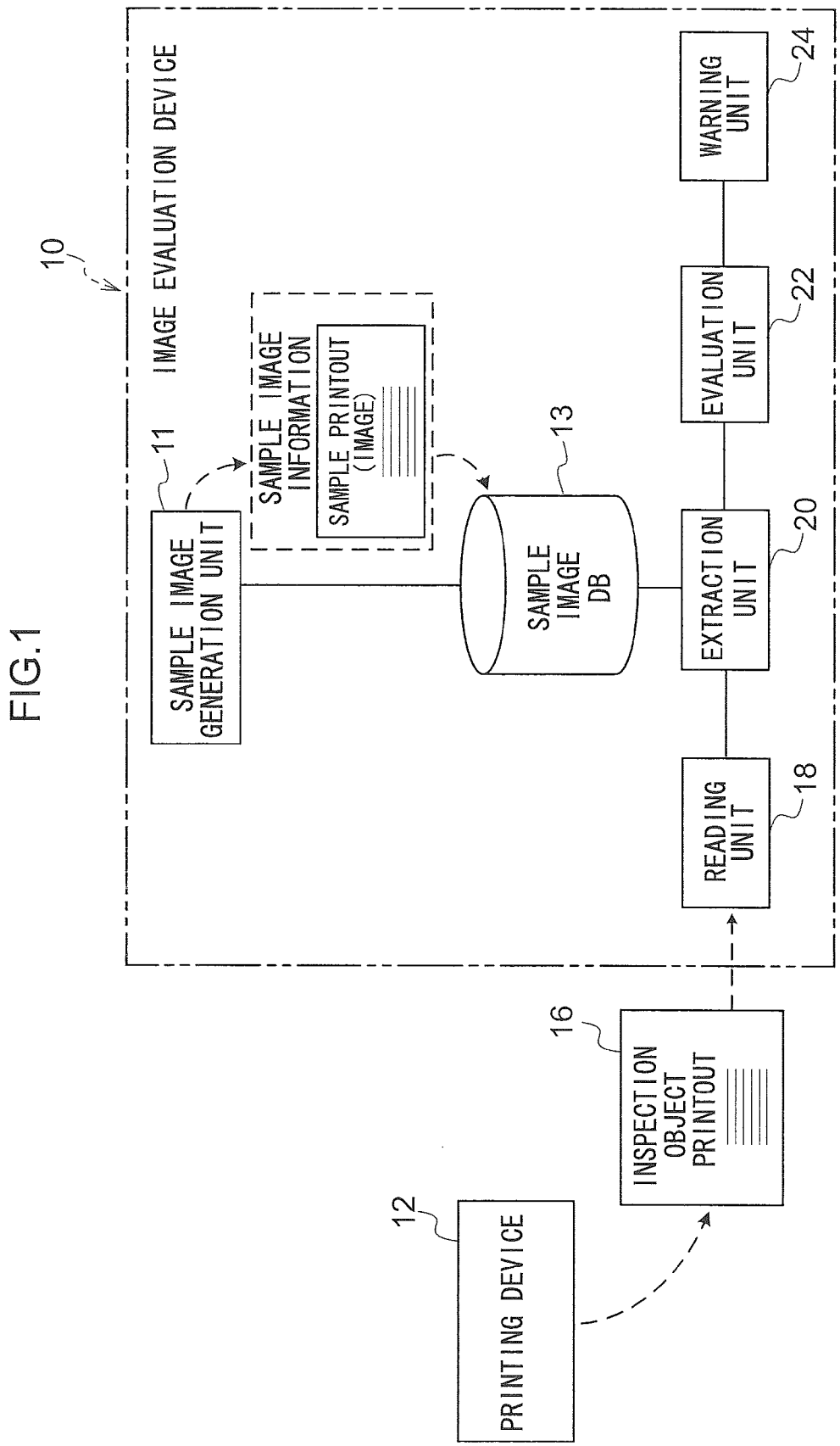
FIG. 1 is a schematic view illustrating an example of the entire configuration of an image evaluation device according to a first embodiment.

FIG. 1 illustrates an example of main functional components of an image evaluation device 10 according to a first embodiment. As illustrated in FIG. 1, the image evaluation device 10 is a device that evaluates an image of a printout printed by a printing device 12. After image information (data) representing an image is input, the printing device 12 forms a printout by printing an image that is expressed by the image data on a recording medium such as a recording sheet.

A single-pass inkjet printer is used as the printing device 12 in the first embodiment; however, embodiments are not limited thereto. For example, a shuttle-scan inkjet printer may be used instead of the single-pass inkjet printer. Further, a xerographic printer, a thermal head printer, a magnetographic printer, a machine plate printing machine, or the like may be used instead of the inkjet printer. The printing device 12 of the first embodiment is configured by an inkjet printer that conveys recording sheets by rotating a drum while holding one or more recording sheets on the outer peripheral surface of the drum. Moreover, the printing device 12 includes a recording head that ejects ink droplets, and records an image by ejecting ink onto a recording surface of a recording sheet while passing the recording sheet such that the recording surface thereof faces ink ejection ports of the recording head.

The printing device 12 receives a recording sheet from the outside and conveys the received recording sheet in a specific direction. The printing device 12 performs printing by recording an image expressed by image data on the recording sheet by ejecting ink droplets from the recording head based on the input image data onto the recording sheet that is being conveyed in the specific direction. The printing device 12 discharges a printout that is the recording sheet on which an image is printed as described above, to a predetermined section (for example, a sheet discharge tray). Here, the "specific direction" indicates, for example, a sub-scanning direction that is a direction crossing a main scanning direction. Hereinafter, a direction substantially orthogonal to the main scanning direction is used as an example of the "specific direction" in order to avoid complication.

In the first embodiment, a printout printed by the printing device 12 indicates a printout that has print contents corresponding to those of a sample printout that is admitted as a non-defective printout, and that is an object to be compared with the sample printout. Hereinafter, this printout, which is an object printout to be inspected, is referred to as an inspection object printout 16. In this regard, the "print contents" do not include a defect of an image that is formed during the printing process. Further, in order to avoid complication, FIG. 1 illustrates a single inspection object printout 16 including print contents corresponding to those of a single sample printout; however, embodiments are not limited thereto. For example, plural inspection object printouts 16 may be used. In this case, it is preferable that the plural inspection object printouts 16 are obtained by variable printing.

The sample printout indicates, for example, a printout that is admitted as a non-defective printout. The printout admitted as a non-defective printout is, for example, a printout that can be shipped, and a printout that has a printed image admitted as having good visibility (for example, the image quality is admitted to be good). In the first embodiment, in order to avoid complication, an image of which the visibility has been admitted to be by the image evaluation device 10 in the past is used as the "image admitted as having good visibility". However, embodiments are not limited thereto. For example, an image that is determined as having no defect or having acceptable defects according to predetermined criteria by an inspector with the naked eye, may be used as the "image admitted as having good visibility". Hereinafter, an image printed on the sample printout is referred to as a sample image. In the first embodiment the entire image printed on the sample printout is referred to as the sample image in order to avoid complication. However, the sample image is not limited thereto and may be a part of the image printed on the sample printout.

The inspection object printout 16 indicates, for example, a printout that is a recoding sheet on which an object image to be inspected (hereinafter, referred to as an "inspection object image") is printed by the printing device 12 based on image data expressing an image corresponding to the sample image. In the first embodiment, the entire image printed on the inspection object printout 16 is referred to as the inspection object image in order to avoid complication. However, the inspection object image is not limited thereto and may be a part of the image printed on the inspection object printout 16.

An image evaluation device is known in which an evaluation of whether or not a printout is a good printout (an inspection object printout 16 including an inspection object image in which line defects are not visible) is performed simply based on density difference value between the sample image and the inspection object image. However, in the image evaluation device in this conventional art, it is difficult to determine whether or not the line defect is within a certain level that is acceptable (for example, whether it is a fine line defect). The accuracy of the evaluation of the inspection object printout 16 may be decreased depending on the certain level of line defects. Further, in the conventional image evaluation device, in a case in which variable printing is performed, each of the sample printouts corresponding to the number of inspection object printouts 16 that have been printed is need to be read and, therefore, it is expected that a large amount of time is required until evaluation results are obtained. In order to address this situation, the image evaluation device 10 according to the first embodiment includes a sample image generation unit 11, a sample image database (DB) 13, a reading unit 18, an extraction unit 20, an evaluation unit 22, and a warning unit 24.

The sample image generation unit 11 generates sample image data expressing a vital sample image simulating a sample image included in a sample printout, on the basis of print content data expressing predetermined print contents (for example, a basic image that does not include an inacceptable defect). The generated sample image data are stored in the sample image DB 13. The print content data are stored in advance in a predetermined storage means (for example, a storage unit 66 described below). The sample image generation unit 11 may acquires corresponding print content data in the order in which inspection object images are read and generates corresponding sample image data. The sample image data is stored in the sample image DB 13 in the order in which the sample image data are generated. That is, the sample image DB 13 stores the sample image data in the generation order (in time series) of the sample image data.

Here, the "virtual sample image" indicates, for example, a non-print image that is output after image data expressing a sample image is read by a computer and the read image data is processed by software. In the first embodiment, the virtual sample image indicates an image included in a specific region of a simulation image of the sample printout (for example, a simulation image obtained by performing virtual printing by the computer) as illustrated in FIG. 1. The "specific region" indicates, for example, a region that is to be compared with the inspection object image included in the inspection object printout 16.

In the first embodiment, image data to which the influence of the characteristics of the reading unit 18 is not reflected (i.e., from which the influence of the characteristics of the reading unit 18 is eliminated) is used as the sample image data. The "characteristics of the reading unit 18" includes, in a case in which a scanner is used as the reading unit 18, the vertical and horizontal resolution of a scanned image, a Modulation Transfer Function (MTF), color characteristics, a pixel aperture ratio, the image formation characteristics of the scanner and the like. Furthermore, the "characteristics of the reading unit 18" mentioned here include time degradation characteristics of the components of the reading unit 18. For example, the time degradation characteristics of the components of the reading unit 18 may include time degradation characteristics of a component of the reading unit 18 that is expected to incur time degradation and that the time degradation thereof will affect the reading result of an image.

Further, image data in which the influence of non-formation factor characteristics is not reflected (i.e., from which the influence of non-formation factor characteristics is eliminated) is used as the sample image data in the first embodiment. Here, the "non-formation factor characteristics" indicate, for example, characteristics of the printing device 12 that will not be factors of formation of a line defective image in which a linear pattern is formed in a specific direction of an inspection object image. Further, the "non-formation factor characteristics" mentioned here include time degradation characteristics of the components of the printing device 12. For example, the time degradation characteristics of the components of the reading unit 18 may include time degradation characteristics of a component of the reading unit 18 that is expected to incur time degradation and for which the time degradation thereof will affect generation of defects in an image. Furthermore, the "non-formation factor characteristics" include various characteristics for predicting the visibility of the inspection object image. Examples of the characteristics that affect the visibility of colors include color separation, halftone, color profile, ink spectrum characteristics, and the like. Moreover, examples of the image formation characteristics include MTF (Contrast Transfer Function (CTF)), resolution, the size of an ink droplet, a granular shape, geometric correction, and the like. Examples of models (functions) for identifying these characteristics include an ejecting data generating unit, an ink impact state predicting unit, a reflectance distribution predicting unit (Kubelka-Munk model, Neugebauer model, or the like), and a geometric correction unit.

The reading unit 18 reads the inspection object image that is included in the inspection object printout 16. The extraction unit 20 calculates a difference value between the sample image data stored in the sample image DB 13 and inspection object image data that is obtained by reading the inspection object image by the reading unit 18 and that expresses an image corresponding to the sample image. Based on the calculated difference value, the extraction unit 20 extracts a line defect that is a linear pattern formed in a specific direction (for example, a pattern linearly extending in a specific direction) from the inspection object image that expresses the inspection object image data (for example, in the first embodiment, the extraction unit 20 extracts a line defect image indicating the line defect).

The evaluation unit 22 evaluates the visibility of the line defect. Here, the "visibility of the line defect" indicates, for example, the visibility of the line defect indicated by the line defect image that is extracted by the extraction unit 20. Further, the "evaluates the visibility" indicates, for example, deriving that the level of the visibility of the line defect. In the first embodiment, an example in which the evaluation unit 22 derives the level of the visibility of the line defect will be described. However, embodiments are not limited thereto and, for example, the evaluation unit 22 may be provided with a determination function for determining whether or not the derived level of the visibility is visually recognizable by a specific person. Here, the "specific person" indicates, for example, a person who observes the inspection object printout 16. Furthermore, the "determination function" corresponds to, for example, the function of a warning determination section 44 described below.

The warning unit 24 performs warning if it is determined that the line defect of which the visibility is evaluated by the evaluation unit 22 is a visible line defect. Here, the "visible line defect" indicates, for example, a line defect that is visually recognizable by the specific person.

Figure 2:
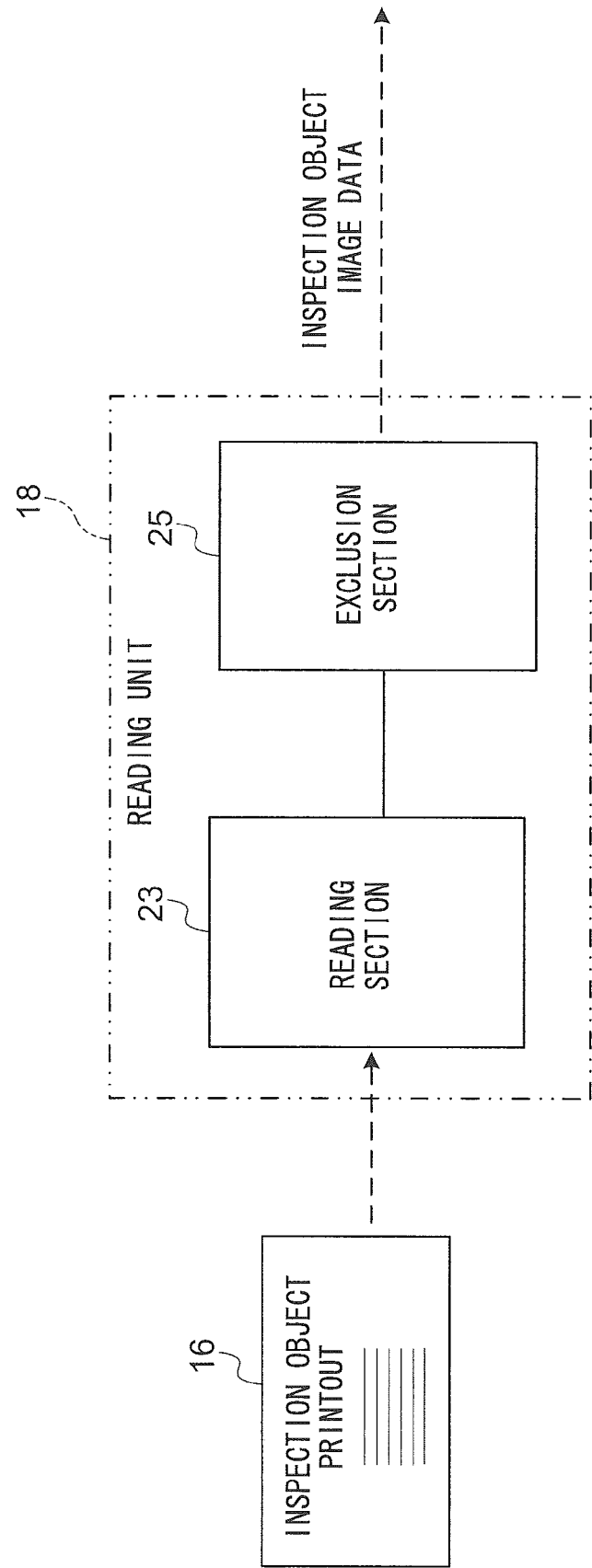
FIG. 2 is a functional block diagram illustrating an example of main functional components of a reading unit that is included in the image evaluation device according to the first embodiment.

FIG. 2 illustrates an example of main functional components of the reading unit 18. The reading unit 18 includes a reading section 23 and an exclusion section 25. The reading section 23 reads the inspection object image that is included in the inspection object printout 16, and acquires the inspection object image data. Here, the reading section 23 reads the inspection object image so that resolution in the specific direction is lower than resolution in a direction crossing the specific direction. That is, in the first embodiment, the reading section 23 reads the inspection object image so that resolution in the specific direction is lower than resolution in the main scanning direction. In this regard, in the virtual sample image the resolution in the specific direction is the same as the resolution in the main scanning direction. When the inspection object image is read, the resolution in the main scanning direction is set to the same resolution as the resolution in the specific direction of the virtual sample image (the resolution in the main scanning direction of the virtual sample image).

The exclusion section 25 eliminates the influence of the characteristics of the reading unit 18 and the influence of the non-formation factor characteristics from the inspection object image data that are acquired by the reading section 23. Here, the "characteristics of the reading unit 18" do not include the characteristic where the resolution in the specific direction and the resolution in the main scanning direction are different from each other. Further, in order to avoid complication, the "influence of the characteristics of the reading unit 18" indicates the influence of the characteristics of the reading unit 18, which is not reflected in the sample image data, and the "influence of the non-formation factor characteristics" indicates the influence of the non-formation factor characteristics, which is not reflected in the sample image data. Furthermore, in order to avoid complication, an example in which the exclusion section 25 eliminates the influence of the characteristics of the reading section 23 from the inspection object image data acquired by the reading section 23 will be described here. However, embodiments are not limited thereto and, for example, not only the influence of the characteristics of the reading section 23 but also the influence of the characteristics of the exclusion section 25 may be eliminated from the inspection object image data. Alternatively, the influence of the characteristics of the reading section 23 may be disregarded and only the influence of the characteristics of the exclusion section 25 may be eliminated.

Figure 3:
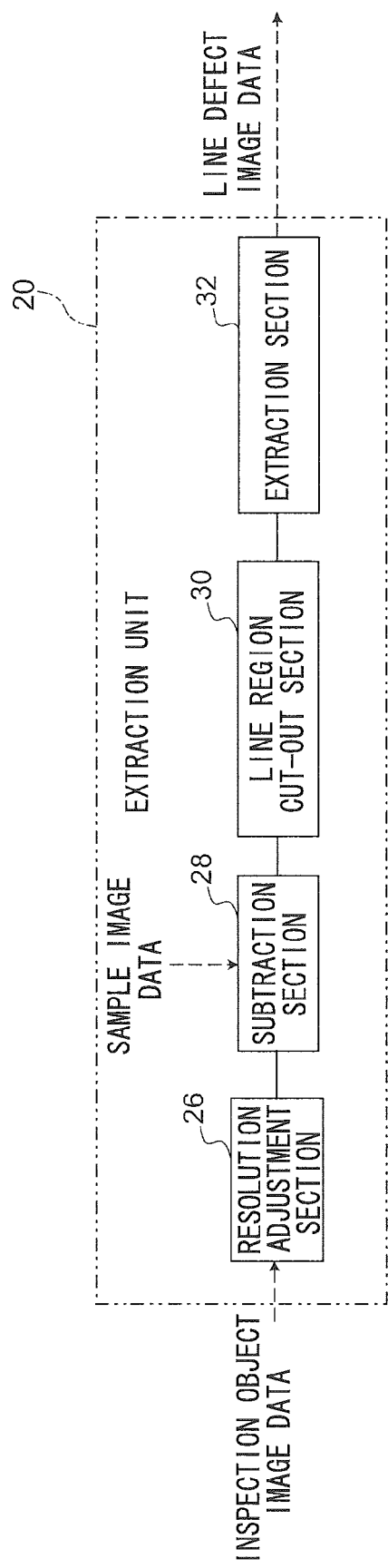
FIG. 3 is a functional block diagram illustrating an example of main functional components of an extraction unit that is included in the image evaluation device according to the first embodiment.

FIG. 3 illustrates an example of main functional components of the extraction unit 20. The extraction unit 20 includes a resolution adjustment section 26, a subtraction section 28, a line region cut-out section 30, and a specific direction image extraction section 32 (herein after referred to as an extraction section 32). The resolution adjustment section 26 adjusts the resolution of the inspection object image expressed by the inspection object image data from which the influence of the characteristics of the reading unit 18 and the influence of the non-formation factor characteristics have been eliminated by the exclusion section 25. In the first embodiment, the resolution adjustment section 26 adjusts the resolution of the inspection object image in the specific direction to be the same as the resolution in the main scanning direction after performing alignment processing to the inspection object image expressed by the inspection object image data from which the influence of the characteristics of the reading performing section 23 has been eliminated by the exclusion section 25. Here, the "alignment processing" indicates, for example, processing for correcting a skew, a shift in a conveying direction, and the like.

The subtraction section 28 calculates a difference value between the inspection object image data expressing the inspection object image of which the resolution has been adjusted by the resolution adjustment section 26 and corresponding sample image data that is stored in the sample image DB 13. For example, the subtraction section 28 calculates a difference value between the density of the inspection object image of which the resolution has been adjusted by the resolution adjustment section 26 and the density of the virtual sample image expressed by the corresponding sample image data stored in the sample image DB 13.

The line region cut-out section 30 cuts out a region including a linear pattern (hereinafter, referred to as a "line region") from a predetermined region of the inspection object image of which the resolution has been adjusted by the resolution adjusting section 26, based on the difference value that has been calculated by the subtraction section 28. Here, the "linear pattern" includes not only a linear pattern formed in the specific direction but also a linear pattern formed in a direction other than the specific direction. Further, the "predetermined region" indicates, for example, a region in which a linear pattern is expected to be formed. In the first embodiment, the "region in which a linear pattern is expected to be formed" may be specified based on a structurally defective portion of the printing device 12, a region where the amount of ejected ink is large, and the characteristics of the reading unit 18 (for example, the characteristics of the reading section 23). Here, regions corresponding to the structurally defective portion of the printing device 12, the region where the amount of ejected ink is large, and the structurally defective portion of the reading section 23 are used as examples of the "region in which a linear pattern is expected to be formed".

Embodiments are not limited to the configuration of the first embodiment in which the "region in which a linear pattern is expected to be formed" is specified based on the characteristics of the printing device 12 and the characteristics of the reading unit 18. For example, the "region in which a linear pattern is expected to be formed" may be specified based on either of the characteristics of the printing device 12 or the characteristics of the reading unit 18. Further, the characteristics of the printing device 12 may include time degradation characteristics in the components of the printing device 12. For example, the "region in which a linear pattern is expected to be formed" may be specified by further considering the time degradation characteristics of a component of the printing device 12 that is expected to incur time degradation and that the time degradation thereof will affect generation of defects in an image. Furthermore, the characteristics of the reading unit 18 may include time degradation characteristics in the components of the reading unit 18. For example, the "region in which a linear pattern is expected to be formed" may be specified by further considering the time degradation characteristics of a component of the reading unit 18 that is expected to incur time degradation and that the time degradation thereof will affect the reading result of an image.

The extraction section 32 extracts a line defect including a linear pattern formed in the specific direction from the line region cut out by the line region cut-out section 30 (e.g., extracts a line defect image showing a line defect in the first embodiment), and generates line defect image data expressing the line defect image. The extraction section 32 extracts a line defect image of a linear pattern formed in the specific direction by excluding an image including a linear pattern in a direction other than the specific direction and an image of a granular pattern such as a halftone, and generates the line defect image data. Examples for extraction algorithms for extracting a line defect formed in the specific direction by extracting granular components include an extraction algorithm using plural band pass filters, an extraction algorithm using line detection filters, an extraction algorithm using differential filters (two-time differential filters). Hereinafter, the line defect image of a linear pattern formed in the specific direction is simply referred to as a "line defect image" for the convenience of description.

Figure 4:
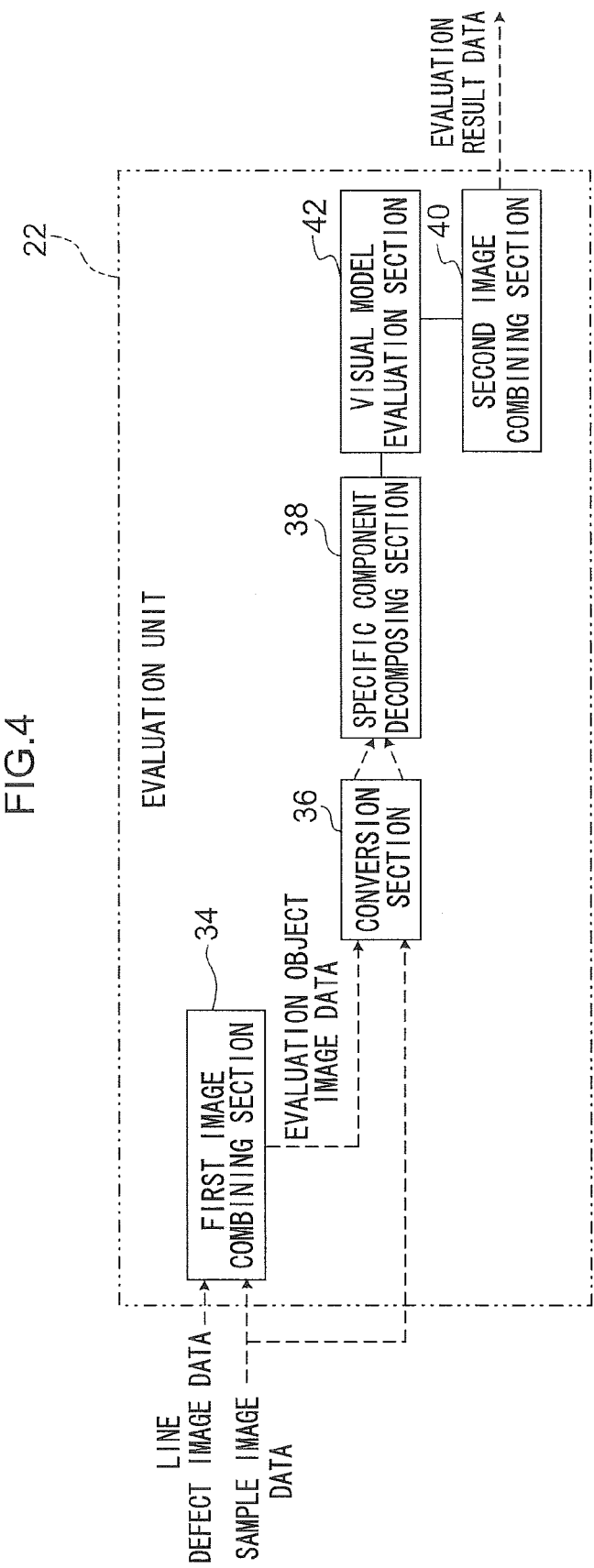
FIG. 4 is a functional block diagram illustrating an example of main functional components of an evaluation unit that is included in the image evaluation device according to the first embodiment.

FIG. 4 illustrates an example of main functional components of the evaluation unit 22. As illustrated in FIG. 4, the evaluation unit 22 includes a first image combining section 34, a conversion section 36, a specific component decomposing section 38, a second image combining section 40, and a visual model evaluation section 42. The first image combining section 34 combines the virtual sample image expressed by the sample image data (for example, the virtual sample image expressed by the sample image data used in the subtraction section 28) with the line defect image expressed by the line defect image data generated by the extraction section 32. For example, in the first embodiment, the first image combining section 34 combines the virtual sample image with the line defect image that expressed by the line defective image data generated by the specific direction-image extracting section 32, and generates evaluation object image data expressing an evaluation object image that is obtained by the combination.

The conversion section 36 performs color conversion and visual filtering on the evaluation object image expressed by the evaluation object image data and the virtual sample image expressed by the sample image data. Here, the "color conversion" indicates a conversion from a device-dependent color space to a device-independent color space. The device-dependent color space indicates, for example, a color space that depends on the printing device 12 (e.g., a color space that depends on spectral characteristics of color materials used in printing). The device-independent color space indicates, for example, a color space that depends on the vision of a human (e.g., a color space that depends on spectral characteristics of the vision of a human) and, specifically includes XYZ, Lab, Luv, HSV, VD, RGB, CIECAM and the like.

The "visual filtering" indicates processing of vision conversion using a function that serves as a low-pass filter for obtaining a spatial frequency corresponding to the human visual characteristics (a spatial frequency predetermined as a spatial frequency close to the human visual characteristics). The "spatial frequency predetermined as a spatial frequency close to the human visual characteristics" indicates, for example, spatial frequencies in a visible region excluding spatial frequencies that are generally regarded as applying strong stimulation on the eyes of a human. Here, a VTF function determined based on the spatial frequency characteristics corresponding to the human visual characteristics is used as the function that serves as a low-pass filter. Accordingly, the "visual filtering" here indicates processing of converting the evaluation object image expressed by the evaluation object image data and the virtual sample image expressed by the sample image data into an evaluation object image and a virtual sample image from which spatial frequencies that do not conform to the human visual characteristics have been removed, using the VTF function.

Optionally, another resolution adjustment section that is different from the resolution adjustment section 26 may be provided upstream of the conversion section 36 (for example, between the first image combining section 34 and the conversion section 36) and the load of the subsequent processing may be lessen by reducing the resolution of the evaluation object image and the virtual sample image by the another resolution adjusting section.

The specific component decomposing section 38 decomposes each of the evaluation object image and the virtual sample image, which are obtained after conversion by the conversion section 36, into specific components. In the first embodiment, the specific component decomposing section 38 decomposes each of the evaluation object image and the virtual sample image into plural spatial frequencies and plural directions and obtains frequency-decomposed images corresponding to plural spatial frequencies and direction-decomposed images corresponding to plural directions.

The visual model evaluation section 42 performs an evaluation of the visibility on the line defect identified in the line defect image extracted by the extraction unit 20 using a mask effect-visual model, and generates information (data) that represents the level of the visibility of the line defect (hereinafter, referred to as visibility level data). That is, the visual model evaluation section 42 evaluates the visibility (i.e., evaluates the mask effect) of each of the frequency-decomposed images and each of the direction-decomposed images, and generates visibility level data for each of the images. Here, the "level of the visibility" is represented in ten levels by a numeral value in the range of, for example, 0 to 9, and the larger the numeral value, the higher the level of visibility (the better visibility). Hereinafter, the frequency-decomposed image and direction-decomposed image are simply referred to as "decomposed images" if these are not need to be distinguished from each other.

In the first embodiment, the visual model evaluation section 42 evaluates the visibility of an image obtained by further reflecting the influence of the adjacent frequency-decomposed images and the influence of the direction-decomposed images in all directions to each of the decomposed images, and generates the visibility level data. Here, the "the influence of the adjacent frequency-decomposed images" indicates, for example, among the plural frequency-decomposed images, the influence of one frequency-decomposed image to an adjacent frequency-decomposed image having an adjacent frequency. Further, the "influence of the direction-decomposed images in all directions" indicates, among the direction-decomposed images of all directions, the influence of a direction-decomposed image of a specific direction to another direction-decomposed image of other direction. Embodiments are not limited to the above configurations, and the visual model evaluation section 42 may evaluate the visibility of an image obtained by reflecting to each of the decomposed image the influence of at least one of the other frequency-decomposed images. An example of the evaluation algorithm using a mask effect-visual model used by the visual model evaluation section 42 for performing evaluation in the first embodiment includes a visible difference predictor (VDP). The "VDP" indicates, for example, a method of modeling the human visual characteristics (masking) and estimating an error between two images that is visible to the eye of a human. Another example of the evaluation algorithm is HDR-VDP-2.

The second image combining section 40 combines the visibility level data generated for each of the decomposed images by the visual model evaluation section 42 with the evaluation object image expressed by the evaluation object image data generated by the first image combining section 34, and generates evaluation result information (data) that expresses an image obtained by the combination. For example, the second image combining section 40 associates the respective pixels of the evaluation object image expressed by the evaluation object image data generated by the first image combining section 34 with the visibility level data for corresponding pixels in the frequency-decomposed images and the direction component images. In this regard, several pixels (for example, 2×2 pixels) of the evaluation object image may be represented as one pixel of the frequency-decomposed image depending on the spatial frequency. Therefore, in this case, one pixel of the frequency-decomposed image may be associated with corresponding several pixels of the evaluation object image. Hereinafter, the image obtained by the combination at the second image combining section 40 is referred to as a "final combined image".

Figure 5:
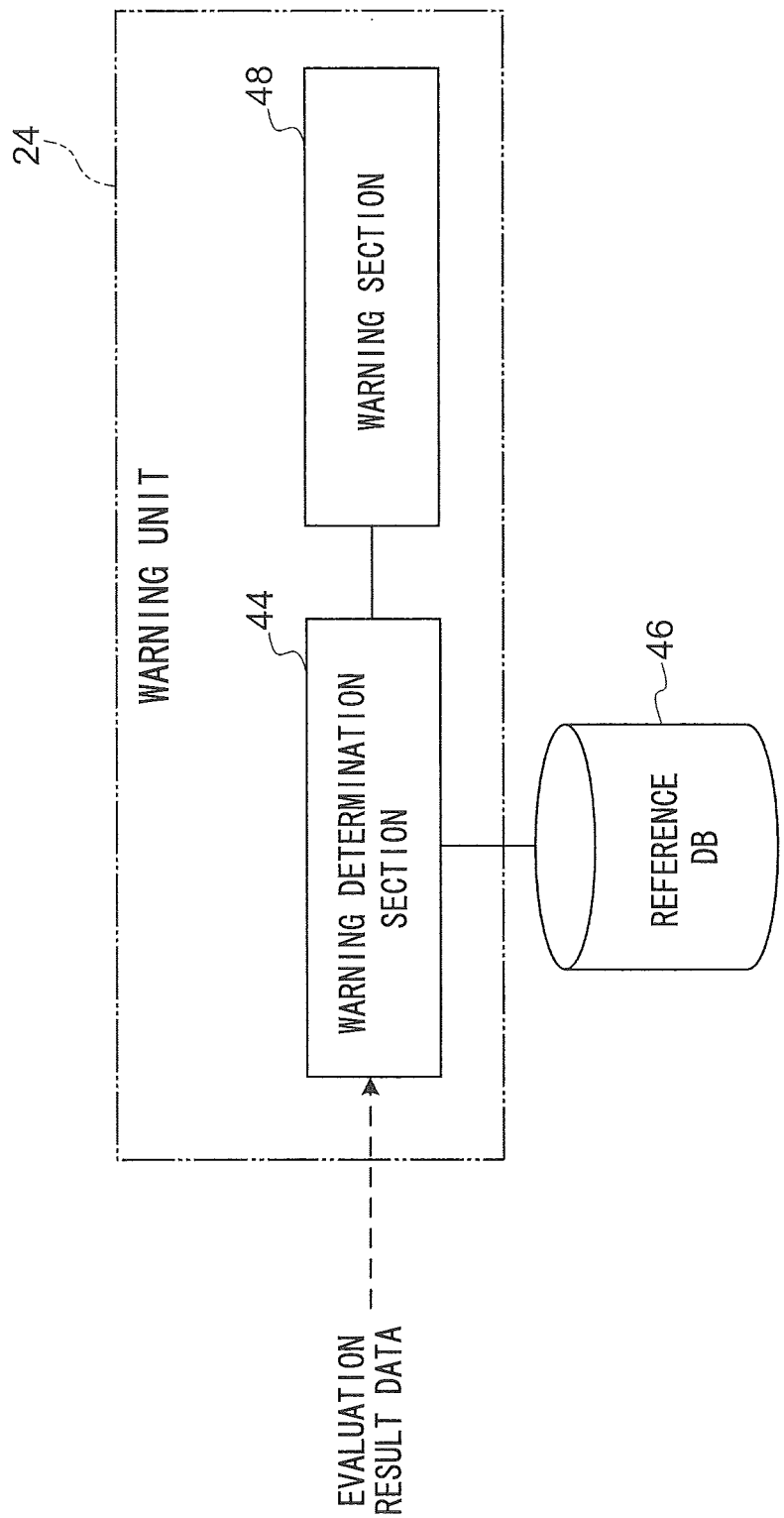
FIG. 5 is a functional block diagram illustrating an example of main functional components of a warning unit that is included in the image evaluation device according to the first embodiment.

FIG. 5 illustrates an example of main functional components of the warning unit 24. As illustrated in FIG. 5, the warning unit 24 includes a warning determination section 44 and a warning section 48. A reference database (DB) 46 is connected to the warning determination section 44. The reference DB 46 stores information (hereinafter, referred to as "reference data") that is referred for determining whether or not a warning is necessary. The warning determination section 44 determines whether or not a warning is necessary based on the evaluation result data that is generated by the visual model evaluation section 42 and with reference to the reference data of the reference DB 46. For example, determination information (data) for each level of visibility that indicates whether or not a line defect is visible is stored as the reference data in the reference DB 46 according to the first embodiment. Accordingly, the warning determination section 44 may determine on the basis of the determination data whether or not the level of visibility indicated by the visibility level data included in the evaluation result data is a level for which a warning is required. Here, the "deter urination data" is predetermined based on, for example, subjective evaluation results of a specific person (for example, evaluation results of an organoleptic examination). However, embodiments are not limited thereto, and the determination data may be predetermined based on, for example, results of a simulation performed by a computer.

The warning section 48 performs warning if the warning determination section 44 determines that the level of visibility indicated by the visibility level data included in the evaluation result data requires a warning (that is, if the line defect indicated by the line defect image is evaluated as a visible line defect). Warning performed by the warning section 48 in the first embodiment includes, for example, performing direct processing on the inspection object printout 16 that includes the line defect evaluated as a visible line defect, and visibly displaying predetermined information. Examples of the "direct processing" include sorting processing. The Examples further include processing of applying an identification aiding mark that facilitates identification of the position of the line defect of the inspection object printout 16, or processing of applying an identification aiding mark at a position on the extension of the line defect in the inspection object printout 16 in the specific direction.

Figure 6:
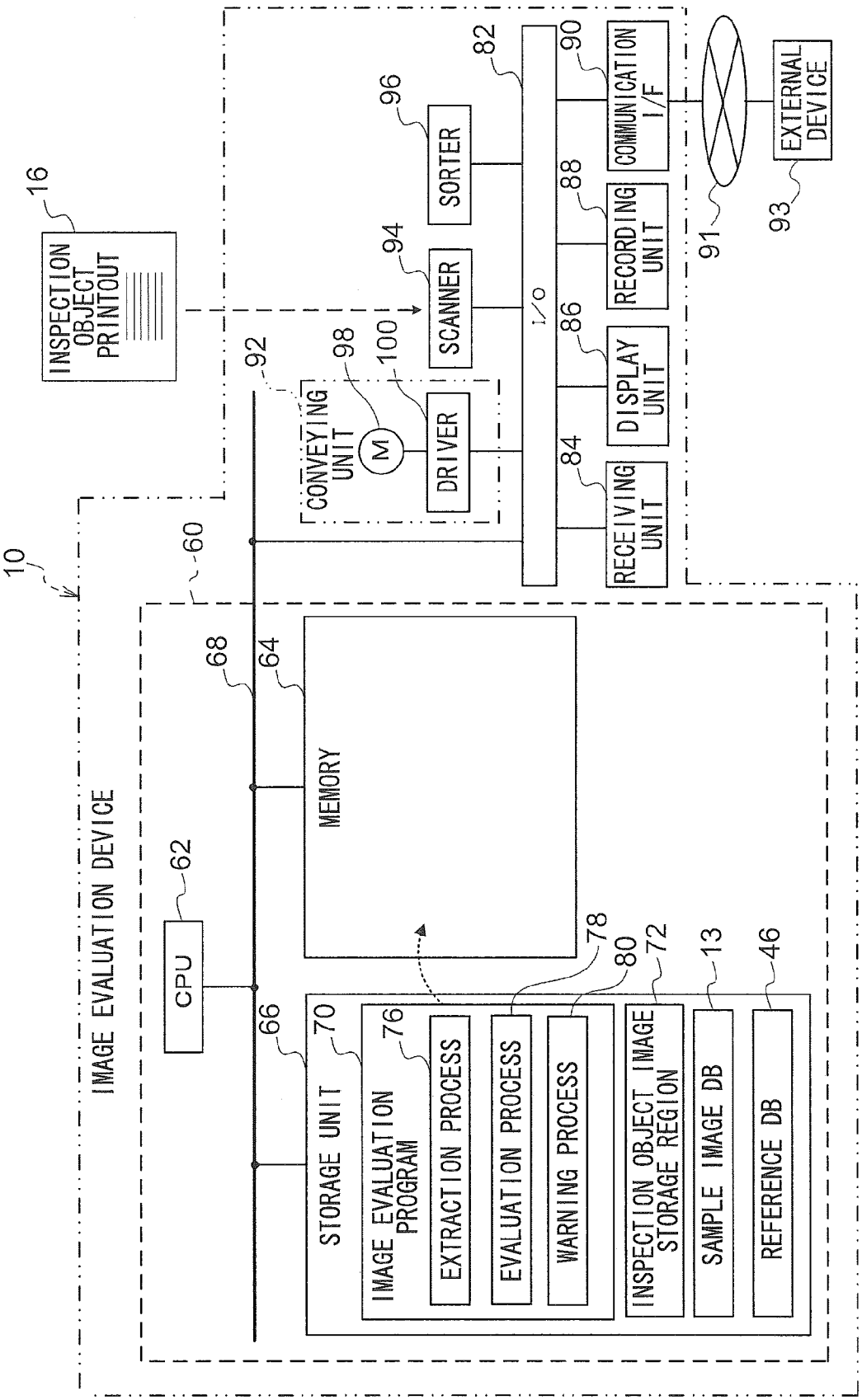
FIG. 6 is a block diagram illustrating an example of the configuration of an electrical system of the image evaluation device according to the first embodiment.

The extraction unit 20, the evaluation unit 22, and the warning unit 24 are realized by, for example, a computer 60 that is built in the image evaluation device 10 and other input/output devices as illustrated in FIG. 6. FIG. 6 illustrates an example of the main parts of an electrical system of the image evaluation device 10. Hereinafter, the sample printout and the inspection object printout 16 are both referred to as "printouts" if the sample printout and the inspection object printout 16 do not need to be distinguished from each other.

As illustrated in FIG. 6, the computer 60 includes a Central Processing Unit (CPU) 62, a memory 64, and a non-volatile storage unit 66, which are connected to each other through a bus 68 that includes an address bus, a system bus, or the like. The storage unit 66 is realized by Solid State Drive (SSD), Hard Disk Drive (HDD) or the like. An image evaluation program 70 is stored in the storage unit 66 that is a storage medium. Further, the storage unit 66 stores the sample image DB 13, the reference DB 46, and an inspection object image storage region 72. The inspection object image storage region 72 stores inspection object image data.

The CPU 62 reads the image evaluation program 70 from the storage unit 66, loads the image evaluation program 70 in the memory 64, and sequentially executes processes included in the image evaluation program 70. The image evaluation program 70 includes an extraction process 76, an evaluation process 78, and a warning process 80. The CPU 62 operates as the extraction unit 20 illustrated in FIG. 1 by executing the extraction process 76. The CPU 62 operates as the evaluation unit 22 illustrated in FIG. 1 by executing the evaluation process 78. The CPU 62 operates as the warning unit 24 illustrated in FIG. 1 by executing the warning process 80.

Embodiments are not limited to the case described above in which the image evaluation program 70 is read from the storage unit 66, and it is not necessary to initially store the image evaluation program 70 in the storage unit 66. For example, the image evaluation program 70 may be initially stored in any "portable storage media" such as a flash memory, a CD-ROM, a DVD disc, a magnetic-optical disc, and an IC card that are connected to the computer 60 when being used. The computer 60 may acquire programs from these portable storage media and execute the programs. Further, the image evaluation program 70 may be stored in an external device such as another computer or a server device, which is connected to the computer 60 through the internet, LAN (Local Area Network), or the like. In this case, the computer 60 may acquire the image evaluation program 70 from the external device and execute the image evaluation program 70.

The image evaluation device 10 includes input/output devices. Further, the image evaluation device 10 includes an input/output interface (I/O) 82 that electrically connects the computer 60 to various input/output devices and control transmission of various kinds of information between the computer 60 and the various input/output devices. The input/output devices are electrically connected to the computer 60 through the bus 68 by being connected to the I/O 82. Here, a receiving unit 84, a display unit 86, a recording unit 88, a communication interface (I/F) 90, a conveying unit 92, a scanner 94 that is an example of the reading unit 18, and a sorter 96 are provided as the input/output devices.

The receiving unit 84 receives an operation input from a user of the image evaluation device 10. Examples of the receiving unit 84 include input devices such as a keyboard, a mouse, a transmissive touch panel that is used while being superimposed on a display, an operation button for supplying power, operation buttons for setting various kinds of information, and a scroll key.

The display unit 86 displays various kinds of information. Examples of the display unit 86 include a liquid crystal display. In the first embodiment, a touch panel display is used, which is formed by superimposing a touch panel that is a part of the receiving unit 84 on a liquid crystal display as the display unit 86.

The recording unit 88 records an image on an inspection object printout 16. An inkjet recording head is employed as the recording unit 88 in the first embodiment, but embodiments are not limited thereto. The recording unit 88 may be, for example, a thermal printer, a stamping device, or any device that can apply a specific mark on the inspection object printout 16.

The communication I/F 90 is connected to an external device 93 such as a personal computer or a printer through a communication network 91, and controls transmission of various kinds of information between the computer 60 and the external device 93.

The conveying unit 92 feeds the inspection object printout 16 in the image evaluation device 10, conveys the inspection object printout 16 along a predetermined conveying path so that the inspection object printout 16 passes through a reading position of the scanner 94 and a recording position of the recording unit 88, and sends the inspection object printout 16 to the sorter 96. The conveying unit 92 includes a motor 98 that serves as a driving source for conveying the inspection object printout 16. Further, the conveying unit 92 includes a driver 100 that is connected to the motor 98 and controls the driving of the motor 98. The driver 100 is connected to the I/O 82. Accordingly, the computer 60 is able to control the driving of the motor 98 through the driver 100.

The scanner 94 optically reads the inspection object image included in the inspection object printout 16, and outputs inspection object image data that expresses the read inspection object image to the computer 60. A reduction optical system type scanner is used as the scanner 94 in the first embodiment. However, the scanner 94 is not limited thereto and, for example, a scanner adopting a unit magnification optical system may be used.

Figure 7:
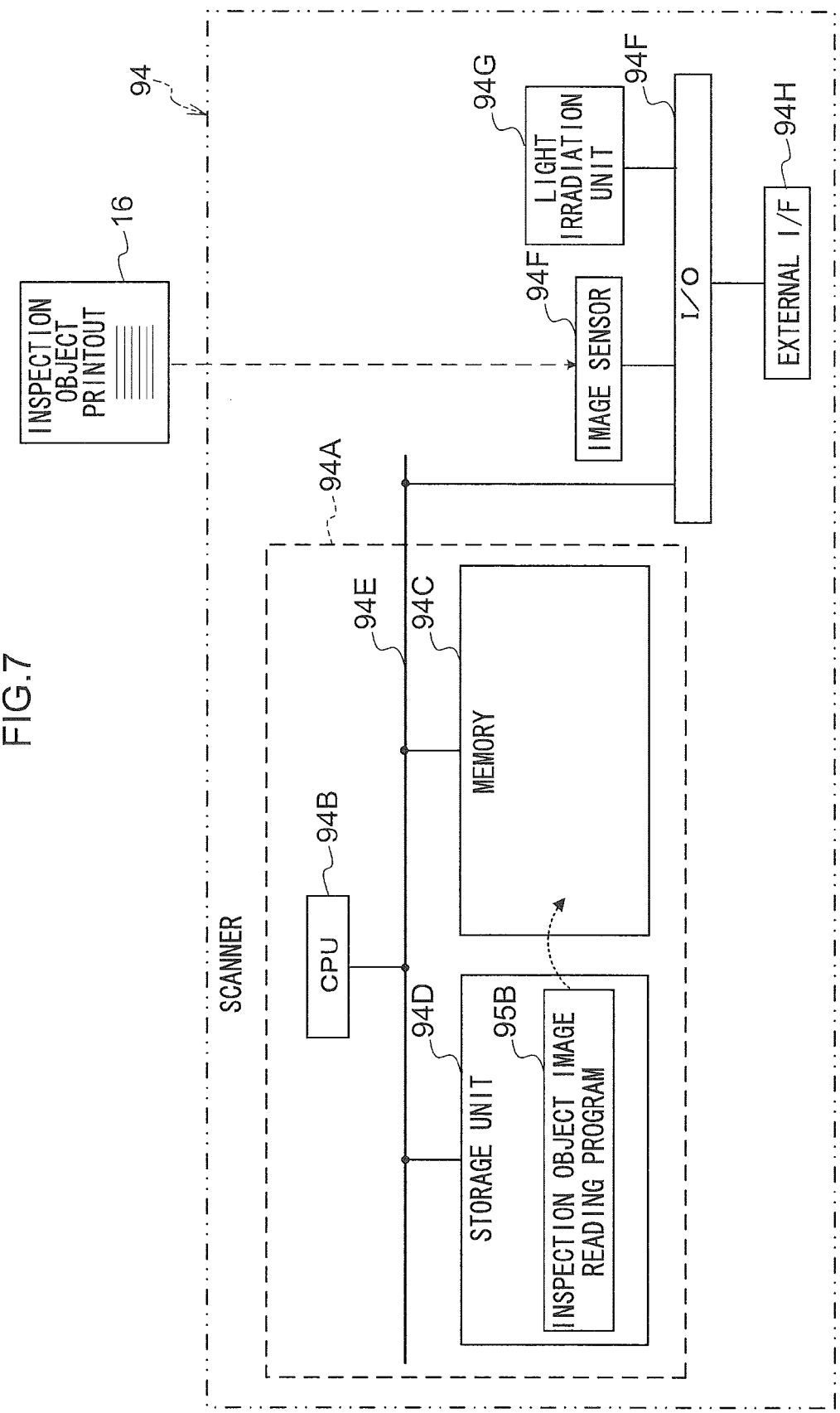
FIG. 7 is a block diagram illustrating an example of the configuration of an electrical system of a scanner that is included in the image evaluation device according to the first embodiment.

FIG. 7 illustrates an example of the main parts of an electrical system of the scanner 94. As illustrated in FIG. 7, the scanner 94 includes a computer 94A that is an example of the exclusion section 25. The computer 94A includes a CPU 94B, a memory 94C, and a non-volatile storage unit 94D, which are connected to each other through a bus 94E that includes an address bus, a system bus, or the like. The storage unit 94D is realized by SSD, HDD or the like. An inspection object image reading program 95B is stored in the storage unit 94D that is a storage medium.

The CPU 94B reads the inspection object image reading program 95B from the storage unit 94D, loads the inspection object image reading program 95B in the memory 94C, and sequentially executes processes included in the inspection object image reading program 95B.

The scanner 94 includes input/output devices. Further, the scanner 94 includes an I/O 94F that electrically connects the computer 94A to various input/output devices and controls transmission of various kinds of information between the computer 94A and the various input/output devices. The input/output devices are electrically connected to the computer 94A through the bus 94E by being connected to the I/O 94F. Here, an image sensor 94F that is an example of the reading section 23, a light irradiation unit 94 and an external I/F 94H are used as the input/output devices. The light irradiation unit 94G irradiates a reading surface (the surface on which the inspection object image to be read is printed) of the inspection object printout 16 with light. A white fluorescent lamp is used as the light irradiation unit 94G in the first embodiment, but other light sources may be used.

The image sensor 94F receives light that is reflected from the reading surface after the reading surface of the printout is irradiated with light by the light irradiation unit 94G, and outputs to the computer 94A image data obtained by performing photoelectric conversion on the received light. The computer 94A stores the input image data in the storage unit 94D. Charge Coupled Devices (CCD) are used as the image sensor 94F in the first embodiment, but other image sensors may be used.

The external I/F 94H is connected to the I/O 82 illustrated in FIG. 6, and controls transmission of various kinds of information between the computer 94A and the computer 60.

Figure 8:
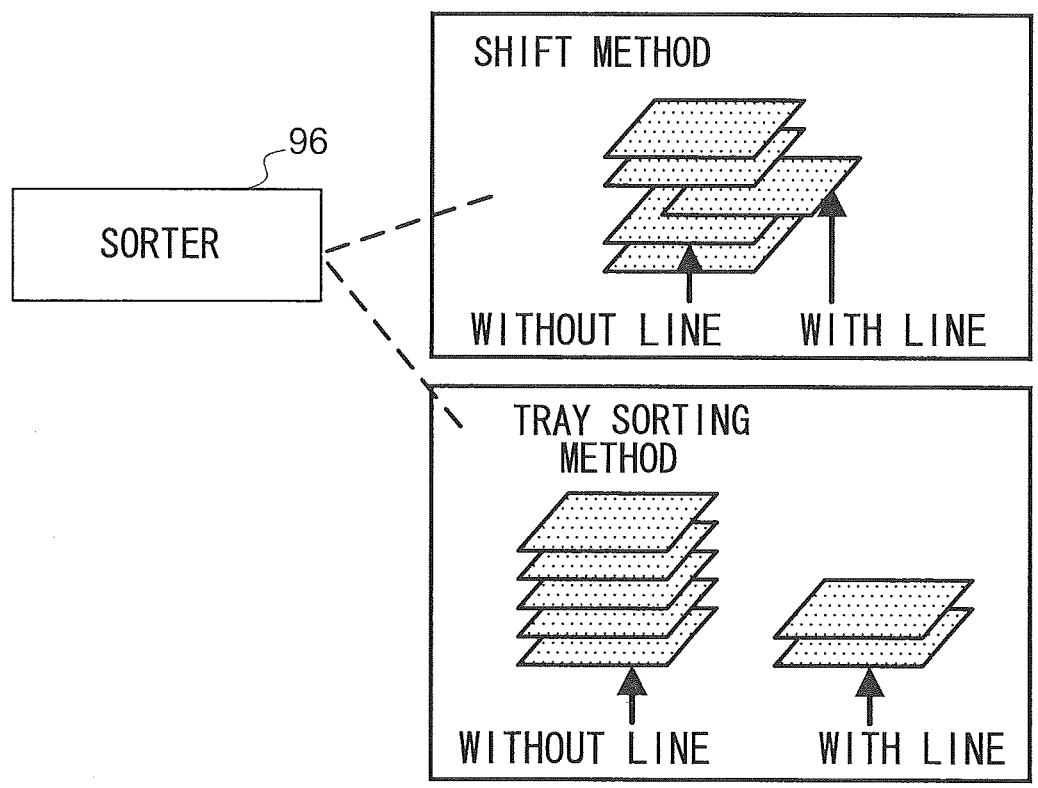
FIG. 8 is a schematic view illustrating examples of sorting methods performed by a sorter included in the image evaluation device according to the first embodiment.

The sorter 96 illustrated in FIG. 6 performs sorting processing. That is, the sorter 96 receives the inspection object printout 16 that is conveyed by the conveying unit 92, and sorts the received inspection object printout 16 based on the quality of the visibility of the inspection object image. In the first embodiment, two sorting methods are used for sorting the inspection object printout 16, and the sorting methods are switched according to a user's instruction. FIG. 8 schematically illustrates examples of the two sorting methods. As illustrated in FIG. 8, one of the two sorting methods is a "shift method" and the other is a "tray sorting method". The "shift method" indicates a sorting method in which, in a discharge tray of the inspection object printouts 16, inspection object printouts 16 of which the visibility has been evaluated as good are accumulated and aligned in a predetermined direction (for example, in a vertical direction) and inspection object printouts 16 of which the visibility have been evaluated as bad are displaced from the alignment. The "tray sorting method" indicates a method of discharging inspection object printouts 16 of which the visibility has been evaluated as good, and inspection object printouts 16 of which the visibility has been evaluated as bad to respectively different areas (for example, trays).

Figure 9:
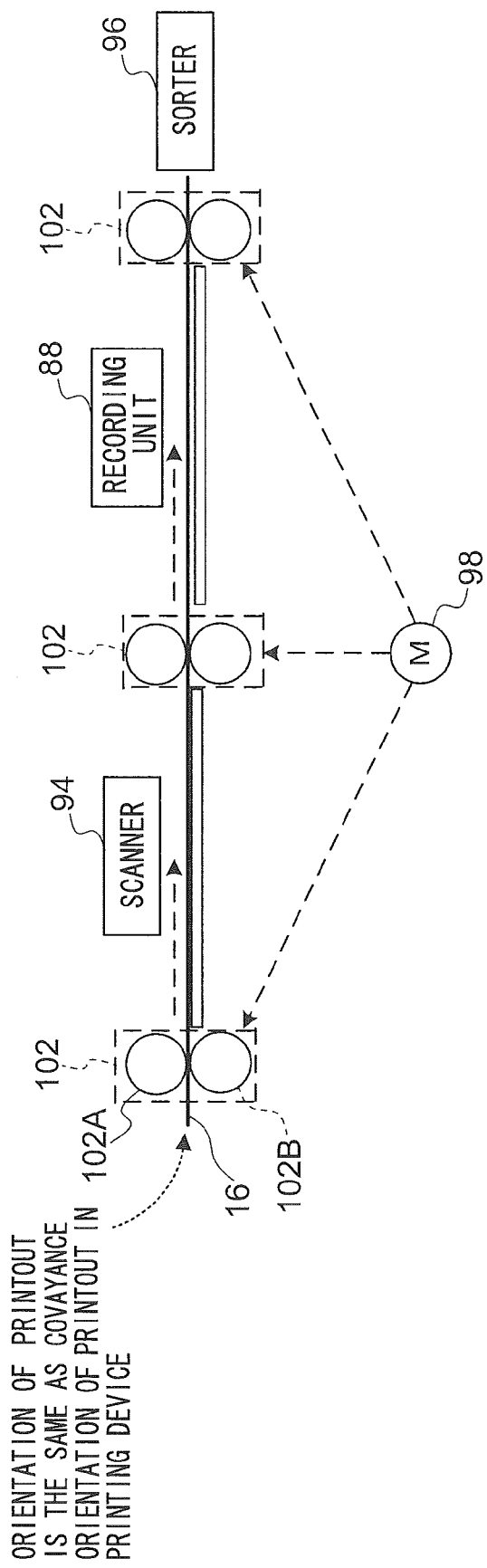
FIG. 9 is a schematic view illustrating an example of a conveying system of the image evaluation device according to the first embodiment and the peripheral configuration thereof, wherein the schematic view illustrates an example of a conveying method of a printout and an example of the dispositions of the scanner, the recording unit, and the sorter.

FIG. 9 schematically illustrates an example of the disposition of the recording unit 88, the scanner 94, and the sorter 96. As illustrated in FIG. 9, plural pairs of conveying rollers 102 are disposed along a conveying path of the inspection object printout 16. Further, the scanner 94 and the recording unit 88 are disposed along the conveying path in this order from the upstream side of the conveying direction of the inspection object printout 16, and the sorter 96 is disposed at the end of the conveying path so that it is capable of receiving the inspection object printout 16. Each of the pairs of conveying rollers 102 includes conveying rollers 102A and 102B that are rotated in opposite directions to each other due to a rotational driving force from the motor 98. An inspection object printout 16 is nipped between the conveying rollers 102A and 102B of the pair of conveying rollers 102, conveyed toward the reading position of the scanner 94 and the recording position of the recording unit 88, and sent to the sorter 96. In the first embodiment, the orientation of the inspection object printout 16 during conveyance in the image evaluation device 10 is the same as that of the inspection object printout 16 during conveyance in the printing device 12.

Figure 10:
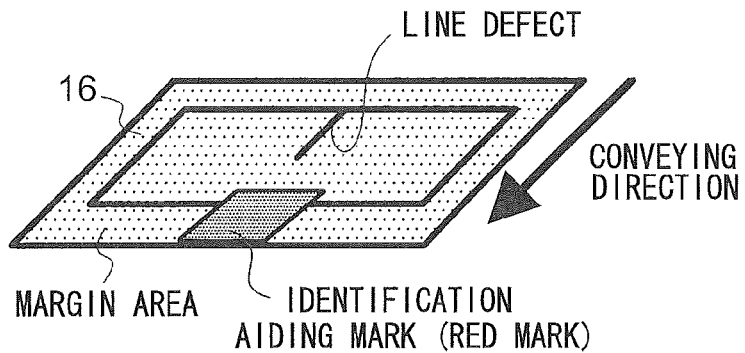
FIG. 10 is a schematic view illustrating an example of an inspection object printout on which an identification aiding mark is recorded by the recording unit included in the image evaluation device according to the first embodiment.
Figure 11:
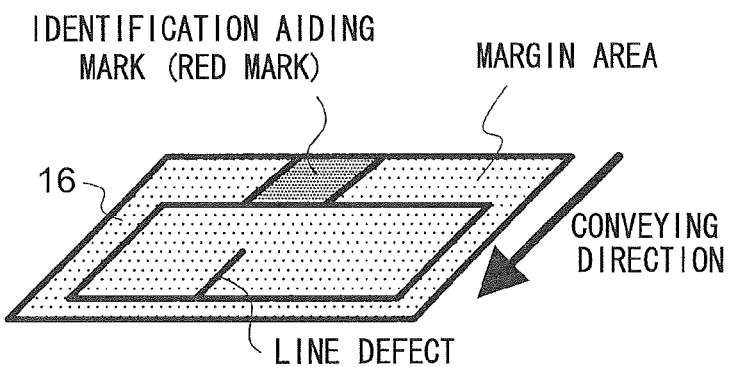
FIG. 11 is a schematic view illustrating another example of an inspection object printout on which a identification mark is recorded by the recording unit included in the image evaluation device according to the first embodiment, which is different from that illustrated in FIG. 10.
Figure 12:
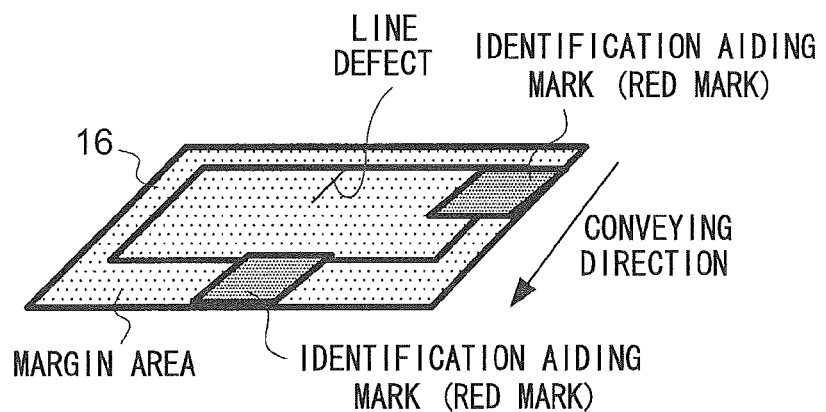
FIG. 12 is a schematic view illustrating yet another example of an inspection object printout on which a identification aiding mark is recorded by the recording unit included in the image evaluation device according to the first embodiment, which is different from those illustrated in FIGS. 10 and 11.

In a case in which an inspection object printout 16 of which the visibility has been evaluated as bad is conveyed along the conveying direction corresponding to the specific direction of the present embodiment, the recording unit 88 records an identification aiding mark that specifies the position of a line defect on the inspection object printout 16, for example, as illustrated in FIGS. 10 to 12. In the example illustrated in FIG. 10, an identification aiding mark is recorded at a position on the extension of a line defect in the conveying direction (for example, on the extension at the downstream side in the conveying direction) and at a margin area at the downstream side of the inspection object printout 16 (i.e., at a predetermined margin area at the outer peripheral edge at the downstream side). In the example illustrated in FIG. 11, an identification aiding mark is recorded at a position on the extension of a line defect in the conveying direction (for example, on the extension at the upstream side in the conveying direction) and at a margin area at the upstream side of the inspection object printout 16 (i.e., at a predetermined margin area at the outer peripheral edge at the upstream side). In an example illustrated in FIG. 12, an identification aiding mark is recorded at the same position as that in the example illustrated in FIG. 10, and another identification aiding mark is recorded at a position on the extension of the line defect in a direction crossing the conveying direction and at a margin area of the inspection object printout 16. Here, the "direction crossing the conveying direction" indicates a direction substantially orthogonal to the conveying direction.

In FIGS. 10 to 12, a red rectangular mark is used as the identification aiding mark. However, the identification aiding mark is not limited this and a mark having other color (preferably, a color different from the color of the recording sheet) or having other shape may be used.

Figure 13:
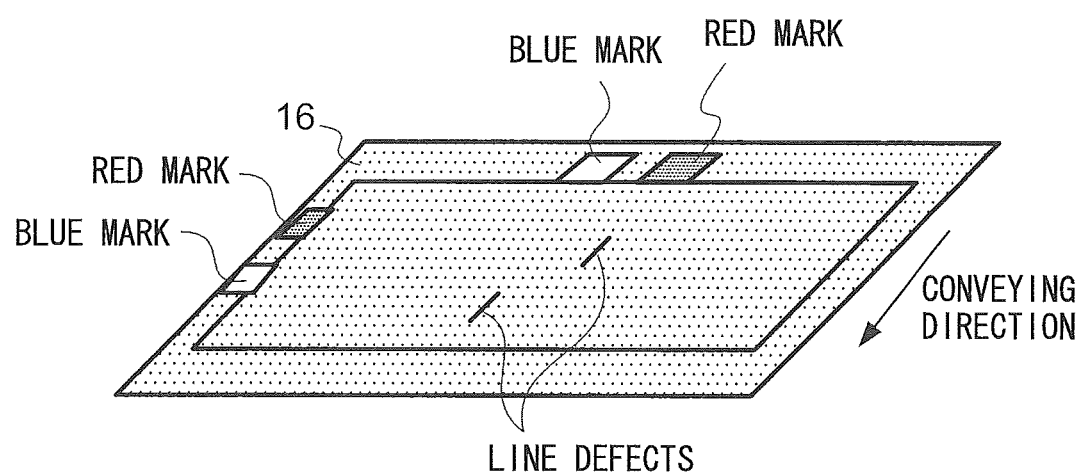
FIG. 13 is a schematic view illustrating yet another example of an inspection object printout on which a identification aiding mark is recorded by the recording unit included in the image evaluation device according to the first embodiment, which is different from those illustrated in FIGS. 10 to 12.

Moreover, if plural linear patterns having different levels of visibility (for example, area or density) are included in an inspection object printout 16, marks having different colors may be applied for the respective linear patterns. For example, as illustrated in FIG. 13, if two linear patterns having different levels of visibility are included in the inspection object printout 16, a red mark and a blue mark may be selectively recorded according to the levels of visibility at the positions on the extensions of the respective linear patterns in the conveying direction and at a margin area of the inspection object printout 16. Further, a red mark and a blue mark are also selectively recorded according to the levels of visibility at the positions on the extensions of the respective linear patterns in a direction crossing the conveying direction (here, for example, a direction substantially orthogonal to the conveying direction) and at a margin area of the inspection object printout 16. In the example illustrated in FIG. 13, the red mark indicates that the level of visibility of the corresponding linear pattern is higher than that of the blue mark.

Embodiments are not limited to the configuration described in the first embodiment in which a mark is recorded by the inkjet recording head. For example, a stamp or a seal may be used as the identification aiding mark. In cases of using a stamp, a stamping device capable of applying a stamp may be installed instead of the recording unit 88. In cases of using a seal, a seal sticking device capable of sticking a seal may be installed instead of the recording unit 88.

Next, as the operation of the first embodiment, image evaluation processing performed in the image evaluation device 10 as a result of the CPU 62 executing the image evaluation program 70 will be described with reference to FIG. 14. Here, in order to avoid complication, a case in which the inspection object printouts 16 are accommodated in advance in standby areas (for example, sheet feed trays) and are fed in the image evaluation device 10 one by one according to a user's instruction will be described. In this case, the inspection object printouts 16 are printouts obtained by variable printing performed by the printing device 12. Further, in this case, the sample image data expressing a virtual sample image corresponding to the inspection object printouts 16 are already stored in the sample image DB 13. Furthermore, in this case, all of the inspection object printouts 16 obtained by variable printing performed by the printing device 12 are accommodated in the standby area and all of the inspection object printouts 16 accommodated in the standby area are read by the scanner 94. Moreover, in order to avoid complication, description will be made here on the assumption that the orientation of the inspection object printout 16 that is fed in the image evaluation device 10 and conveyed is the same as the orientation of the inspection object printout 16 during being conveyed along the conveying path in the printing device 12. In addition, in this case, a "shift method" or a "tray sorting method" has been instructed in advance by a user as a sorting method.

Figure 14:
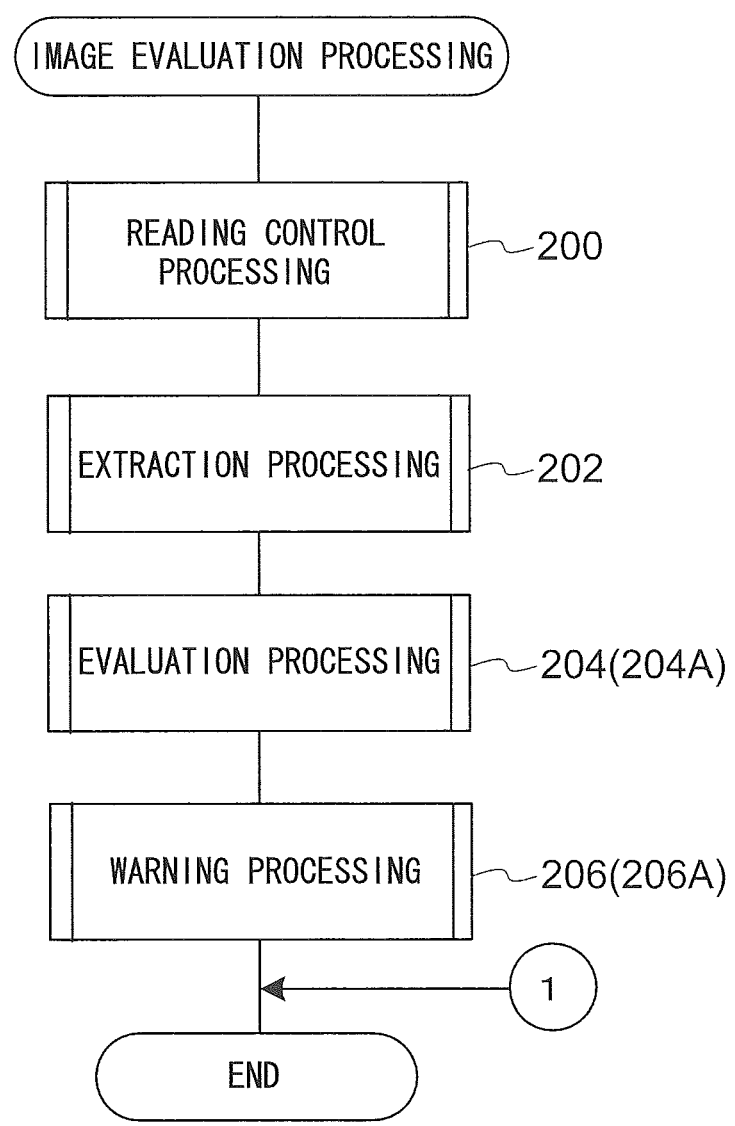
FIG. 14 is a flowchart illustrating an example of the flow of image evaluation processing according to the first to third embodiments.
Figure 15:
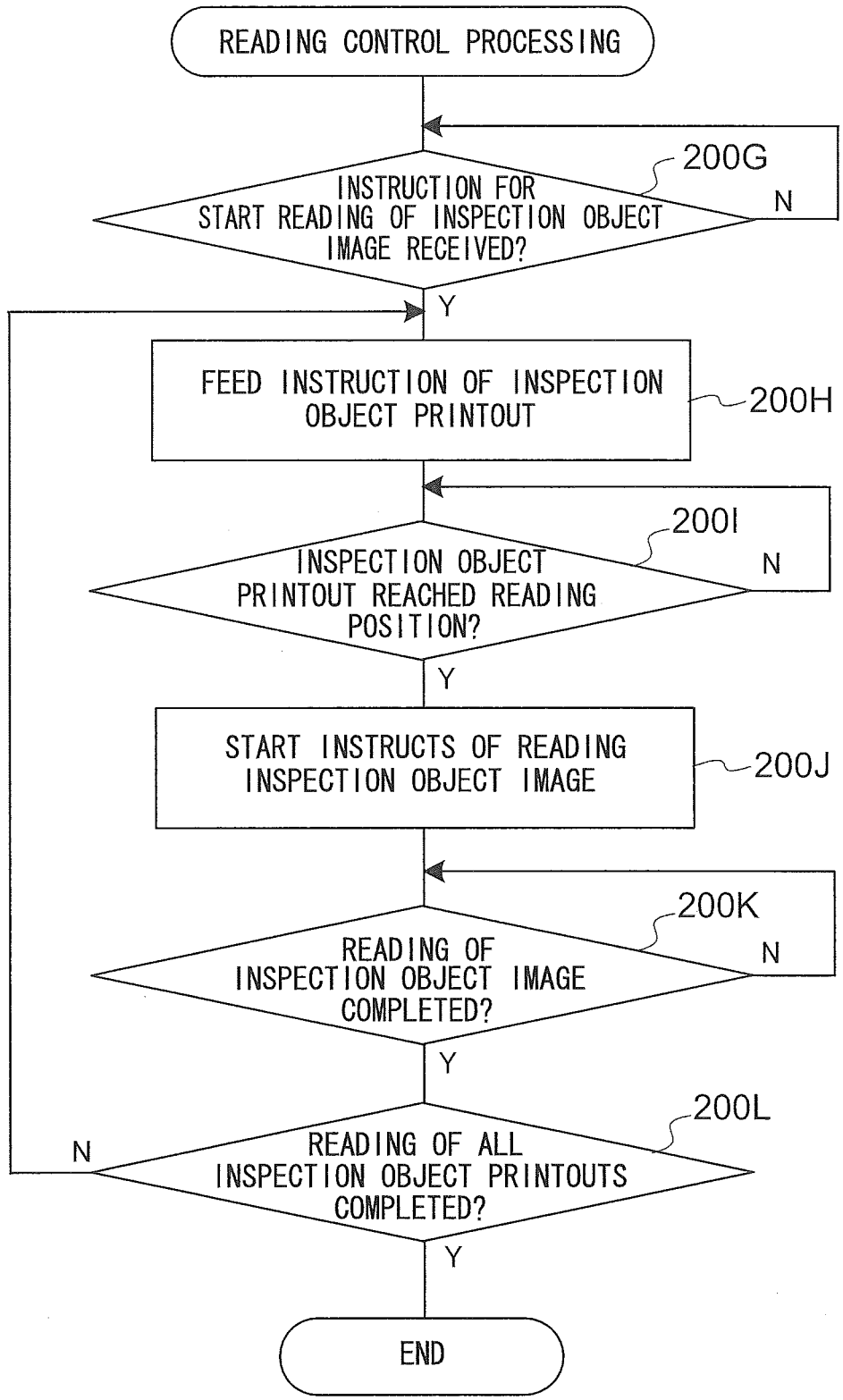
FIG. 15 is a flowchart illustrating an example of the flow of reading control processing that is included in the image evaluation processing according to the first embodiment.

In the image evaluation processing illustrated in FIG. 14, firstly, reading control processing is performed by the extraction unit 20 in Step 200, and then, the processing proceeds to Step 202. FIG. 15 illustrates an example of the flow of the reading control processing. In the reading control processing illustrated in FIG. 15, firstly, the extraction unit 20 determines whether or not the receiving unit 84 has received an instruction for starting reading of an inspection object image in Step 200G. If it is determined in Step 200G that the receiving unit 84 has received the instruction for starting the reading of the inspection object image, the determination is affirmative and the processing proceeds to Step 200H. Otherwise, determination is negative and the determination of Step 200G is repeated.

In Step 200H, the extraction unit 20 instructs the conveying unit 92 to feed in one sheet of the inspection object printout 16. In response to this, the conveying unit 92 feeds the inspection object printout 16 and conveys the inspection object printout 16 along the conveying path.

In next Step 200I, the extraction unit 20 determines whether or not the inspection object printout 16 has reached the reading position of the scanner 94. If it is determined in Step 200I that the inspection object printout 16 has reached the reading position of the scanner 94, the determination is affirmative and the processing proceeds to Step 200J. Otherwise, the determination is negative and the determination of Step 200I is repeated.

In Step 200J, the extraction unit 20 instructs the scanner 94 to start reading the inspection object image included in the inspection object printout 16, and then the processing proceeds to Step 200K. In Step 200K, the extraction unit 20 determines whether or not the scanner 94 has completed the reading of the inspection object image. If it is determined in Step 200K that the scanner 94 has completed the reading of the inspection object image, the determination is affirmative and the processing proceeds to Step 200L. Otherwise, the determination is negative and the determination of Step 200K is repeated.

In Step 200L, the extraction unit 20 determines whether or not the processing of Steps 200H to 200K has been performed on all of the inspection object printouts 16 accommodated in the standby area. If it is determined in Step 200L that the processing of Steps 200H to 200K has not been performed on all of the inspection object printouts 16, the determination is negative and the processing returns to Step 200H. Otherwise, the determination is affirmative and the reading control processing is ended.

Next, inspection object image reading processing, which is performed in the scanner 94 as a result of the CPU 94B of the scanner 94 executing an inspection object image reading program 95A will be described with reference to FIG. 16.

Figure 16:
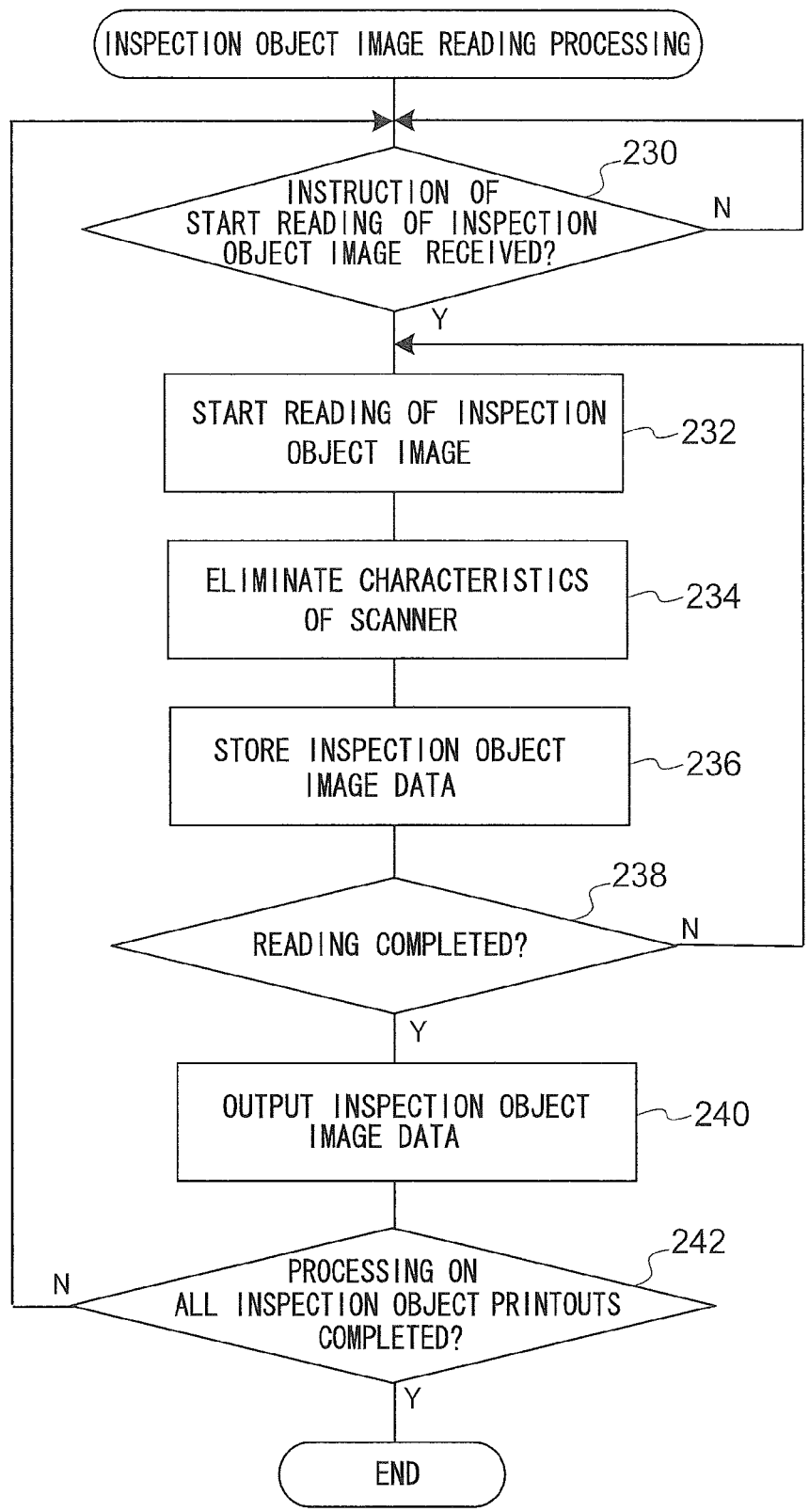
FIG. 16 is a flowchart illustrating an example of the flow of inspection object image reading processing according to the first embodiment.

In the inspection object image reading processing illustrated in FIG. 16, firstly, in Step 230, the exclusion section 25 determines whether or not the start of reading of the inspection object image has been instructed in Step 200J. If it is determined in Step 230 that the start of reading of the inspection object image has not been instructed, the determination is negative and the determination of Step 230 is repeated. Otherwise, the determination is affirmative and the processing proceeds to Step 232.

In Step 232, the exclusion section 25 causes the image sensor 94F to start reading of the inspection object image. As a result, the image sensor 94F acquires inspection object image data and outputs the acquired inspection object image data to the computer 94A.

In next Step 234, the exclusion section 25 eliminates the influence of the characteristics of the scanner 94 from the inspection object image data that has been input from the image sensor 94F. For example, the exclusion section 25 eliminates the influence of the characteristics of the image sensor 94F from the inspection object image data that are input from the image sensor 94F in Step 234.

After the influence of the characteristics of the image sensor 94F has been eliminated by the exclusion section 25 in Step 234, in next Step 236, the inspection object image data is stored in the storage unit 94D, and the processing proceeds to Step 738. In Step 238, the exclusion section 25 determines whether or not the reading of the inspection object image has been completed. If it is determined in Step 238 that the reading of the inspection objects image has not been completed, the determination is negative and the processing returns to Step 232. Otherwise, the determination is affirmative and the processing proceeds to Step 240.

In Step 240, the inspection object image data that has been stored in the storage unit 94D in Step 236 is output to the computer 60 of the image evaluation device 10 by the exclusion section 25.

In next Step 242, the exclusion section 25 determines whether or not the processing of Steps 230 to 240 has been performed on all of the inspection object printouts 16 accommodated in the standby area. If it is determined in Step 242 that the processing of Steps 230 to 240 has not been performed on all of the inspection object printouts 16, the determination is negative and the processing returns to Step 230. Otherwise, the determination is affirmative and the inspection object image reading processing is ended.

Figure 17:
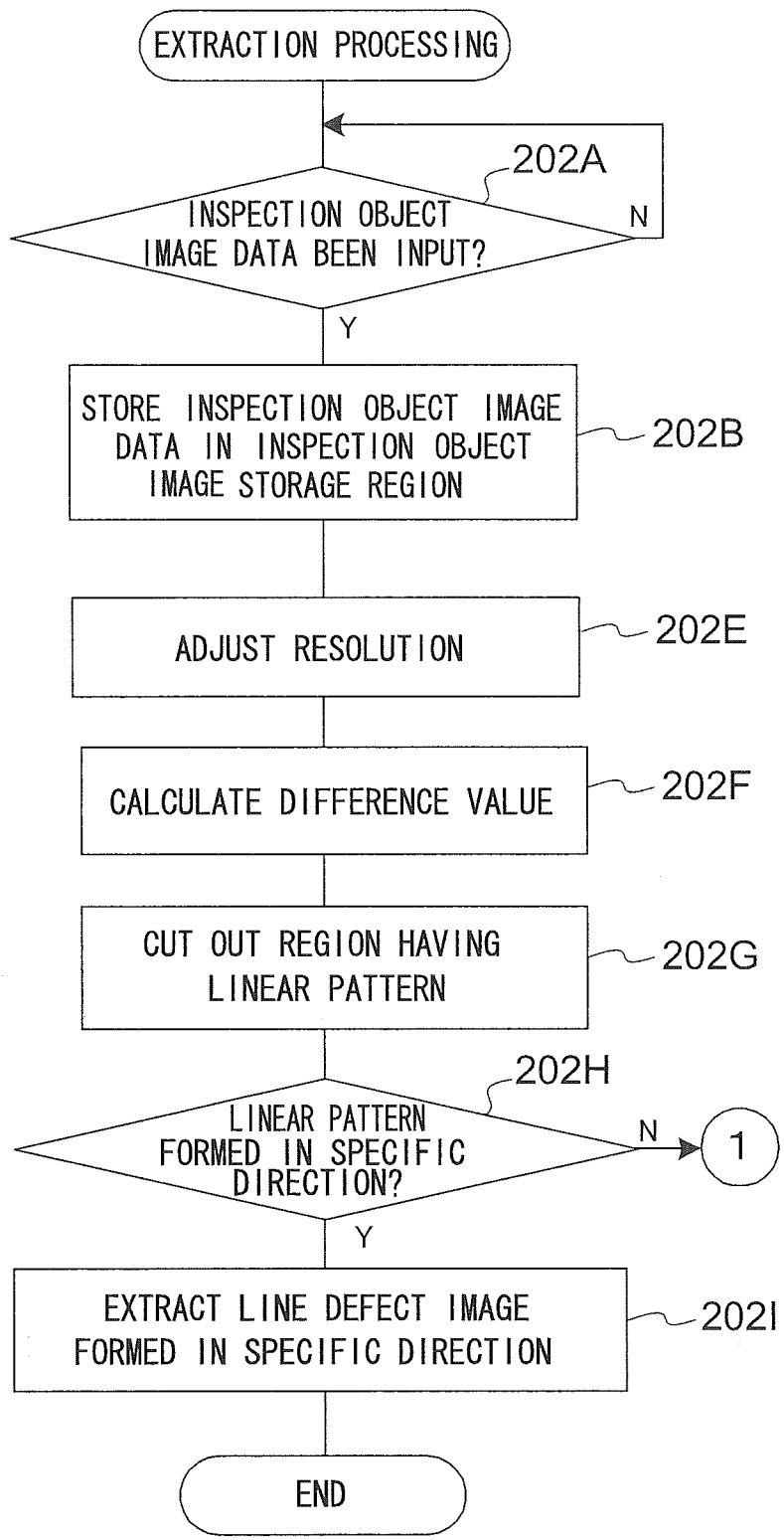
FIG. 17 is a flowchart illustrating an example of the flow of extraction processing that is included in the image evaluation processing according to the first embodiment.

Returning to FIG. 14, in the image evaluation processing, extraction processing is performed by the extraction unit 20 in Step 202, and then the processing proceeds to Step 204. An example of the flow of the extraction processing is illustrated in FIG. 17. In the extraction processing illustrated in FIG. 17, firstly, the resolution adjustment section 26 determines whether or not the inspection object image data have been input from the scanner 94 in Step 202A. If it is determined in Step 202A that the inspection object image data has not been input from the scanner 94, the determination is negative and the determination of Step 202A is repeated. Otherwise, the determination is affirmative and the processing proceeds to Step 202B.

In Step 202B, the inspection object image data input from the scanner 94 as a result of execution of Step 240 is stored in the inspection object image storage region 72 by, and then the processing proceeds to Step 202E. In Step 202E, the resolution adjustment section 26 adjusts the resolution of the inspection object image expressed by the inspection object image data stored in the inspection object image storage region 72, and then the processing proceeds to Step 202F. In Step 202E, the resolution adjustment section 26 adjusts the resolution of the inspection object image in the specific direction to be the same as the resolution in the main scanning direction by performing, for example, interpolation processing on pixels of the inspection object image corresponding to the specific direction.

In Step 202F, the subtraction section 28 calculates a difference value between the sample image data and the inspection object image data. For example, the subtraction section 28 calculates in Step 202F a difference value between the virtual sample image expressed by the sample image data stored in the sample image DB 13 and the inspection object image of which the resolution has been adjusted in Step 202E. Here, the "difference value" indicates, for example, the absolute value of the difference between the density of the virtual sample image and the density of the inspection object image. However, the difference value is not limited to the difference of density values, and may be a difference of reflectance values. Or, the difference value may be at least one of a difference of densities, a difference of color spaces, a difference of light values, a difference of luminances, or a difference of device signal values between the inspection object image and the virtual sample image.

In next Step 202G, the line region cut-out section 30 cuts out a line region from a predetermined region of the inspection object image of which the resolution has been adjusted in Step 202E, and then the processing proceeds to Step 202H. In Step 202H, the extraction section 32 determines whether or not there is a linear pattern formed in the specific direction and having a difference value (calculated in Step 202F) that exceeds a predetermined value in the line region cut out in the Step 202G. Here, the "predetermined value" indicates, for example, a value that is predetermined as a difference value of a linear pattern recognized as a defect of an image, and that is obtained from a test, a simulation, or the like performed by an actual machine. If it is determined in Step 202H that the linear pattern formed in the specific direction and having a difference value (calculated in Step 202F) that exceeds the predetermined value is not present in the line region, the determination is negative and the image evaluation processing illustrated in FIG. 14 is ended. Otherwise, the determination is affirmative and the processing proceeds to Step 202I.

In Step 202I, the extraction section 32 extracts a line defect image formed in the specific direction, and the extraction processing is ended.

Figure 18:
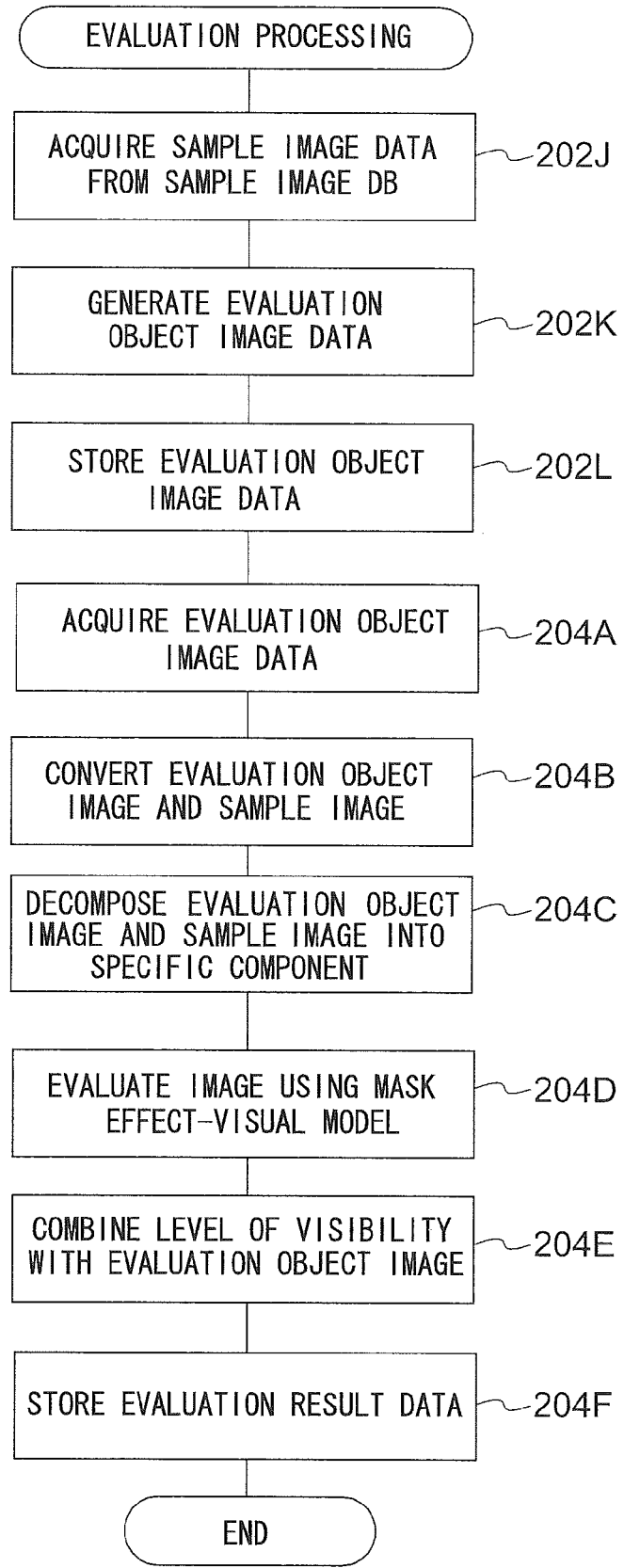
FIG. 18 is a flowchart illustrating an example of the flow of evaluation processing that is included in the image evaluation processing according to the first embodiment.

Returning to FIG. 14, in the image evaluation processing, evaluation processing is performed by the evaluation unit 22 in Step 204, and then the processing proceeds to Step 206. An example of the flow of the evaluation processing is illustrated in FIG. 18. In the evaluation processing illustrated in FIG. 18, firstly, the first image combining section 34 acquires the sample image data (for example, the sample image data used in Step 202F) from the sample image DB 13 in Step 202J, and then the processing proceeds to Step 202K. In Step 202K, the first image combining section 34 combines the line defect image extracted in Step 202I and the virtual sample image expressed by the sample image data acquired in Step 202J, and generates evaluation object image data. In the next step 202L, the first image combining section 34 stores the evaluation object image data generated in Step 202K in the storage unit 66, and the processing proceeds to Step 204A.

In next Step 204A, the conversion section 36 acquires the evaluation object image data from the storage unit 66, and then the processing proceeds to step 204B. In Step 204B, the conversion section 36 performs color conversion and visual filtering on an evaluation object image expressed by the evaluation object image data acquired in Step 204A and the virtual sample image expressed by the sample image data acquired in Step 202J.

In next Step 204C, the specific component decomposing section 38 decomposes each of the evaluation object image and the virtual sample image, to which the color conversion and the visual filtering have been performed in Step 204B, in plural spatial frequencies and plural directions by, and generates plural frequency-decomposed images and plural direction-decomposed images.

In next Step 204D, the visual model evaluation section 42 evaluates the visibility of a line defect, which is specified by the line defect image extracted in Step 202I, using a mask effect-visual model, and generates visibility level data. Specifically, the visual model evaluation section 42 evaluates the visibility of an image obtained by reflecting the influence of at least one other decomposed image to each of the decomposed images obtained in Step 204C, and generates the visibility level data.

In next Step 204E, the second image combining section 40 combines the plural frequency-decomposed images and the plural direction-decomposed images with the evaluation object image expressed by the evaluation object image data acquired in Step 204A, and generates evaluation result data expressing a final combined image.

In next Step 204F, the visual model evaluation section 42 stores the evaluation result data generated in Step 204E in the storage unit 66, and then the evaluation processing is ended.

Figure 19:
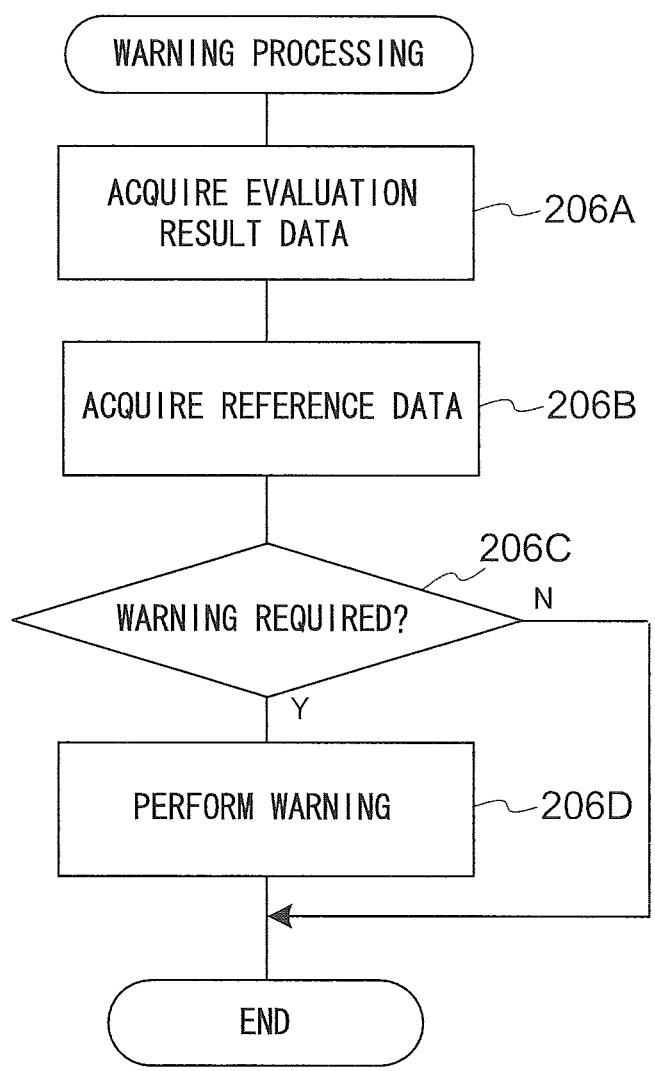
FIG. 19 is a flowchart illustrating an example of the flow of warning processing that is included in the image evaluation processing according to the first embodiment.

Returning to FIG. 14, in the image evaluation processing, warning processing is performed by the warning unit 24 in Step 206, and then the image evaluation processing is ended. An example of the flow of the warning processing is illustrated in FIG. 19. In the warning processing illustrated in FIG. 19, firstly, the warning determination section 44 acquires the evaluation result data from the storage unit 66 in Step 206A, and then the processing proceeds to Step 206B. In Step 206B, the warning determination section 44 acquires the reference data from the reference DB 46, and then the processing proceeds to 206C.

In Step 206C, the warning determination section 44 determines whether or not the level of visibility of the line defect specified by the line defect image extracted in Step 202I is a level that requires a warning by referring to the reference data of the reference DB 46. For example, in Step 206C, the warning determination section 11 determines whether or not the level of visibility represented by the visibility level data included in the evaluation result data is a level that requires a warning, with reference to the determination data that is an example of the reference data. If it is determined in Step 206C that the level of visibility of the line defect is a level that does not require a warning, the determination is negative and the warning processing is ended. Otherwise, the determination is affirmative and the processing proceeds to Step 206D.

In Step 206D, the warning section 48 performs a warning. For example, if the "shift method" has been instructed, the warning section 48 controls the sorter 96 so that an inspection object printout 16 that has an inacceptable linear pattern is displaced from (for example, shift out of) the other inspection object printouts 16 that are aligned, as illustrated in FIG. 8. Alternatively, if the "tray sorting method" has been instructed, the warning section 48 controls the sorter 96 so that inspection object printouts 16 that have inacceptable linear patterns and the other inspection object printouts 16 are separately sorted, as illustrated in FIG. 8.

Further, in Step 206D, the warning section 48 causes the display unit 86 to display predetermined information if a line defect that is specified by the line defect image is evaluated as a visible line defect (i.e., if the level of visibility expressed by the visibility level data included in the evaluation result data is equal to or greater than a predetermined level). Here, the "predetermined information" indicates, for example, specific information that identifies the inspection object printout 16 including the line defect that has been evaluated as a visible line defect by the evaluation unit 22.

Figure 20:
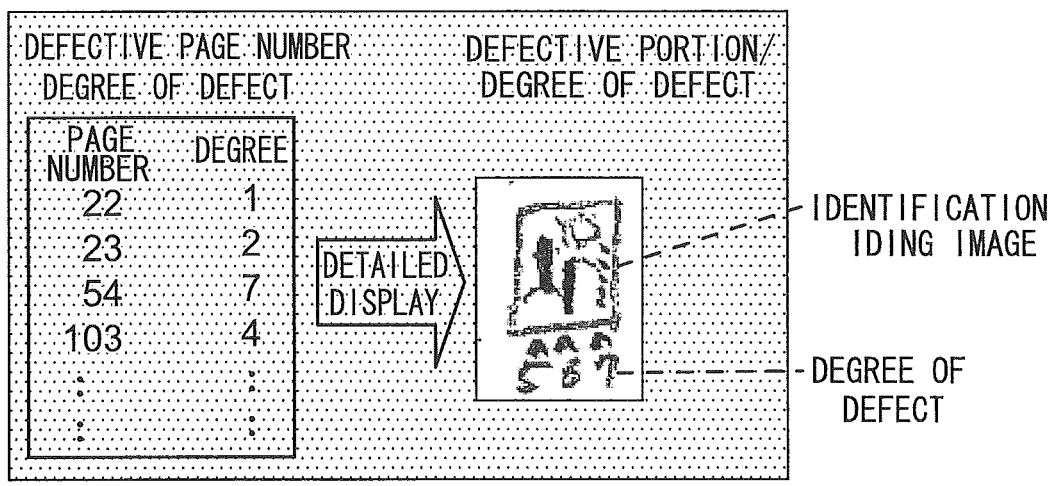
FIG. 20 is a diagram illustrating an example of a display performed by a display unit that is included in the image evaluation device according to the first embodiment.

Examples of the specific information include a defective page number as illustrated in FIG. 20. Here, the "defective page number" indicates a serial number of the inspection object printout 16 of which the inspection object image has been read by the scanner 94. That is, the "defective page number" indicates a page number of an inspection object printout 16 that includes a line defect evaluated as a visible line defect by the evaluation unit 22. In the example illustrated in FIG. 20, the level of visibility of the line defect included in the inspection object printout 16 specified by the defective page number, is also displayed on the display unit 86 together with the defective page number. Furthermore, in the example illustrated in FIG. 20, the inspection object image of the inspection object printout 16 identified by the defective page number is displayed on the display unit 86 together with the numeral value expressing the degree of the defect (the numeral value corresponding to the level of visibility of the line defect). Moreover, in the example illustrated in FIG. 20, an identification aiding image that facilitates identification of the position of the line defect of the inspection object image is also displayed on the display unit 86 while being superimposed on the inspection object image. The identification aiding image indicates, for example, marks that correspond to the red mark or the blue mark illustrated in FIG. 13 (marks corresponding to the degree of the defect). In this case, each of the marks is displayed at a position that can specify the position of the line defect of the inspection object image.

Embodiments are not limited to the configuration of the first embodiment in which the degree of the line defect is recognizable by the color of the mark. The degree of the line defect may be indicated by highlighting or the size of the mark. Furthermore, a configuration in which a low-degree line defect is indicated with color and a high-degree line defect is indicated by flickering may also be adopted.

Further, embodiments are not limited to the configuration of the first embodiment in which visible indications of line defects are performed by the display unit 86. For example, permanent visible indication using a printer or audible indication using a sound reproducing device may be performed. Or, combinations of at least two of visible indication using the display unit 86, permanent visible indication using a printer, or audible indication using a sound reproducing device may be performed. The visible indication may be performed by a display unit of other devices such as a portable terminal unit or a tablet terminal unit. Communication means used for performing the visible indication by the display unit is not limited to wire communication, and wireless communication based on BlueTooth®, wireless local area network (LAN) or the like may be used.

Figure 37:
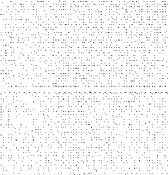
FIG. 37 is a schematic view illustrating an example of evaluation results that are obtained by the evaluation unit according to the first embodiment.

FIG. 37 schematically illustrates an example of evaluation results of a case in which the image evaluation processing is performed on a virtual sample image and an inspection object image that do not have granular patterns and of a case in which the image evaluation processing is performed on a virtual sample image and an inspection object image that have granular patterns. As illustrated in FIG. 37, a visible linear pattern has not been detected at a position of a linear pattern expressed by a simple image difference (a difference value between the virtual sample image and the inspection object image) in the case in which the visibility of the inspection object image having a granular pattern is evaluated using a visual model with a mask effect. In this case, a result of subjective evaluation by a terser would be that a linear pattern is not visible. In contrast, a visible linear pattern is detected at substantially the same position as the position of the linear pattern expressed by a simple image difference in a case in which the visibility of the inspection object image that does not have a granular pattern is evaluated using a visual model with a mask effect. In this case, a result of subjective evaluation by a tester would be that a linear pattern is easily visible. Further, the example illustrated in FIG. 37 shows that a linear pattern is detected at the substantially same position as the position of the linear pattern expressed by the simple image difference, in a case in which the visibility of the inspection object image is evaluated using a visual model without a mask effect, regardless of the presence or absence of a granular pattern.

As described above, in the image evaluation device 10 according to the first embodiment, sample image data representing a virtual sample image are stored in advance in the sample image DB 13. A line defect image is extracted from the inspection object image based on a difference value between the sample image data that are stored in the sample image DB 13 and the inspection object image data that are read by the reading unit 18. The visibility of a line defect that is indicated by the line defect image extracted by the extraction unit 20 is evaluated by the evaluation unit 22. Accordingly, it is possible to quickly perform the accurate determination of whether or not the inspection object printout 16 has an inacceptable line defect, as compared to a case in which the above configuration is not provided.

The image evaluation device 10 according to the first embodiment uses sample image data in which the influence of the characteristics of the reading unit 18 is not reflected. That is, the first embodiment includes a configuration for eliminating the influence of the characteristics of the reading unit 18 from the inspection object image data. Furthermore, the line defect image is extracted from the inspection object image based on the difference value between the sample image data and the inspection object image data from which the influence of the characteristics of the reading unit 18 has been eliminated. Accordingly, it is possible to accurately extract a line defect image, as compared to a case in which the above configuration is not provided.

In the image evaluation device 10 according to the first embodiment, the characteristics of the reading unit 18 include time degradation characteristics of the components of the reading unit 18. Accordingly, it is possible to more accurately extract a line defect image as compared to a case in which this configuration is not provided.

Further, the image evaluation device 10 according to the first embodiment uses sample image data in which the influence of the non-formation factor characteristics that is characteristics of the printing device 12 and that do not constitute factors of forming a line defect is not reflected. That is, the first embodiment includes a configuration for eliminating the influence of the non-formation factor characteristics from the inspection object image data. Moreover, a line defect image is extracted from the inspection object image based on a difference value between the sample image data and the inspection object image data from which the influence of the non-formation factor characteristics has been eliminated. Accordingly, it is possible to accurately extract the line defect image as compared to a case in which this configuration is not provided.

In the image evaluation device 10 according to the first embodiment, the object of evaluation of the evaluation unit 22 is a line defect indicated by a line defect image having a spatial frequency corresponding to the human visual characteristics. Accordingly, it is possible to improve the evaluation accuracy of the visibility of the line defect as compared to a case in which this configuration is not provided.

Further, in the image evaluation device 10 according to the first embodiment, the object of evaluation of the evaluation unit 22 is a line defect indicated by a line defect image having a color space corresponding to the human visual characteristics. Accordingly, it is possible to improve the evaluation accuracy of the visibility of the line defect as compared to a case in which this configuration is not provided.

The image evaluation device 10 according to the first embodiment performs extraction of a line defect image with respect to a predetermined region of the inspection object image expressed by inspection object image data. Accordingly, it is possible to reduce the load of processing as compared to a case in which this configuration is not provided.

Further, the image evaluation device 10 according to the first embodiment performs extraction of a line defect image with respect to a region in which a line defect is expected to be formed. Accordingly, it is possible to reduce the load of the processing while preventing deterioration of the evaluation accuracy as compared to a case in which this configuration is not provided.

In the image evaluation device 10 according to the first embodiment, a region that is determined based on the characteristics of at least one of the printing device 12 and the reading unit 18 is used as the region in which a line defect is expected to be formed. Accordingly, it is possible to accurately extract a line defect image indicating a line defect formed in the specific direction by a simple configuration, as compared to a case in which this configuration is not provided.

In the image evaluation device 10 according to the first embodiment, the time degradation characteristics of the components of the printing device 12 are used as one factor of the characteristics of the printing device 12 that is used for determining the region in which a line defect is expected to be formed. Accordingly, it is possible to more accurately extract a line defect image indicating a line defect formed in the specific direction, as compared to a case in which this configuration is not provided.

Further, in the image evaluation device 10 according to the first embodiment, the time degradation characteristics of the components of the reading unit 18 are used as one factor of the characteristics of the reading unit 18 that is used for determining the region in which a line defect is expected to be formed. Accordingly, it is possible to more accurately extract a line defect image indicating a line defect formed in the specific direction, as compared to a case in which this configuration is not provided.

In the image evaluation device 10 according to the first embodiment, the specific direction corresponds to the conveying direction of a recording sheet in the printing device 12. Accordingly, it is possible to more accurately extract a line defect formed in the specific direction, as compared to a case in which this configuration is not provided.

In the image evaluation device 10 according to the first embodiment, a single-pass method is used as the printing method of the printing device 12. Accordingly, it is possible to accurately extract a line defect image indicating a line defect formed in the specific direction, as compared to a case in which this configuration is not provided.

In the image evaluation device 10 according to the first embodiment, an inspection object image is read such that the resolution in the specific direction is lower than the resolution in a direction crossing the specific direction. Accordingly, it is possible to reduce the load of the reading processing, as compared to a case in which this configuration is not provided.

In the image evaluation device 10 according to the first embodiment, a difference value between the sample image data and the inspection object image data is calculated after the inspection object image is read and the resolution in the specific direction is adjusted to be the same as the resolution in the direction crossing the specific direction. Accordingly, it is possible to more accurately extract a line defect image indicating a line defect formed in the specific direction, as compared to a case in which this configuration is not provided.

The image evaluation device 10 according to the first embodiment evaluates the visibility of a line defect image by the evaluation unit 22 using a visual model with a mask effect. Accordingly, it is possible to more accurately determine whether or not the inspection object printout 16 on which the inspection object image is printed includes an inacceptable line defect, as compared to a case in which this configuration is not provided.

Further, the image evaluation device 10 according to the first embodiment evaluates the visibility of a line defect image using a visual model with mask effect based on an evaluation object image obtained by combining the line defect image with a sample image and on a virtual sample image expressed by sample image data. Accordingly, it is possible to improve the evaluation accuracy of the visibility of a line defect as compared to a case in which this configuration is not provided.

Furthermore, the image evaluation device 10 according to the first embodiment obtains frequency-decomposed images for plural spatial frequencies and direction-decomposed images for plural directions by decomposing an evaluation object image and a virtual sample image expressed by sample image data, into plural spatial frequencies and plural directions. Accordingly, it is possible to improve the evaluation accuracy of the visibility of a line defect as compared to a case in which this configuration is not provided.

The image evaluation device 10 according to the first embodiment has a configuration in which a warning is performed if it is determined that a line defect of which the visibility has been evaluated by the evaluation unit 22 is a visible line defect. Accordingly, it is possible for a user to easily recognize an inspection object printout 16 including an inacceptable line defect as compared to a case in which this configuration is not provided.

Further, the image evaluation device 10 according to the first embodiment has a configuration in which the warning is performed by directly processing the inspection object printout 16 including the line defect that is determined as a visible line defect. Accordingly, it is possible for a user to identify the inspection object printout 16 including an inacceptable line defect by a simple configuration, as compared to a case in which this configuration is not provided.

Further, the image evaluation device 10 according to the first embodiment has a configuration in which the warning is performed by adding to the inspection object printout 16 an identification aiding mark that facilitates identification of the position of the line defect in the inspection object printout 16. Accordingly, it is possible for a user to easily recognize the position of the line defect by a simple configuration as compared to a case in which this configuration is not provided.

The image evaluation device 10 according to the first embodiment has a configuration in which the warning is performed by adding the identification aiding mark at a position on the extension of the line defect of the inspection object printout 16 in the specific direction. Accordingly, it is possible for a user to more easily recognize the position of the line defect by a simple configuration as compared to a case in which this configuration is not provided.

The image evaluation device 10 according to the first embodiment has a configuration in which the type of the identification aiding mark is determined according to the level of the visibility of a line defect. Accordingly, it is possible for a user to easily recognize the level of the visibility of the line defect as compared to a case in which this configuration is not provided.

The image evaluation device 10 according to the first embodiment has a configuration in which the warning is performed by displaying by the display unit 86 predetermined information if a line defect of which the visibility has been evaluated by the evaluation unit 22 is determined as a visible line defect. Accordingly, it is possible for a user to easily recognize an inspection object printout 16 that has an inacceptable line defect as compared to a case in which this configuration is not provided.

In the image evaluation device 10 according to the first embodiment, the predetermined information that is displayed on the display unit 86 includes identification information that identifies an inspection object printout including a line defect that is determined as a visible line defect. Accordingly, it is possible for a user to identify an inspection object printout 16 on which an inspection object image having an inacceptable line defect is printed by a simple configuration, as compared to a case in which this configuration is not provided.

Moreover, in the image evaluation device 10 according to the first embodiment, the predetermined information that is displayed on the display unit 86 includes an inspection object image including a line defect and an identification aiding image that facilitates identification of the position of the line defect in the inspection object image. Accordingly, it is possible for a user to easily recognize the position of the line defect by a simple configuration as compared to a case in which this configuration is not provided.

Embodiments are not limited to the configuration of the first embodiment in which the color conversion and the visual filtering are performed by the evaluation unit 22. Further, embodiments are not limited to the configuration of the first embodiment in which the cut-out of a line region is performed by the extraction unit 20. An embodiment may be realized even if an extraction unit 20A illustrated in FIG. 21 is used in place of the extraction unit 20 illustrated in FIG. 3 and if the conversion section 36 is removed from the evaluation unit 22.

Figure 21:
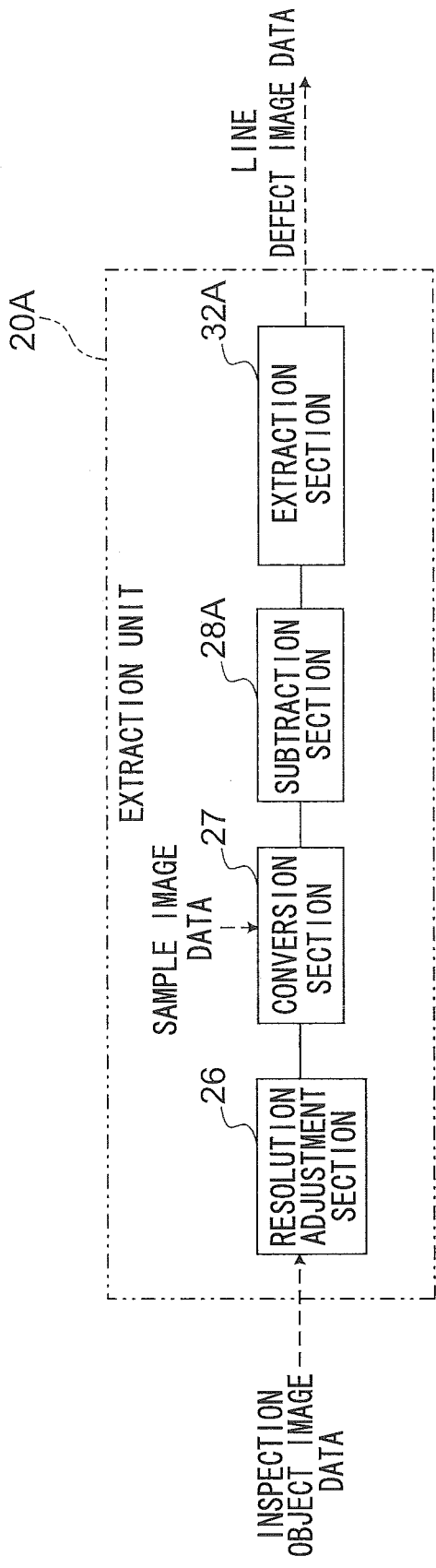
FIG. 21 is a functional block diagram illustrating a first modification of the extraction unit that is included in the image evaluation device according to the first embodiment.

The extraction unit 20A illustrated in FIG. 21 differs from the extraction unit 20 illustrated in FIG. 3 in that a subtraction section 28A is provided in place of the subtraction section 28, a conversion section 27 is interposed between the resolution adjustment section 26 and the subtraction section 28A, and the line region cut-out section 30 is removed. Further, the extraction unit 20A illustrated in FIG. 21 differs from the extraction unit 20 illustrated in FIG. 3 in that a specific direction-image extraction section 32A (extraction section 32A) is provided in place of the extraction section 32.

In the configuration illustrated in FIG. 21, the conversion section 27 performs color conversion and visual filtering on a virtual sample image expressed by sample image data and an inspection object image of which the resolution has been adjusted. Although an example in which color conversion and visual filtering are performed on the virtual sample image is described here, the color conversion and the visual filtering may be omitted if the color space and spatial frequencies to be converted are already reflected to the sample image data at the time of generation.

In the configuration of FIG. 21, the subtraction section 28A calculates a difference value between the sample image data expressing the virtual sample image and the inspection object image data, which are subjected to the color conversion and the visual filtering by the conversion section 27. That is, the subtraction section 28A calculates a difference value of the densities between the virtual sample image and the inspection object image, which are subjected to the color conversion and the visual filtering by the conversion section 27. The extraction section 32A extracts a line defect formed in a specific direction from the inspection object image on which the color conversion and the visual filtering have been performed by the conversion section 27, based on the difference value calculated by the subtraction section 28A.

Embodiments are not limited to the configuration of the first embodiment in which the visibility of a line defect is evaluated using a visual model with mask effect based on frequency-decomposed images and direction-decomposed images obtained by decomposing the evaluation object image and the virtual sample image expressed by the sample image data into plural spatial frequencies and plural directions. For example, the visibility of a line defect may be evaluated using a visual model with mask effect for the specific direction, based on the frequency-decomposed images and the direction-decomposed images. In this case, it is possible to improve the evaluation accuracy of the visibility of the line defect by a simple configuration as compared to a case in which this configuration is not provided.

Figure 22:
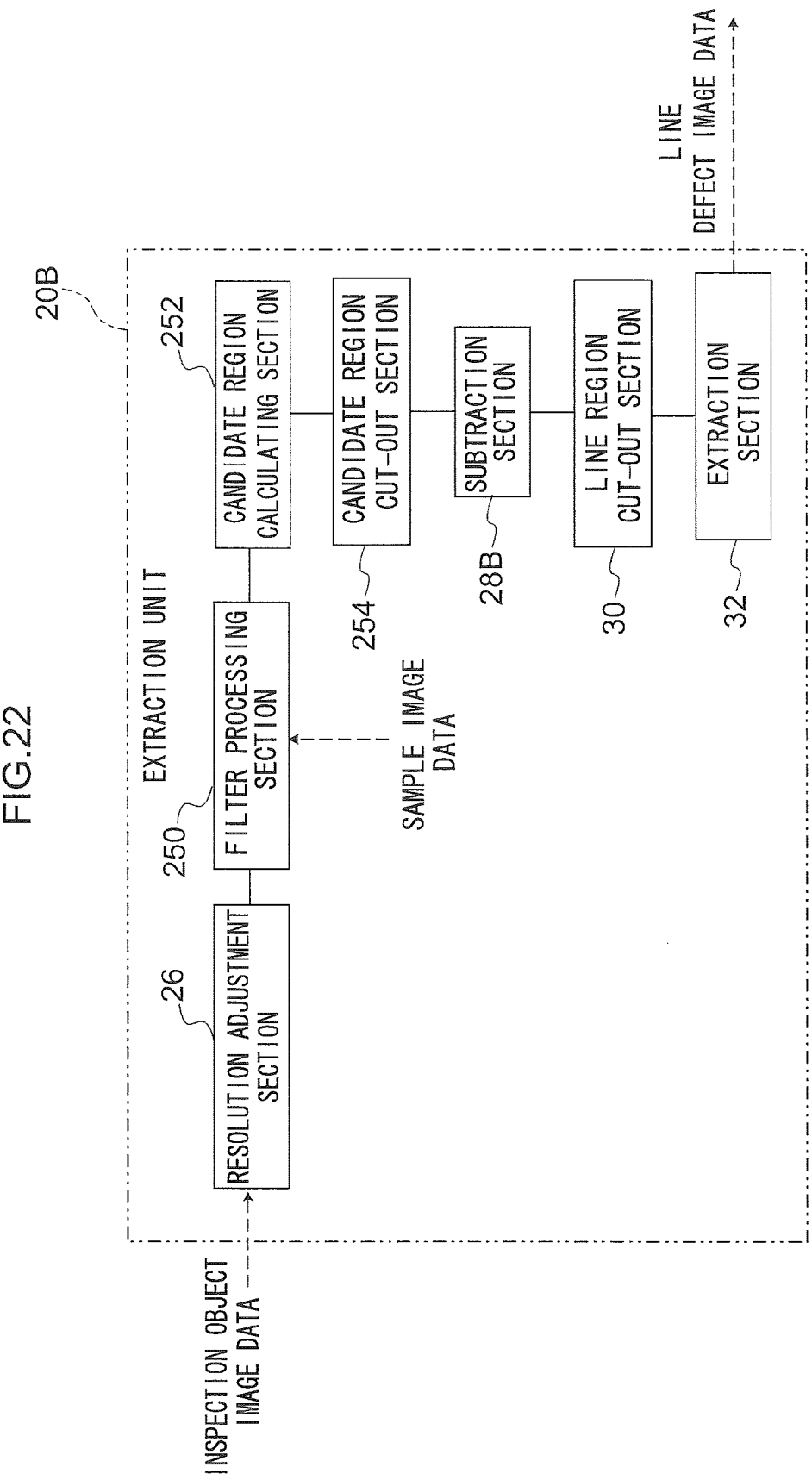
FIG. 22 is a functional block diagram illustrating a second modification of the extraction unit that is included in the image evaluation device according to the first embodiment.

Embodiments are not limited to the configuration of the first embodiment in which the evaluation unit 22 evaluates the quality of the visibility of the evaluation object image expressed by the evaluation object image data generated by the first image combining section 34. For example, the evaluation unit 22 may evaluate the quality of the visibility of a part of the evaluation object image. In this case, for example, an extraction unit 20B illustrated in FIG. 22 may be used in place of the extraction unit 20 illustrated in FIG. 3. The extraction unit 20B illustrated in FIG. 22 differs from the extraction unit 20 illustrated in FIG. 3 in that a subtraction section 28B is provided in place of the subtraction section 28, and a filter processing section 250, a candidate region calculating section 252, and a candidate region cut-out section 254 are provided between the resolution adjustment section 26 and the subtraction section 28B. The filter processing section 250 performs visual filtering on the inspection object image of which the resolution has been adjusted and the virtual sample image expressed by the sample image data.

The candidate region calculating section 252 calculates at least one of a difference of densities, a difference of color spaces, a difference of light values, a difference of luminances, a difference of device signal values, or a difference of reflectances between the inspection object image and the virtual sample image, from regions of the inspection object image and the virtual sample image, which are designated according to prediction information. Here, the "prediction information" indicates, for example, information that indicates a position of a region in which a linear pattern is expected to be formed. The candidate region cut-out section 254 compares the result of the calculation performed by the candidate region calculating section 252 (for example, at least one of the difference of densities, the difference of color spaces, the difference of light values, the difference of luminances, the difference of device signal values, and the difference of reflectances) with thresholds, and cuts out regions that exceed the thresholds respectively from the inspection object image and the virtual sample image. The subtraction section 28B calculates a difference value between the inspection object image and the virtual sample image from the regions that are cut out by the candidate region cut-out section 254. Due to this configuration, the evaluation unit 22 may perform evaluation of the quality of the visibility with respect to the regions cut out by the candidate region cut-out section 254. Accordingly, it is possible to reduce the load of the processing while further preventing deterioration of evaluation accuracy as compared to a case in which this configuration is not provided.

Embodiments are not limited to the above described configuration in which at least one of a difference of densities, a difference color spaces, a difference of light values, a difference of luminances, a difference of device signal values, and a difference of reflectances between the inspection object image and the virtual sample image is calculated by the candidate region calculating section 252, and regions are cut out on the basis of the results of the calculation by the candidate region cut-out section 254. For example, a color patch image may be printed as a partial image in the margin area of the inspection object printout 16, a candidate region (for example, a region corresponding to the position of a defective nozzle) may be narrowed down based on image data obtained by reading the color patch image by the reading unit 18, and the resultant candidate region may be cut out. The color patch image is not limited to the above-described example, and may be a color patch image that includes at least one of a predetermined color or one or more colors extracted from the image included in the inspection object printout 16. In this way, it is possible to easily predict a position, size, shape or the like of a line defect (i.e., the aspects of the line defect). Further, it is preferable that the color patch image has a shape extending in the main scanning direction (for example, a horizontally long rectangular shape). In this way, it is possible to easily identify the defective portion of the nozzle. Alternatively, a nozzle check pattern may be used as the partial image, and a region cut out by the candidate region cut-out section 254 may be determined based on the nozzle check pattern. Due to this configuration, it is possible to easily specify the defective portion of the nozzle as compared to a case in which this configuration is not provided. In this case, firstly, the nozzle check pattern is printed in the margin area of the inspection object printout 16 by the printing device 12. Next, the nozzle check pattern is read by the reading unit 18, and the candidate region calculating section 252 predicts the position (for example, nozzle number) of a defective nozzle (for example, a nozzle that cannot eject ink) based on image data obtained by reading the nozzle check pattern by the reading unit 18.

Then, the candidate region cut-out section 254 cuts out the region corresponding to the position of the nozzle that is predicted by the candidate region calculating section 252.

Embodiments are not limited to the configuration of the first embodiment in which the determination data is used as an example of the reference data. For example, determination data for each application, which indicates whether or not a line defect is visible for each specific application, may be used as the reference data. Here, the "application" indicates, for example, a large-sized poster, a photo book, a photograph collection, a catalog, a leaflet, or the like. In response to input of application information indicating the application of an inspection object printout 16, the warning determination section 44 may determine whether or not the level of visibility expressed by visibility level data is a level that requires a warning by referring to the determination data for each application that corresponds to the input application information.

Further, determination data for each observation distance that indicates whether or not a line defect is visible at each predetermined observation distance, may be used as the reference data. Here, the "observation distance" indicates, for example, a distance between an inspection object printout 16 and an observer when the inspection object printout 16 is actually observed. After the observation distance for the inspection object printout 16 is input, the warning determination section 44 determines whether or not the level of visibility expressed by visibility level data is a level that requires a warning by referring to the determination data for each observation distance that corresponds to the input observation distance.

It is preferable that tan output resolution of the printing device 12 is equal to or greater than the visual capability of a human under observation conditions. For example, it is preferable that the output resolution is 350 dpi or greater if the observation distance is about 30 cm. Further, it is preferable that the output resolution of the printing device 12 is 105 dpi or greater if the observation distance is 100 cm or greater.

It is preferable that a reading resolution of the scanner 94 is determined according to the output resolution of the printing device 12. For example, it is preferable that the reading resolution of the scanner 94 is 400 dpi or greater that is ⅓ or greater of the output resolution of the printing device 12 if the output resolution of the printing device 12 is 1200 dpi.

Alternatively, the scanner 94 may employ a reading resolution that is determined according to the minimum size of ink droplets used for printing in the printing device 12. For example, it is preferable that the reading resolution of the scanner 94 is 400 dpi or greater if the minimum size of ink droplets used for printing in the printing device 12 is 30 um.

Further, determination data for each content that indicates whether or not a line defect is visible in each predetermined content, may be used as the reference data. Here, the "content" indicates, for example, the position of a face image expressing the face of a person or the skin color of a person in an inspection object image. These may be detected using a known face detecting function or skin detecting function. After content information that indicates the contents is input, the warning determination section 44 determines whether or not the level of visibility expressed by visibility level data is a level that requires a warning by referring to the determination data for each content that corresponds to the input content information.

Embodiments are not limited to the configuration of the first embodiment in which the conveying direction of recording sheets corresponds to the specific direction. For example, in a case in which a printing device that divides an inspection object image into plural lines and records each of the plural lines on a recording sheet is employed in place of the printing device 12, the specific direction may be the main scanning direction of the printing device. In this case, it is possible to accurately extract a line defect formed in the specific direction, as compared to a case in which this configuration is not provided. In this case, it is preferable that the printing method of the printing device be a shuttle-scan method. Thereby, it is possible to more accurately extract a line defect that includes a linear pattern formed in the specific direction.

Embodiments are not limited to the configuration of the first embodiment in which the reading unit 18 includes the exclusion section 25. The exclusion section 25 may be removed from the reading unit 18, and the extraction unit 20 that is disposed at the downstream side may incorporate the function equivalent to the exclusion section 25.

Embodiments are not limited to the configuration of the first embodiment in which the characteristics of the reading unit 18 and the non-formation factor characteristics are eliminated by the exclusion section 25, and the exclusion section 25 may be omitted. In this case, it is preferable that, for example, the influence of at least one of the characteristics of the reading unit 18 or the characteristics of the printing device 12 be reflected in the sample image data. Thereby, accurate extraction of a line defect is possible as compared to a case in which this configuration is not provided. Here, it is preferable that the "characteristics of the reading unit 18" including the characteristics of the reading unit 18 to which the time degradation characteristics of the components of the reading unit 18 is reflected. Thereby, more accurate extraction of a line defect image is possible. Examples of the time degradation characteristics of the components of the reading unit 18 include time degradation characteristics of a component of the reading unit 18 that is expected to incur time degradation and that the time degradation thereof will affect the reading result of an image.

It is preferable that the "characteristics of the printing device 12" including the characteristics of the printing device 12 to which the time degradation characteristics of the components of the printing device 12 is reflected. Thereby, more accurate extraction of a line defect image is possible. Examples of the time degradation characteristics of the components of the printing device 12 include time degradation characteristics of a component of the printing device 12 that is expected to incur time degradation and that the time degradation thereof will affect the defects of an image. Further, the "characteristics of the printing device 12" may include non-formation factor characteristics, or the "characteristics of the printing device 12" may be constituted only by non-formation factor characteristics.

Embodiments are not limited to the configuration of the first embodiment in which the influence of at least one of the characteristics of the printing device 12 or the characteristics of the reading unit 18 is not reflected to the sample image data, and the influence of at least one of the characteristics of the printing device 12 or the characteristics of the reading unit 18 may be reflected to the sample image data. In this case, it is preferable to use inspection object image data to which the influence of at least one of the characteristics of the printing device 12 or the characteristics of the reading unit 18 is reflected. Further, in this case, it is preferable that the same type of characteristics that affect the sample image data and the inspection object image data may be reflected to the sample image data and the inspection object image data, respectively. For example, it is preferable that sample image data in which the influence of both the characteristics of the printing device 12 and the characteristics of the reading unit 18 is reflected is used as well as inspection object image data in which the influence of both the characteristics of the printing device 12 and the characteristics of the reading unit 18 is reflected. Thereby, improvement of the extraction accuracy of a line defect image is possible as compared to a case in which this configuration is not provided.

For the sample image data and the inspection object image data, an effective combination of the cases of reflecting or not reflecting the characteristics of the printing device 12 or the characteristics of the reading unit 18 may be, for example reflecting the influence of the characteristics of the printing device 12 to the sample image data and not reflecting the influence of the characteristics of the reading unit 18 to the inspection object image data (i.e., eliminating the influence of the characteristics of the reading unit 18 from the inspection object image data). Alternatively, the effective combination may be, for example, reflecting the influence of the characteristics of the printing device 12 and the influence of the characteristics of the reading unit 18 to the sample image data, and not reflecting the influence of the characteristics of the printing device 12 and the influence of the characteristics of the reading unit 18 to the inspection object image data (i.e., eliminating the influence of the characteristics of the printing device 12 and the influence of the characteristics of the reading unit 18 from the inspection object image data). Yet alternatively, the effective combination may be, for example, not reflecting the influence of the characteristics of the printing device 12 and the influence of the characteristics of the reading unit 18 to the sample image data, and reflecting the influence of the characteristics of the printing device 12 and the influence of the characteristics of the reading unit 18 to the inspection object image data.

If the characteristics of the printing device 12 are reflected to the sample image data and the inspection object image data, it is preferable that the characteristics of the printing device 12 include the time degradation characteristics of the components of the printing device 12. Further, it is preferable that the characteristics of the reading unit 18 also include the time degradation characteristics of the components of the reading unit 18. Thereby, further improvement of the extraction accuracy of a line defect image is possible.

Embodiments are not limited to the configuration of the first embodiment in which the visibility of a line defect is evaluated using a visual model with mask effect. The visibility of a line defect may be evaluated using a profile prepared in advance. In this case, for example, the specific component decomposing section 38 and the second image combining section 40 are not necessary, and a profile evaluation section that evaluates the visibility of a line defect using a profile may be provided in place of the visual model evaluation section 42. An example of the evaluation processing of a line defect using a profile (profile processing) includes processing of integrating a line defect image in the specific direction. In the profile processing, if there is a portion where an integrated value is equal to or greater than a predetermined threshold, this portion is detected as a line defect. The detection may be performed by further taking into consideration of a range exceeding the threshold.

Embodiments are not limited to the configuration of the first embodiment in which a line defect is directly detected from an inspection object image. For example, a nozzle check pattern may be formed in a margin area (for example, a margin area at an outer peripheral edge) of the inspection object printout 16 and a candidate region that is used for detecting a line defect may be determined using the nozzle check pattern. Alternatively, a region in which a line defect is expected to be formed may be extracted from the inspection object image, a chart may be generated by recording the extracted region at a margin area corresponding to the same position in the main scanning direction, and a candidate region may be determined using this chart. Yet alternatively, a nozzle check pattern may be printed in a margin area of an inspection object printout 16, a candidate region may be narrowed down based on the nozzle check pattern, and the candidate region may be read by the reading unit 18.

Although the first embodiment performs processing of adjusting the resolution in the specific direction of the inspection object image expressed by the inspection object image data to be the same as the resolution in the main scanning direction of the inspection object image, the resolution adjustment is not necessarily required. Instead, visual filtering may be performed using a vertical-horizontal transformation filter.

Embodiments are not limited to the example described in the first embodiment in which the extraction unit 20, the evaluation unit 22, and the warning unit 24 are realized in software configuration using the computer 60. For example, at least one of the extraction unit 20, the evaluation unit 22, or the warning unit 24 may be realized in hardware configuration. In this case, an Application Specific Integrated Circuit (ASIC) in which circuits having plural functions are integrated or a programmable logic device may be applied. Alternatively, functions of the extraction unit 20, the evaluation unit 22, and the warning unit 24 may be realized by distributed processing. The distributed processing may be realized by a combination of hardware and software configurations. At least one of the extraction unit 20, the evaluation unit 22, or the warning unit 24 may be realized in software configuration by plural computers (including peripheral devices thereof). At least one of the extraction unit 20, the evaluation unit 22, or the warning unit 24 may also be realized by cloud computing or grid computing.

Second Embodiment

In the first embodiment, an example in which the visibility of a line defect is evaluated using a visual model with mask effect has been described. In the present second embodiment, a case in which the visibility of a line defect is evaluated by a statistical method will be described. In the description of the second embodiment, the components common to the first embodiment will be denoted by the same reference numerals and descriptions thereof will be omitted, and only the portions different from the first embodiment will be described.

Figure 23:
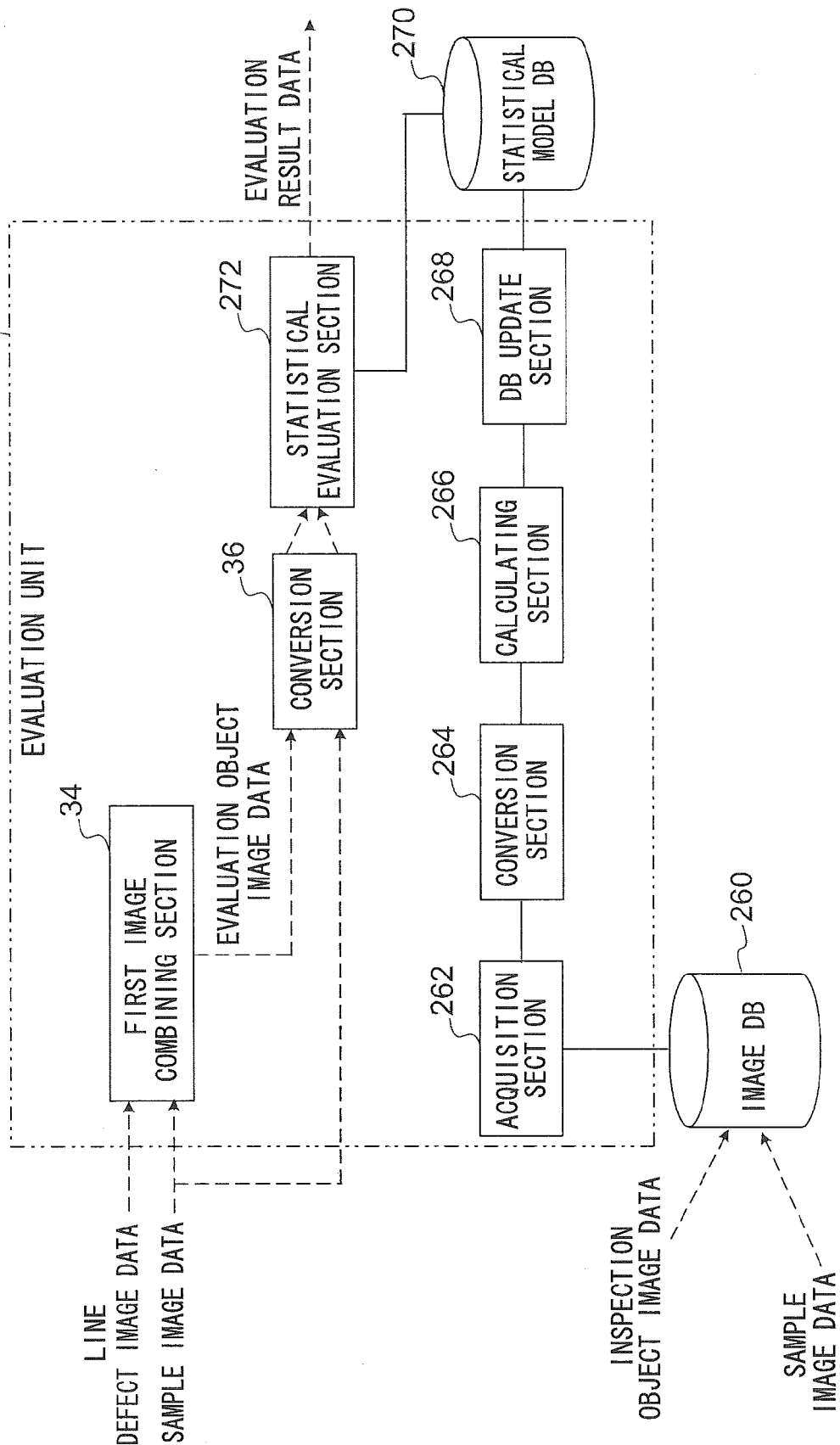
FIG. 23 is a functional block diagram illustrating an example of main functional components of an evaluation unit that is included in an image evaluation device according to a second embodiment.

FIG. 23 illustrates an example of main functional components of an evaluation unit 22A according to the second embodiment. As illustrated in FIG. 23, the evaluation unit 22A differs from the evaluation unit 22 illustrated in FIG. 4 in that the specific component decomposing section 38, the second image combining section 40, and the visual model evaluation section 42 are omitted. Further, the evaluation unit 22A differs from the evaluation unit 22 illustrated in FIG. 4 in that an acquisition section 262, a conversion section 264, a calculating section 266, a DB update section 268, and a statistical evaluation section 272 are provided. Furthermore, an image DB 260 is connected to the acquisition section 262, and a statistical model DB 270 is connected to the DB update section 268 and the statistical evaluation section 272.

Embodiments are not limited to the configuration of the second embodiment illustrated in FIG. 23 in which the first image combining section 34 is included in the evaluation unit 22A, and the first image combining section 34 may be omitted from the evaluation unit 22A. In this case, a line defect image expressed by difference values between the virtual sample image and the inspection object image may be used instead of the evaluation object image obtained by the first image combining section 34.

Moreover, although the second embodiment uses the evaluation object image and the virtual sample image as an object to be decomposed by the specific component decomposing section 38, any one of the evaluation object image and the virtual sample image may be used as the object to be decomposed by the specific component decomposing section 38. Further, embodiments may be realized even by omitting the specific component decomposing section 38.

Figure 24:
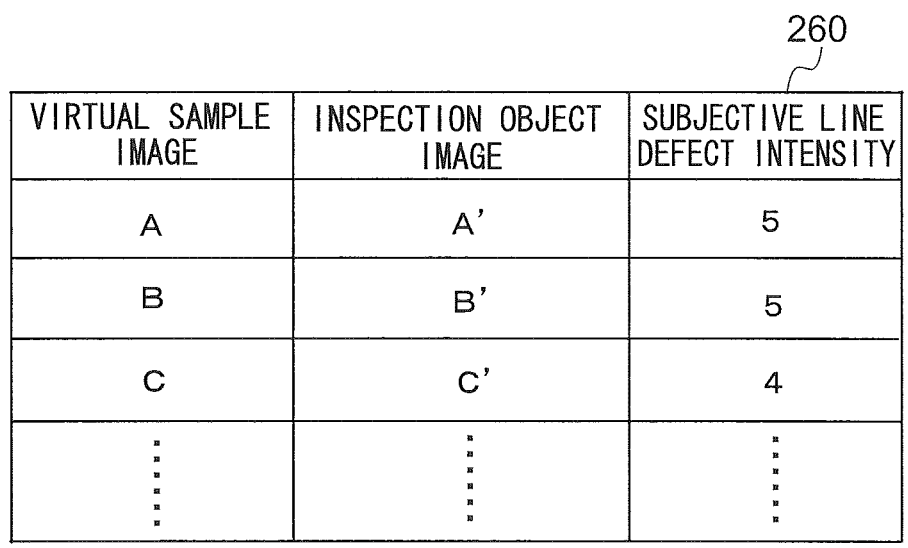
FIG. 24 is a schematic view illustrating an example of the structure of an image DB that is included in the image evaluation device according to the second embodiment.

The image DB 260 stores sample image data and inspection object image data that have been provided for the evaluation of the image evaluation device 10 in the past. FIG. 24 schematically illustrates an example of the structure of the image DB 260. As illustrated in FIG. 24, the image DB 260 stores the sample image data expressing the virtual sample image and the inspection object image data expressing the inspection object image. Further, the image DB 260 stores subjective line defect intensity data indicating results of subjective evaluation (ten levels indicated by numeral values of 0 to 9) of the intensity of a line defect included in the inspection object image expressed by the inspection object image data. The subjective line defect intensity data is associated with each of the inspection object images. Here, in order to avoid complication, a tester for the subjectively evaluation of the intensity of a line defect is a single person and the single tester evaluates in advance the level of the visibility of each of the inspection object images by visually observing plural inspection object images including different line defects. Further, inspection object images included in the inspection object printouts 16 that have been used as the object of evaluation in the past are used as the inspection object images to be evaluated.

The acquisition section 262 acquires the sample image data and the inspection object image data from the image DB 260. The conversion section 264 performs color conversion and visual filtering on the virtual sample image expressed by the sample image data and the inspection object image expressed by the inspection object image data acquired by the acquisition section 262. The calculating section 266 calculates difference values between the virtual sample image and the inspection object image that are obtained by the color conversion and the visual filtering. The DB update section 268 updates the contents stored in the statistical model DB 270.

FIG. 25 schematically illustrates an example of the structure of the statistical model DB 270. As illustrated in FIG. 25, the statistical model DB 270 stores the difference values calculated by the calculating section 266 and corresponding subjective line defect intensity data stored in the image DB 260 with association to each other. Further, a threshold is associated with each of the difference values. Here, the "threshold" is a threshold that is compared with a density value of each pixel of the evaluation object image expressed by the evaluation object image data, and indicates that a line defect is evaluated as a visible defect if the density value of each pixel exceeds this threshold. However, the "threshold" is not necessarily an essential component required for realizing the embodiment. Embodiments may be realized even if the "threshold" is not provided.

The statistical evaluation section 272 evaluates the visibility of a line defect image of the evaluation object image obtained by the color conversion and the visual filtering performed by the conversion section 36, by referring to the statistical model DB 270 and using a statistical method. In the second embodiment, for example, the statistical evaluation section 272 firstly calculates a difference value between the virtual sample image and the line defect image for each of their pixels based on the evaluation object image obtained by the color conversion and the visual filtering performed by the conversion section 36, and calculates an average value of the difference values. Then, the statistical evaluation section 272 reads, among the thresholds stored in the statistical model DB 270, a threshold associated to the difference value that corresponds to the calculated average value, and compares the difference values calculated for the pixels with the threshold. The statistical evaluation section 272 evaluates a pixel having a difference value exceeding the threshold as a pixel that forms a visible line defect, and generates evaluation result data that includes comprehensive evaluation results for all of the pixels and the subjective line defect intensity data. In this regard, although the second embodiment uses an average value of the difference values calculated for all of the pixels as a reference to the threshold, embodiments are not limited thereto. For example, a value corresponding to a representative value of the calculated difference values of the pixels (for example, a statistic value other than the average value such as a mode or a median of the calculated difference values of the pixels) may be used as a reference to the threshold.

The second embodiment describes an example in which the statistical evaluation section 272 calculates a difference value between the virtual sample image and the line defect image for each of the pixels based on the evaluation object image and the virtual sample image. However, the statistical evaluation section 272 may alternatively acquire line defect image data generated by the extraction section 32 without generating the evaluation object image, and may perform evaluation based on the virtual sample image and the line defect image that is expressed by the line defect image data.

Figure 26:
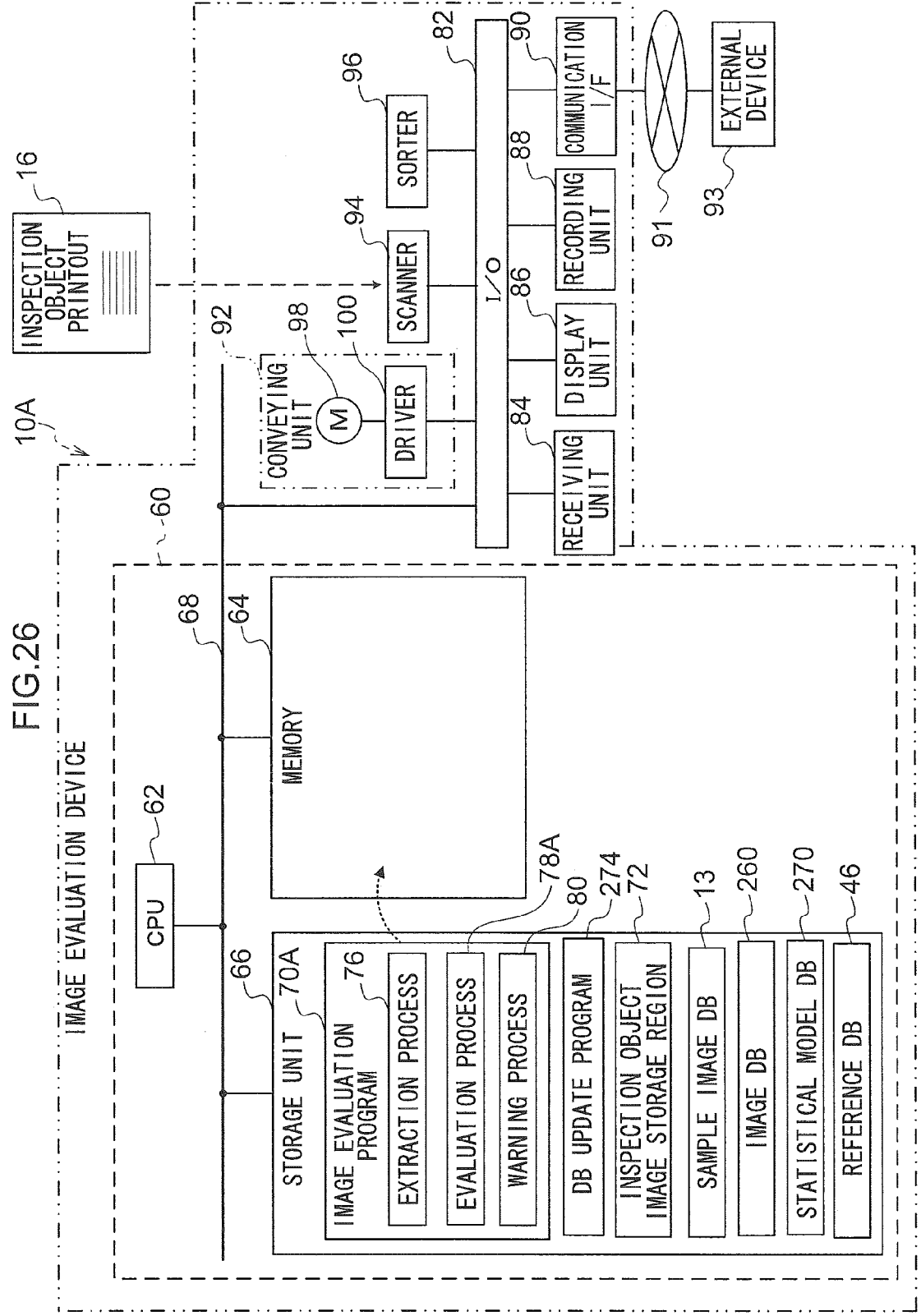
FIG. 26 is a block diagram illustrating an example of the configuration of an electrical system of the image evaluation device according to the second embodiment.

FIG. 26 illustrates an example of the configuration of an electrical system of an image evaluation device 10A according to the second embodiment. The image evaluation device 10A illustrated in FIG. 26 differs from the image evaluation device 10 illustrated in FIG. 6 in that an image evaluation program 70A is used instead of the image evaluation program 70. The image evaluation device 10A also differs from the image evaluation device 10 in that a DB update program 274 is stored in the storage unit 66, and that the image DB 260 and the statistical model DB 270 are stored in the storage unit 66.

The image evaluation program 70A differs from the image evaluation program 70 illustrated in FIG. 6 in that an evaluation process 78A is included instead of the evaluation process 78. The CPU 62 operates as the evaluation unit 22A illustrated in FIG. 23 as a result of executing the evaluation process 78A.

Figure 27:
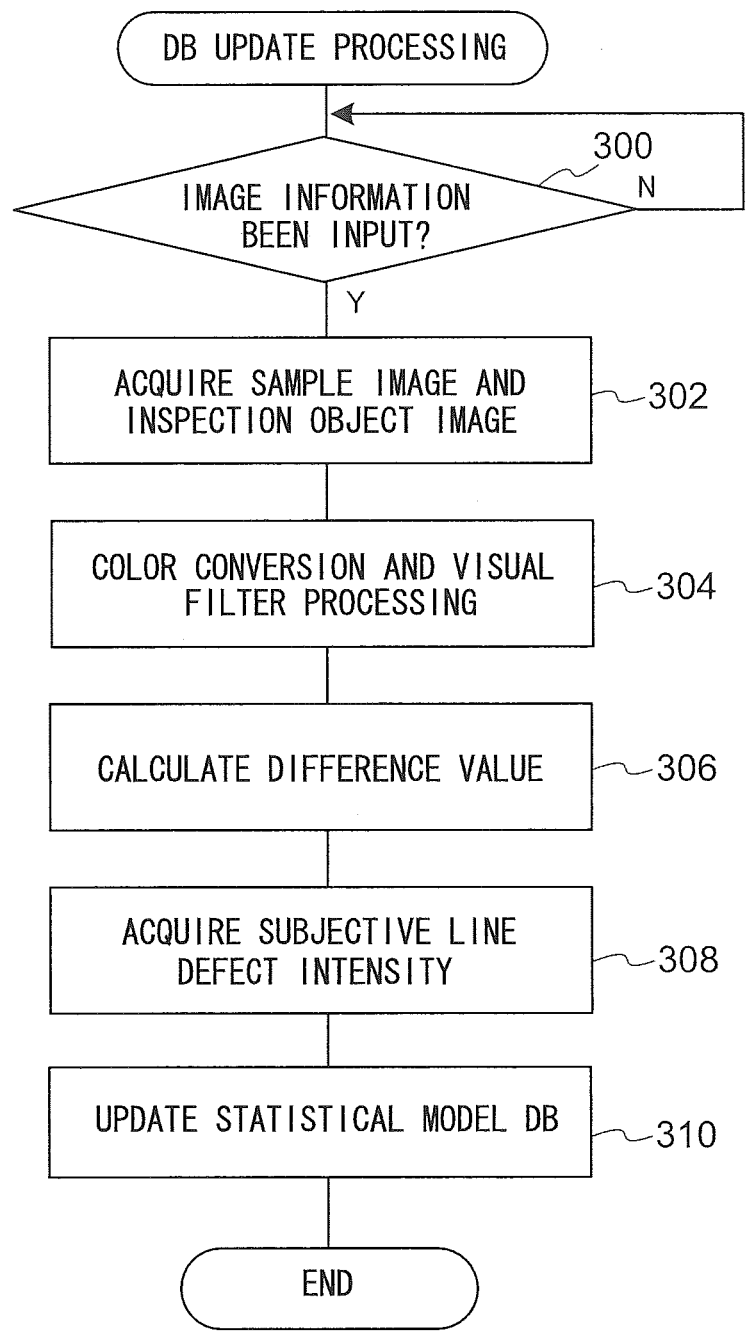
FIG. 27 is a flowchart illustrating an example of the flow of DB update processing according to the second embodiment.

Next, DB update processing that is performed in the image evaluation device 10A as a result of the CPU 62 executing the DB update program 272 will be described as the operation of the second embodiment with reference to FIG. 27. In the DB update processing illustrated in FIG. 27, firstly, in Step 300, the acquisition section 262 determines whether or not sample image data, inspection object image data corresponding to the sample image data, and subjective line defect intensity data corresponding to the inspection object image data have been input to the image DB 260. If it is determined in Step 300 that the sample image data, the inspection object image data, and the subjective line defect intensity data have not been input, the determination is negative and Step 300 is repeated. Otherwise, the determination is affirmative and the processing proceeds to Step 302.

In Step 302, the acquisition section 262 acquires the latest sample image data and inspection object image data stored in the image DB 260, and then the processing proceeds to Step 304. In Step 304, the conversion section 264 performs color conversion and visual filtering on the virtual sample image expressed by the sample image data and the inspection object image expressed by the inspection object image data, which are acquired in Step 302.

In next Step 306, the calculating section 266 calculates difference values between the sample image data expressing the virtual sample image and the inspection object image data expressing the inspection object image on which the color conversion and the visual filtering have been performed in Step 304, and then the processing proceeds to Step 308. In Step 308, the DB update section 268 acquires the latest subjective line defect intensity data stored in the image DB 260, and the processing proceeds to Step 310. In Step 310, the DB update section updates the statistical model DB 270 by storing the difference value calculated in Step 306, a threshold uniquely determined according to the difference value, and the subjective line defect intensity data acquired in Step 308 in the statistical model DB 270. After Step 310 is performed, the DB update processing is ended.

Next, image evaluation processing performed in the image evaluation device 10A as a result of the CPU 62 executing the image evaluation program 70A will be described. Only the processing different from the image evaluation processing described in the first embodiment will be described here, and the descriptions for the same processing as in the first embodiment are omitted. As illustrated in FIG. 14, the image evaluation processing according to the second embodiment differs from the image evaluation processing in the first embodiment in that Step 204A is performed instead of Step 204. In Step 204A, the evaluation unit 22A performs evaluation processing, and then the processing proceeds to Step 206.

Figure 28:
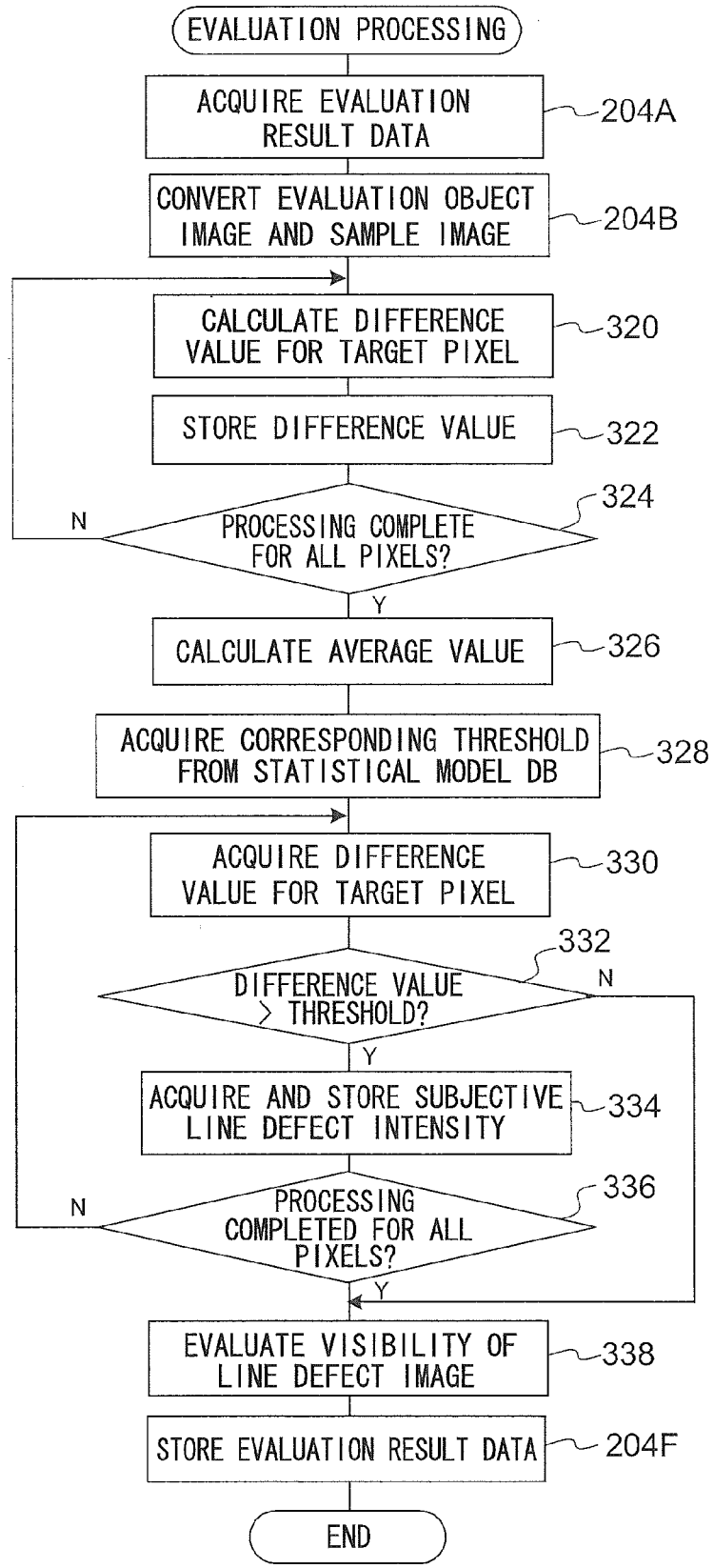
FIG. 28 is a flowchart illustrating an example of the flow of evaluation processing that is included in image evaluation processing according to the second embodiment.

FIG. 28 illustrates an example of the flow of the evaluation processing according to the second embodiment. In the following description, only the steps different from the steps included in the evaluation processing illustrated in FIG. 18 will be described, and the same steps are denoted by the same step reference numbers and descriptions thereof are omitted. Further, in order to avoid complication, a case in which a line defect image is included in an evaluation object image will be described.

In Step 320 of the evaluation processing illustrated in FIG. 28, the statistical evaluation section 272 calculates a difference value between the density of the virtual sample image and the density of the line defect image for a target pixel of the line defect image included in the evaluation object image that is obtained by the conversion processing performed in Step 204B. In the next step 322, the statistical evaluation section 272 stores the difference value for each of the pixels calculated in Step 320 in the storage unit 66.

In next Step 324, the statistical evaluation section 272 determines whether or not the processing of Steps 320 and 322 has been completed for all the pixels of the line defect image. If it is determined in Step 324 that the processing of Steps 320 and 322 has not been completed for all of the pixels of the line defect image, the determination is negative and the processing returns to Step 320. Otherwise, the determination is affirmative and the processing proceeds to Step 326.

In Step 326, the statistical evaluation section 272 calculates an average value of the difference values for the pixels, which are stored in the storage unit 66 in Step 320. In next Step 328, the statistical evaluation section 272 acquires a threshold associated with a difference value corresponding to the average value calculated in Step 326 from the statistical model DB 270. If a difference value exactly equal to the calculated average value is not stored in the statistical model DB 270 a difference value closest to the average value of the difference values calculated in Step 320 may be alternatively used in Step 326. Further, if the average value of the calculated difference values is a median of two difference values stored in the statistical model DB 270, for example, the smaller difference value of the two difference values may be used as the difference value corresponding to the average value of the difference values calculated in Step 320. Alternatively, the larger difference value of the two difference values may be used as the difference value corresponding to the average value of the difference values calculated in Step 320.

In next Step 330, the statistical evaluation section 272 acquires a difference value of a target pixel from the differences value for the pixels, which are stored in the storage unit 66 in Step 322. In next Step 332, the statistical evaluation section 272 determines whether or not the difference value acquired in Step 330 exceeds the threshold acquired in Step 328. If it is determined in Step 332 that the difference value acquired in Step 330 does not exceed the threshold acquired in Step 328, the determination is negative and the processing proceeds to Step 338. If it is determined in Step 332 that the difference value acquired in Step 330 exceeds the threshold acquired in Step 328, the determination is affirmative and the processing proceeds to Step 334.

In Step 334, the statistical evaluation section 272 acquires subjective line defect intensity data corresponding to the threshold acquired in Step 328 from the statistical model DB 270. The acquired subjective line defect intensity data is stored in the storage unit 66 in association with the difference value acquired in Step 330.

In next Step 336, the statistical evaluation section 272 determines whether or not the processing of Steps 330 to 334 has been completed for all of the difference values for the pixels, which are stored in the storage unit 66 in Step 322. If it is determined in Step 336 that the processing of Steps 330 to 334 has not been completed for all of the difference values for the pixels stored in the storage unit 66 in Step 322, the determination is negative and the processing returns to Step 330. Otherwise, the determination is affirmative and the processing proceeds to Step 338.

In Step 338, the statistical evaluation section 272 evaluates the quality of the visibility of the line defect included in the evaluation object image and generates evaluation result data expressing the evaluation result. In Step 338, for example, if subjective line defect intensity data is stored in the storage unit 66, the quality of the visibility of the line defect included in the evaluation object image is comprehensive evaluated by also evaluating the entire subjective line defect intensity data stored in the storage unit 66. For example, the evaluation is performed based on the magnitudes of the numeral values of the ten level evaluation of the subjective line defect intensity data, the number of sets of the subjective line defect intensity data, or the distribution of pixels having numeral values of the subjective line defect intensity data (for example, 8) that exceed a predetermined value (for example, 7). As well as the evaluation results of the quality of the visibility of the line defect, the evaluation result data also includes information used in the evaluation, (for example, the subjective line defect intensity data or data indicating the distribution of the pixels). The evaluation result data is used in the subsequent evaluation performed by the warning determination section 44 of the warning unit 24.

As described above, the image evaluation device 10A according to the second embodiment is configured to evaluate the visibility of the extracted line defect using a statistical method. Accordingly, it is possible to improve the evaluation accuracy of the visibility of a line defect as compared to a case without this configuration.

Figure 29:
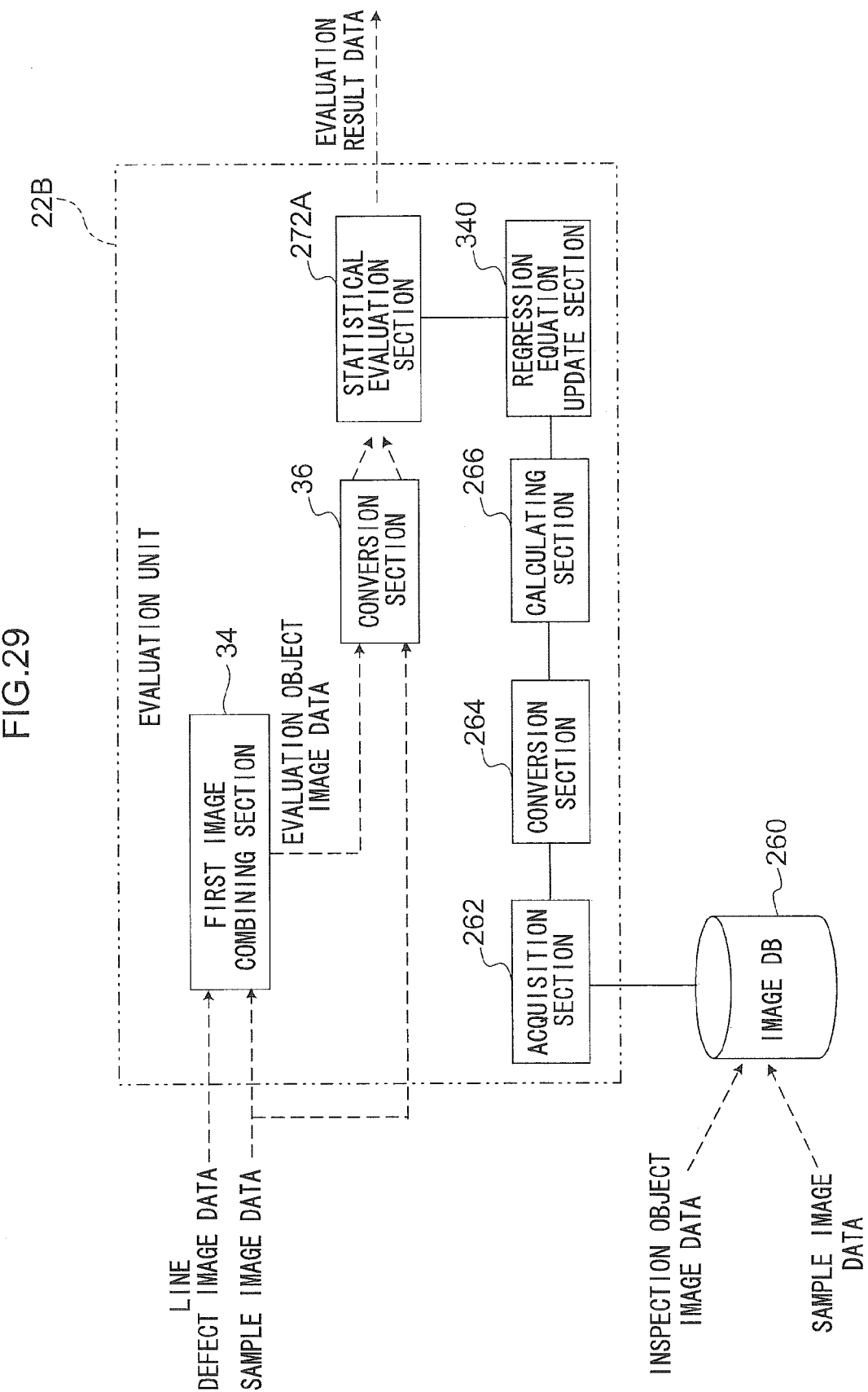
FIG. 29 is a functional block diagram illustrating a modification of the evaluation unit included in the image evaluation device according to the second embodiment.

Embodiments are not limited to the configuration of the second embodiment in which the visibility of a line defect is evaluated with reference to the statistical model DB 270. The visibility of a line defect may be evaluated using a multiple regression equation. In this case, an evaluation unit 22B illustrated in FIG. 29 may be used in place of the evaluation unit 22A. The evaluation unit 22B illustrated in FIG. 29 differs from the evaluation unit 22A illustrated in FIG. 23 in that a statistical evaluation section 272A is provided in place of the statistical evaluation section 272, and a regression equation update section 340 is provided in place of the DB update section 268 and the statistical model DB 270.

The regression equation update section 340 holds a multiple regression equation to be provided to the statistical evaluation section 272A, and updates a regression coefficient of the multiple regression equation based on the latest data. Here, the "multiple regression equation" uses as explanatory variables the difference value that is calculated by the calculating section 266, and the numeral value of the ten level evaluation that is expressed by the latest subjective line defect intensity data stored in the image DB 260. Further, the "multiple regression equation" uses a numeral value that indicates the quality of the visibility of a line defect included in an evaluation object image (for example, a numeral value of the ten level evaluation expressed by the subjective line defect intensity data) as an objective variable.

The statistical evaluation section 272A evaluates the quality of the visibility of a line defect included in the evaluation object image, using a multiple regression equation that is currently held in the regression equation update section 340, and generates evaluation result data. Here, the "evaluation result data" includes, for example, a numeral value that indicates the quality of the visibility of a line defect included in the evaluation object image (i.e., the solution of the multiple regression equation).

In this way, by using a multiple regression equation for evaluating the visibility of a line defect, it is possible to improve the evaluation accuracy of the visibility of the line defect by a simple configuration.

Embodiments are not limited to the configuration using a multiple regression equation and, for example, SIMM, PCA, SVR, AdaBoost, or the like may be used.

Embodiments are not limited to the configuration of the second embodiment in which one tester subjectively evaluates the intensity of a line defect. Alternatively, plural testers may evaluate the intensity of a line defect. In this case, numeral values indicating subjective line defect intensities, such as an average value, a mode and the like, that are the results of the evaluation performed by the plural testers may be stored in the image DB 260.

Further, embodiments are not limited to the configuration of the second embodiment in which the inspection object images included in the inspection object printouts 16 provided for evaluation in the past are used as the evaluation object images that are visually observed by the tester. The evaluation object images may include an image that is similar to the inspection object image (i.e., an image that has not been actually used as the inspection object image).

Third Embodiment

In the first embodiment, the warning unit 24 determines whether or not the level of the visibility of a line defect is a level that requires a warning by referring to the reference data of the reference DB 46. In the third embodiment, the determination of whether or not the level of visibility is a level that requires a warning is performed according to the characteristics of a customer. In the following description, the same components as those described in the first embodiment will be denoted by the same reference numerals and the description thereof will be omitted, and only the portions different from the first embodiment will be described.

Figure 30:
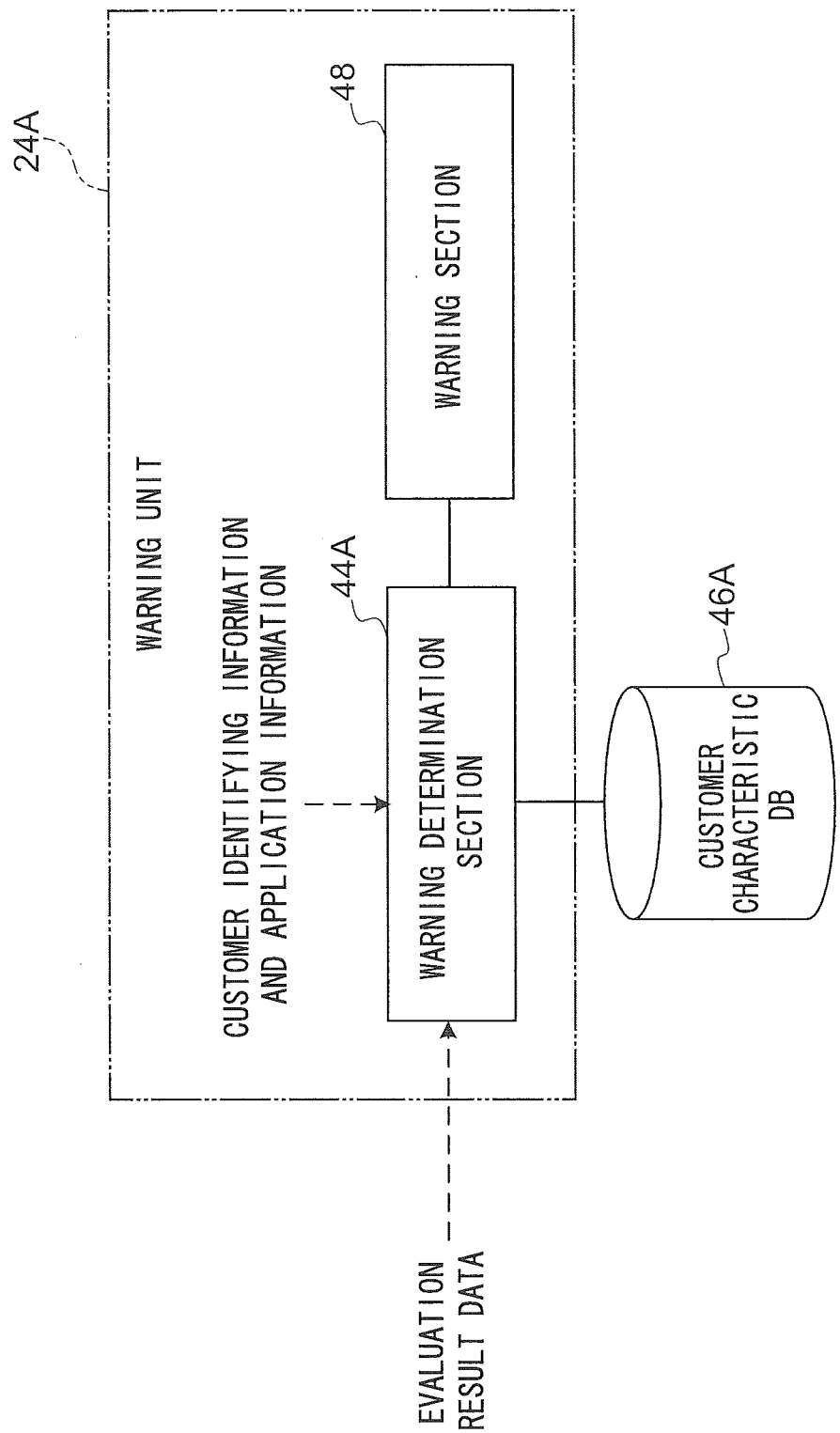
FIG. 30 is a functional block diagram illustrating an example of main functional components of a warning unit that is included in an image evaluation device according to a third embodiment.

FIG. 30 illustrates an example of main functional components a warning unit 24A according to the third embodiment. The warning unit 24A illustrated in FIG. 30 differs from the warning unit 24 illustrated in FIG. 5 in that a warning determination section 44A is provided in place of the warning determination section 44. Further, although the reference DB 46 is connected to the warning determination section 44 in the first embodiment, a customer characteristic DB 46A is provided in place of the reference DB 46 in the third embodiment.

Customer identifying information that identifies a customer and application information that indicates the application of an inspection object printout 16 (for example, a large-sized poster, a photo book, a photograph collection, a catalog, a leaflet, or the like) is input to the warning determination section 44A. The warning determination section 44A determines whether or not the level of visibility of a line defect is a level that requires a warning by referring to the customer characteristic DB 46A based on the input customer identifying information and the application information.

The customer characteristic DB 46A accumulate a data group including information (hereinafter, referred to as "customer characteristic data") such as details of orders or transaction records (history) of the past for each customer who is an orderer (ordering party). The customer characteristic data stored in the customer characteristic DB 46A of the present embodiment also includes a numeral value of an "image quality index" for each customer and each application or content type of printouts, which indicates image quality accepted (recognized as acceptable) in the past by the customer. The image quality index is an index that indicates the image quality of a printout, and is defined as a numeral value indicating the evaluation for at least one, preferably multiple image quality attributes associated with physical quantities that can be actually measured from a printout or the like. A specific example of the image quality index will be described later. The image quality index is hereinafter denoted by reference "Q".

Figure 31:
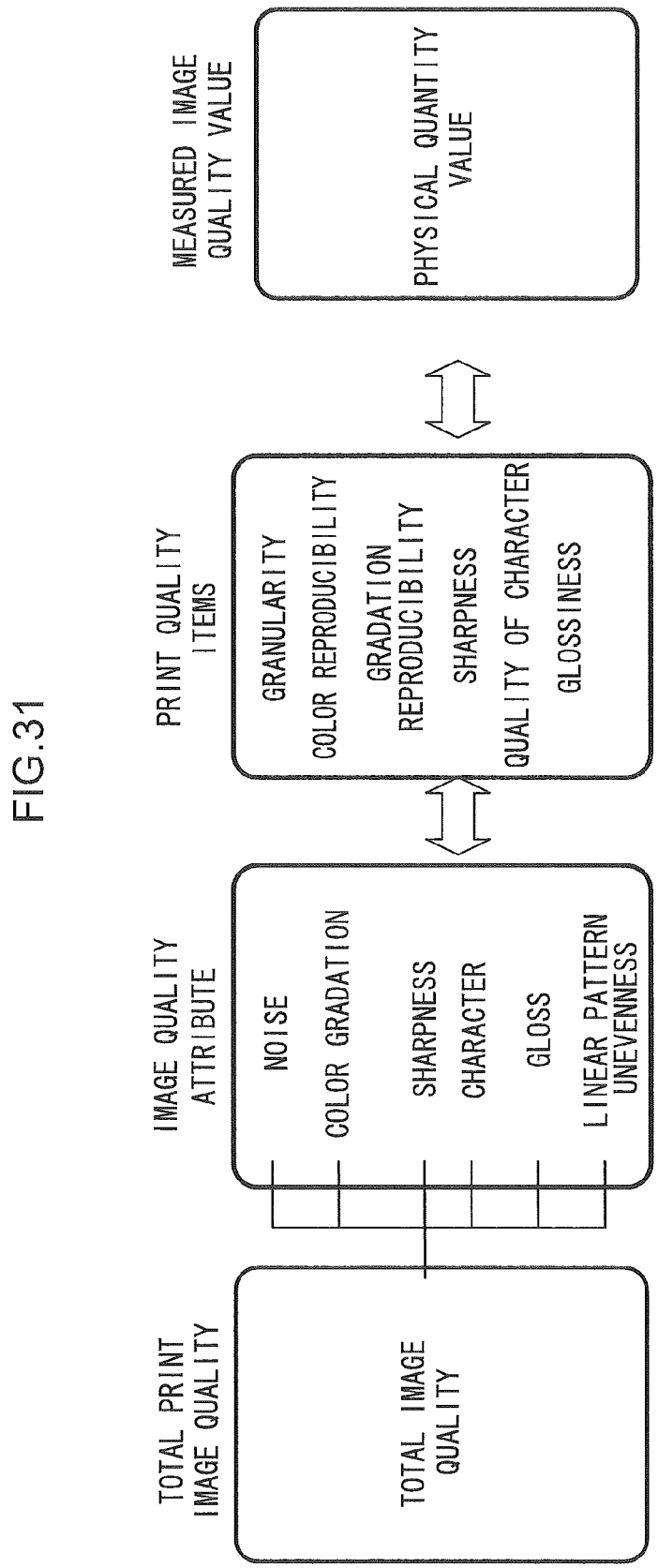
FIG. 31 is a diagram illustrating an image quality index that is used in a customer characteristic DB included in the image evaluation device according to the third embodiment.

FIG. 31 is a diagram illustrating the image quality index. The image quality index of the present embodiment is an index that indicates the total image quality of a printout, and is defined as a value that is obtained by a combination of evaluations for multiple image quality attributes. The total image quality can be expressed by a tree structure of multiple image quality attributes, and is recognized as a quality that comprehensively considers the respective attributes. In FIG. 31 six image quality attributes, such as image noise, color gradation, sharpness, character, gloss, and linear pattern unevenness, are exemplified. One or more of the six image quality attributes exemplified here may be used, or other image quality attributes may be additionally used.

Each of the attributes is associated with one or more print quality items, and image quality attributes and print quality items can be estimated from physical quantities (corresponding to "physically measured values", and described as "measured image quality values" in FIG. 31) that can be actually measured from print results and the like.

Figure 32:
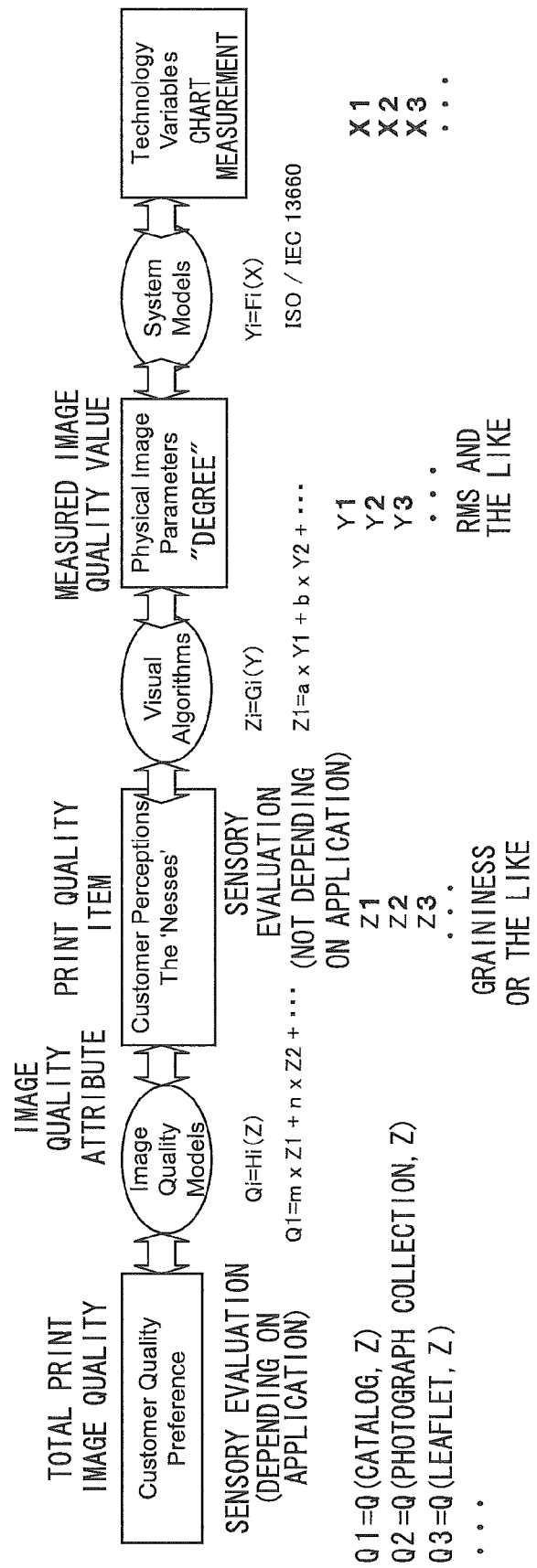
FIG. 32 is a conceptual diagram illustrating a method of obtaining an image quality index.

FIG. 32 is a conceptual diagram illustrating a method of obtaining the image quality index. The concept illustrated in FIG. 32 is described in, for example, "Peter G Engeldrum, "Psychometric Scaling: a toolkit for imaging systems development", pp. 8-17, 2000".

Physical technology variable values may be obtained by printing a test chart or an actual image and measuring the print results thereof. The measured technology variables are denoted by reference "X", and the specific values of the measured technology variables are denoted by X1, X2, X3, . . . and the like.

Value X obtained by measurement such as chart measurement is associated with a physical image parameter (physical quantity value) Yi that is a measured image quality value according to a predetermined system model. For example, ISO/IEC 13660 or the like relating to a method of measuring an image quality of a hard copy may be used as the system model. According to a function F1(X) defined by the system model and value X obtained by chart measurement or the like, a physical image parameter (physical quantity value) Yi=Fi(X) that is a measured image quality value is obtained.

Here, the "physical image parameter" is a physical evaluation value (index) that generally expresses a rating of degree such as root mean square granularity (RMS). There are plural types of such physical image parameters.

"Customer perceptions" corresponding to the image quality attributes or print quality items are sensory evaluation values that generally express natures ("-ness"), such as graininess. This sensory evaluation value (which is denoted by Zi in FIG. 32) is represented by a numeral value that does not depend on the application.

A sensory evaluation value Zi that represents an image quality attribute (or a print quality item) is calculated according to function Gi(Y) that is defined by a visual algorithm (Zip=Gi(Y)).

"Consumer quality preference" corresponding to the total print image quality is a sensory evaluation value of comprehensive image quality obtained by combining multiple image quality attributes. This total image quality is defined for each application. The evaluation value Qi of the total image quality is calculated by function Hi(Z) that is defined by an image quality model, and a different function Hi(Z) is defined for each application.

A simple example of a model or algorithm for associating each of the physical quantity X obtained by actual measurement, the measured image quality value Y, the image quality attribute (or the print quality item) Z, and the total print image quality Q may be a linear model. In more detail, a specific function may be determined through an evaluation test or the like.

Correspondence relationships (functions denoted by Fi, Gi, and Hi) between the sensory evaluation values Qi and Zi, and the physical quantity values (physical evaluation values) X and Y are obtained in advance. In this regard, for the relationship between the total print image quality Qi and the image quality attribute/print quality item (Zi), model parameters are optimized for each application of a printout. For example, an image quality attribute relating to an image is weighted for the application of "photograph collection" including a large number of photographs. In contrast, an image quality attribute relating to characters is weighted for the application of "document" including a large amount of characters.

The total print image quality Qi may be calculated using a linear model of multiple regression analysis, a linear model that uses a weighting factor according to an area ratio of a content type, or a non-linear model. In this way, the total image quality Q1 for a catalog, the total image quality Q2 for a photograph collection, the total image quality Q3 for a leaflet and the like are calculated according to the functions Hi defined for each of the applications.

Although the third embodiment uses a total image quality obtained by comprehensive evaluation of plural image quality attributes as the image quality index, embodiments are not limited thereto and the individual image quality attributes before being comprehensively evaluated or an appropriate combination thereof may be used as the image quality index instead of the total image quality.

FIG. 33 schematically illustrates an example of the structure of the customer characteristic DB 46A. As illustrated in FIG. 33, the customer characteristic DB 46A stores data for identifying customers (such as customer names, customer IDs, and the like). Further, the customer characteristic DB 46A stores, for each of the customers, image quality indexes that have satisfied the customers' quality requirements with respect to the conditions of application or content type, and image quality indexes that have not reached the customers' quality requirements, as the customer characteristic data. Hereinafter, for the convenience of description, an image quality index that has satisfied the customers' quality requirements may be denoted by "OK_Q" and an image quality index that has not reached the customers' quality requirements may be denoted by "NG_Q".

A specific example of "OK_Q" includes an image quality index for a provided printout to which customer's acceptance or approval (OK determination) has been obtained. A specific example of "NG_Q" includes an image quality index to which the customer had expressed refusal or disapproval (NG determination) since the provided printout did not satisfy the customer's quality requirements.

These data can be accumulated as history data based on the records of delivered products with respect to the orders of the past. That is, history data in which the image quality indexes of provided printouts and the customer's evaluation (OK or NG) of the printouts are associated with each other through may be stored in the customer characteristic DB during business with the customers.

Since the required quality of a printout significantly varies depending on the application of the printout, the data is classified in the customer characteristic DB 46A in term of "application". Further, various contents such as photographic portions, character portions, line drawing portions, and illustration portions may be included in an image of a printout (one picture). "Content type" classifies printouts in term of what elements (contents) mainly form the image of the printout.

A relatively detailed small category of "content type" is included in a large category of "application". In the third embodiment, data of image quality indexes are accumulated for the combination of the application and the content type.

Information on other items of which utility values are regarded high may be registered in the customer characteristic DB, but are not essential for the embodiment. In the example illustrated in FIG. 33, a job ID (identification code) for identifying a print job of each order, reception date of orders, cost (denoted by reference "C"), and delivery date (denoted by reference "D") of orders are registered. That is, information on whether a customer is satisfied (OK) or not satisfied (NG) by the image quality (Q), the cost (C), and the delivery date (D) of a print that has been provided according to an order is accumulated in the customer characteristic DB 46A as the history of jobs in the past business.

In the present embodiment, total image quality is used as the image quality index Q, and evaluation values (Zi; i=a, b, c, d, e, and f) for image quality attributes (here, six attributes of items a to f) included as evaluation items of the total image quality are also recorded. Specifically, for example, six attributes of noise, color gradation, sharpness, characters, gloss, and linear pattern unevenness illustrated in FIG. 31 correspond to the items a to f. Although not illustrated in FIG. 33, corresponding values of the items a to f are stored in the respective cells of the table.

Further, various statistical processing can be performed using this customer characteristic DB. By processing various data registered in the customer characteristic DB, it is possible to generate secondary information, such as preference or tendency of each of the customers and an average acceptable level (an average value of OK_Q) of all customers. This secondary information may be generated on demand from the customer characteristic DB 46A based on an instruction of an operator as necessary, or may be regularly or irregularly generated automatically at an appropriate time. The generated secondary information (DB processed data) may be incorporated into and held in the customer characteristic DB 46A, or may be registered in other databases or stored in other storage device.

In the third embodiment standard parameters such as an average value of the customers are held in the customer characteristic DB 46A. These standard data may be used, for example, to expect the quality requirements of new customers.

Figure 34:
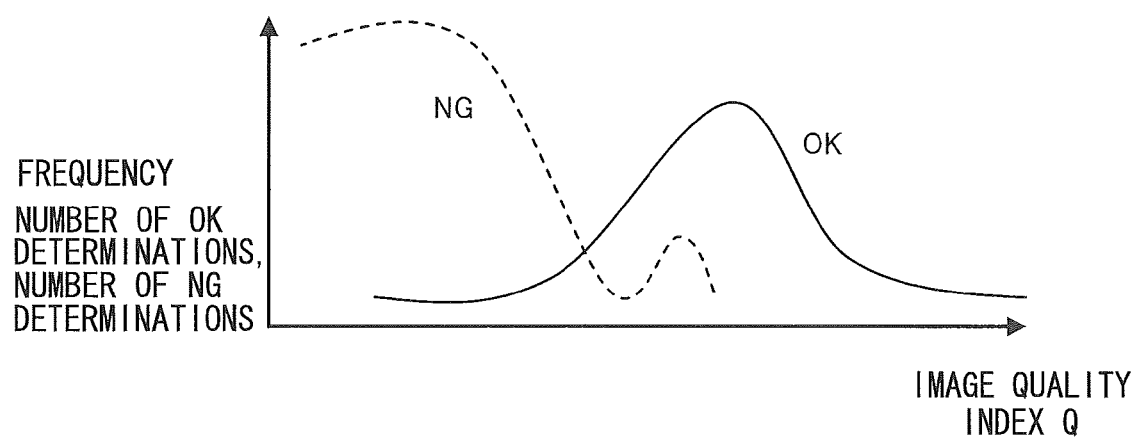
FIG. 34 is a graph illustrating an example of the distribution of acceptable/inacceptable determinations in terms of an image quality index.

Further, in the present embodiment, distribution data of the image quality indexes Q and the numbers of acceptable (OK) and inacceptable (NG) determinations (referred to as "OK/NG image quality index distribution") as illustrated in FIG. 34 is generated from the customer characteristic DB 46A as a key for expecting the customers' quality requirements. Histograms of the numbers of OK determination and NG determination of the customers relative to the image quality index Q (the total image quality) may be derived from the accumulated data group of the image quality indexes Q of printouts delivered in the past and the customers' evaluation (OK/NG determination) of the printouts.

In FIG. 34, the distribution plotted by a solid line indicates distribution data of the number of OK determination (referred to as "OK image quality distribution data"). The distribution in FIG. 34 plotted by a broken line indicates distribution data of the number of NG determination (referred to as "NG image quality distribution data"). These image quality index distribution can be generated based on a data group of the same application using data of a specific customer, or can be generated based on a data group of the same application of plural customers (for example, all or part of the registered customers).

For example, as a result of several businesses with the same customer, the distribution of an image quality level of a printout (OK_Q) that is determined acceptable by the customer and an image quality level of a printout (NG_Q) that is determined inacceptable by the customer becomes clear. For a regular customer, an OK/NG image quality index distribution for each application of the customer may be generated based on the data of that customer. For a new customer, a distribution may be generated using data of other customers for the same application.

For a new application that is not registered in the customer characteristic DB46A, a distribution may be estimated using other application data, or using an assumption considering items of image quality attributes that are regarded as important in the new application or the balance (weighting) between the items.

Further, a preference of a specific customer (regular customer), that is, for example, items that are regarded as important in the OK/NG determination (important items) and items that are not particularly regarded as important in the OK/NG determination (disregarded items) may be estimated using a deviation (for example, a standard deviation) of specific customer data from the average data including data of other customers. Based on this estimation, for a print request (order) of the customer it is possible to propose a printout that further attends to the customer's preference.

Figure 35:
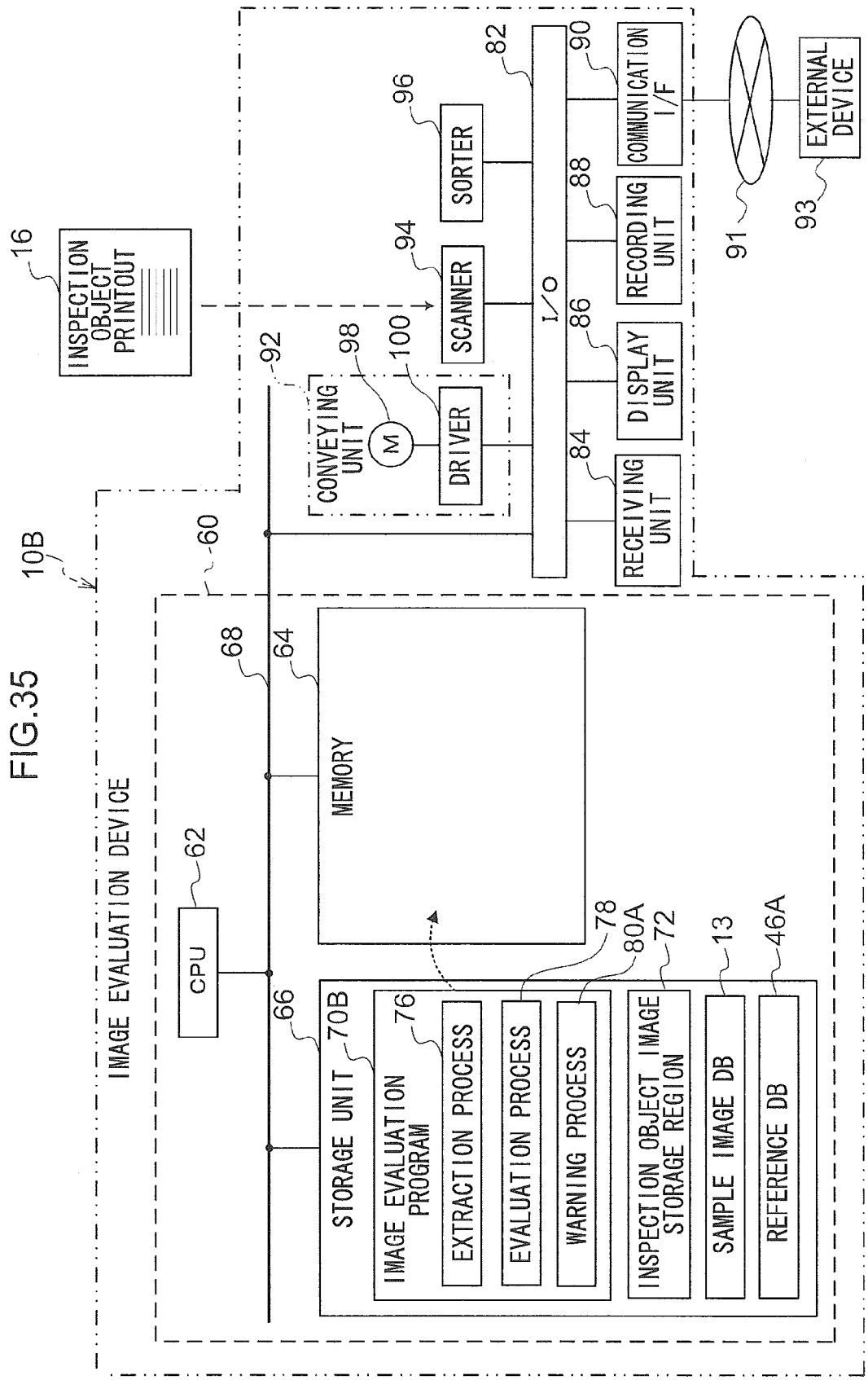
FIG. 35 is a block diagram illustrating an example of the configuration of an electrical system of the image evaluation device according to the third embodiment.

FIG. 35 illustrates an example of the configuration of an electrical system of an image evaluation device 10B according to the third embodiment. The image evaluation device 10B illustrated in FIG. 35 differs from the image evaluation device 10 illustrated in FIG. 6 in that an image evaluation program 70B is provided in place of the image evaluation program 70. Further, the image evaluation device 10B also differs from the image evaluation device 10 illustrated in FIG. 6 in that the customer characteristic DB 46A is stored in the storage unit 66 in place of the reference DB 46.

The image evaluation program 70B differs from the image evaluation program 70 illustrated in FIG. 6 in that a warning process 80A is included instead of the warning process 80. The CPU 62 operates as a warning unit 24A illustrated in FIG. 30 as a result of executing the warning process 80A.

Next, image evaluation processing performed in the image evaluation device 10B as a result of the CPU 62 executing the image evaluation program 70B will be described. Only the processing different from the image evaluation processing described in the first embodiment will be described here and description of the processing similar to the first embodiment will be omitted. As illustrated in FIG. 14, image evaluation processing according to the third embodiment differs from the image evaluation processing in the first embodiment in that Step 206A is performed instead of Step 206. In Step 206A, the warning unit 24A performs evaluation processing, and then the image evaluation processing is ended.

Figure 36:
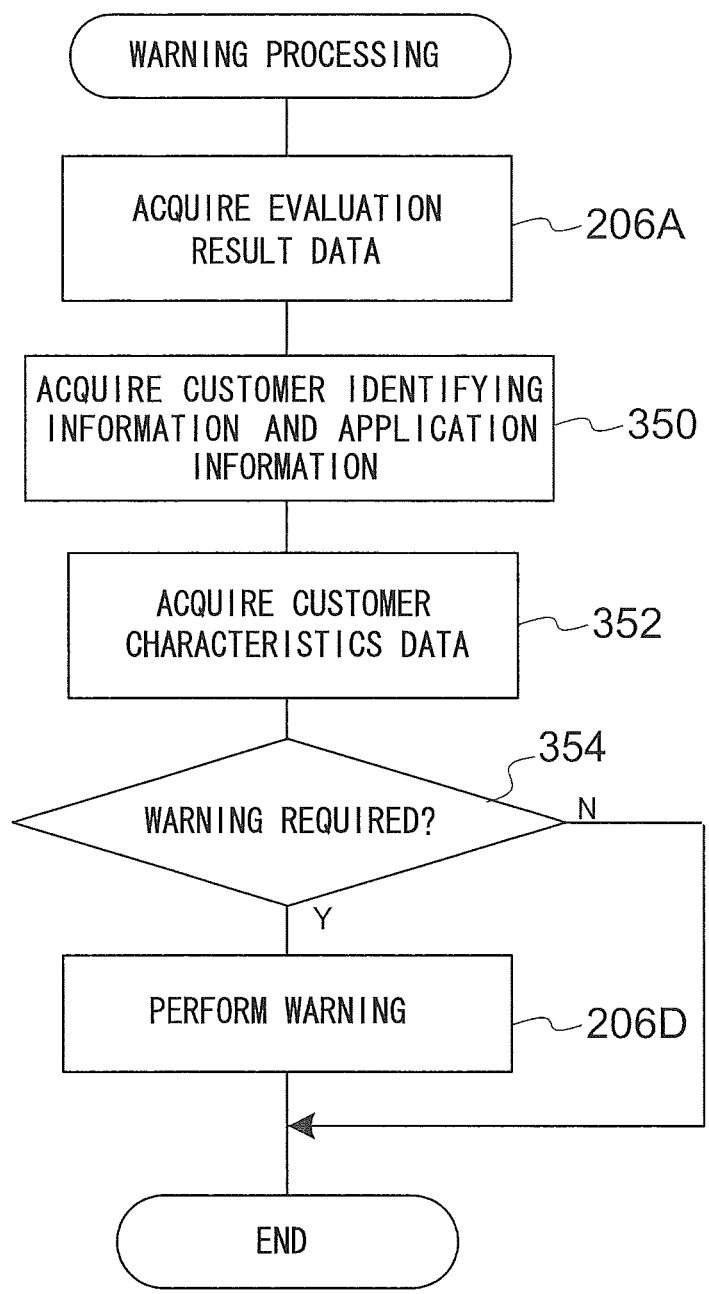
FIG. 36 is a flowchart illustrating an example of the flow of warning processing that is included in image evaluation processing according to the third embodiment.

FIG. 36 illustrates an example of the flow of warning processing according to the third embodiment. The warning processing according to the third embodiment illustrated in FIG. 36 differs from the warning processing illustrated in FIG. 19 in that Steps 350 to 354 are performed instead of Steps 206B and 206C. In the following description, only the steps different from the steps included in the warning processing illustrated in FIG. 19 will be described, and the similar peps are denoted by the same step numbers and description thereof will be omitted. Further, a case in which a line defect image is included in an evaluation object image will be described here in order to avoid complication.

In the warning processing illustrated in FIG. 36, in Step 350, customer identifying information and application information are acquired by the warning determination section 44A, and then the processing proceeds to Step 352. In Step 352, the warning determination section 44A acquires customer characteristic data.

In the next step 354, the warning determination section 44A refers to the customer characteristic data acquired in Step 352 based on the customer identifying information and the application information that are acquired in Step 350. Determined is made as to whether or not the level of visibility of a line defect image is a level that requires a warning based on the result of the referring. For example, in Step 354 the warning determination section 44A determines whether or not the level of visibility expressed by the visibility level data included in the evaluation result data is a level that requires a warning by referring to the customer characteristic data corresponding to the customer identifying information and the application information. If it is determined in Step 352 that the level of visibility is a level that does not require a warning, the warning processing is ended. If it is determined in Step 352 that the level of visibility is a level that requires a warning, the processing proceeds to Step 206D and a warning is performed. Then, the warning processing is ended.

The foregoing description of the exemplary embodiments has been provided for the purpose of illustration and description. It is not intended to be exhaustive or to limit the invention to the precise form disclosed herein. Obviously, many modifications and variations will be apparent to a practitioner skilled in the art. The exemplary embodiments have been chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents.

What is claimed is:

1. An image evaluation device comprising:
a storage unit that stores sample image data that represent a virtual sample image simulating a sample image included in a sample printout that is recognized as a non-defective printout;
a reading unit that reads an inspection object image included in an inspection object printout obtained by printing an image corresponding to the sample image on a recording medium by a printing device using image data representing the image;
an extraction unit that extracts a line defect including a linear pattern formed in a specific direction from the inspection object image represented by inspection object image data, based on a difference value between the sample image data and the inspection object image data; and
an evaluation unit that evaluates a visibility of the line defect extracted by the extraction unit,
wherein the reading unit reads the inspection object image with a resolution of the inspection object image in the specific direction that is lower than a resolution of the inspection object image in a direction crossing the specific direction, and
wherein the extraction unit extracts the line defect from the inspection object image after adjusting the resolution in the specific direction of the inspection object image represented by the inspection object image data to be the same as the resolution in the direction crossing the specific direction.

2. The image evaluation device according to claim 1, wherein at least one of an influence of characteristics of the reading unit or an influence of non-formation factor characteristics is eliminated from the sample image data and the inspection object image data, and
wherein the non-formation factor characteristics are characteristics of the printing device that are not factors of formation of the line defect.

3. The image evaluation device according to claim 2, wherein the characteristics of the reading unit include time degradation characteristics of components of the reading unit, and/or the non-formation factor characteristics include time degradation characteristics of components of the printing device.

4. The image evaluation device according to claim 1, wherein an influence of at least one of characteristics of the printing device or characteristics of the reading unit is reflected in the sample image data.

5. The image evaluation device according to claim 4, wherein the characteristics of the printing device include time degradation characteristics of components of the printing device, and/or the characteristics of the reading unit include time degradation characteristics of components of the reading unit.

6. The image evaluation device according to claim 1, wherein the line defect comprises at least one of a line defect of which spatial frequencies of human visual characteristics are considered, or a line defect of which a color space of the human visual characteristics is considered.

7. The image evaluation device according to claim 1, wherein the extraction unit extracts the line defect from a predetermined region of the inspection object image that is represented by the inspection object image data.

8. The image evaluation device according to claim 7, wherein the predetermined region comprises an expected region in which the line defect is expected to be formed.

9. The image evaluation device according to claim 8, wherein the predetermined region corresponds to a region of the inspection object image in which a difference value between the inspection object image data and the sample image data exceeds a threshold.

10. The image evaluation device according to claim 8, wherein the expected region is determined based on characteristics of at least one of the printing device or the reading unit.

11. The image evaluation device according to claim 10, wherein the characteristics of the printing device include time degradation characteristics of components of the printing device, and/or the characteristics of the reading unit include time degradation characteristics of components of the reading unit.

12. The image evaluation device according to claim 1, wherein the specific direction comprises a conveying direction of the recording medium in the printing device.

13. The image evaluation device according to claim 12, wherein a printing method of the printing device comprises a single-pass method.

14. The image evaluation device according to claim 1, wherein the printing device performs printing by dividing the inspection object image into a plurality of lines and recording each of the plurality of lines on the recording medium, and the specific direction comprises a main scanning direction of the printing device.

15. The image evaluation device according to claim 14, wherein a printing method of the printing device comprises a shuttle-scan method.

16. The image evaluation device according to claim 1, wherein the evaluation unit evaluates the visibility of the line defect using a statistical method.

17. The image evaluation device according to claim 16, wherein the evaluation using the statistical method is based on evaluation results obtained by performing in advance visual observations of a plurality of evaluation object images corresponding to the inspection object image and respectively including different line defects, by at least one tester and evaluating the level of the visibility of the line defect for each of the plurality of evaluation object images.

18. The image evaluation device according to claim 1, wherein the evaluation unit evaluates the visibility of the line defect using a mask effect-visual model.

19. The image evaluation device according to claim 18, wherein the evaluation unit combines the line defect extracted by the extraction unit, with the virtual sample image represented by the sample image data, and evaluates the visibility of the line defect based on a combined image obtained by the combination and the virtual sample image using the mask effect-visual model.

20. An image evaluation device comprising:
a storage unit that stores sample image data that represent a virtual sample image simulating a sample image included in a sample printout that is recognized as a non-defective printout;
a reading unit that reads an inspection object image included in an inspection object printout obtained by printing an image corresponding to the sample image on a recording medium by a printing device using image data representing the image;
an extraction unit that extracts a line defect including a linear pattern formed in a specific direction from the inspection object image represented by inspection object image data, based on a difference value between the sample image data and the inspection object image data; and
an evaluation unit that evaluates a visibility of the line defect extracted by the extraction unit,
wherein the evaluation unit evaluates the visibility of the line defect using a mask effect-visual model,
wherein the evaluation unit combines the line defect extracted by the extraction unit, with the virtual sample image represented by the sample image data, and evaluates the visibility of the line defect based on a combined image obtained by the combination and the virtual sample image using the mask effect-visual model, and
wherein the evaluation unit evaluates the visibility of the line defect using the mask effect-visual model based on decomposed images that are obtained by respectively decomposing the combined image and the virtual sample image into at least one of a plurality of spatial frequency components or a plurality of directional components.

21. The image evaluation device according to claim 20, wherein the evaluation unit evaluates the visibility of the line defect using a mask effect-visual model in the specific direction based on the decomposed images.

22. The image evaluation device according to claim 1, further comprising a warning unit that performs warning if the evaluation unit determines that the line defect comprises a visible line defect.

23. The image evaluation device according to claim 22, wherein the warning unit performs the warning by directly processing the inspection object printout that includes the line defect determined to be a visible line defect.

24. The image evaluation device according to claim 23, wherein the warning unit performs the warning by applying on the inspection object printout an identification aiding mark that facilitates identification of a position of the line defect in the inspection object printout.

25. The image evaluation device according to claim 24, wherein the warning unit performs the warning by applying the identification aiding mark at a position on an extended line of the line defect of the inspection object printout in the specific direction.

26. The image evaluation device according to claim 24, wherein a type of the identification aiding mark is determined according to the level of the visibility of the line defect.

27. The image evaluation device according to claim 22, wherein the warning unit performs the warning by causing a display unit to display predetermined information if the line defect is determined to be a visible line defect by the evaluation unit.

28. The image evaluation device according to claim 27, wherein the predetermined information includes identification information that identifies the inspection object printout including the line defect that is determined to be a visible line defect.

29. The image evaluation device according to claim 28, wherein the predetermined information includes the inspection object image that includes the line defect and an identification aiding image that facilitates identification of a position of the line defect in the inspection object image.

30. An image evaluation device comprising:
a storage unit that stores sample image data that represent a virtual sample image simulating a sample image included in a sample printout that is recognized as a non-defective printout;
a reading unit that reads an inspection object image included in an inspection object printout obtained by printing an image corresponding to the sample image on a recording medium by a printing device using image data representing the image;
an extraction unit that extracts a line defect including a linear pattern formed in a specific direction from the inspection object image represented by inspection object image data, based on a difference value between the sample image data and the inspection object image data; and
an evaluation unit that evaluates a visibility of the line defect extracted by the extraction unit,
wherein the evaluation unit evaluates the visibility of the line defect using a statistical method,
wherein the evaluation using the statistical method is based on evaluation results obtained by performing in advance visual observations of a plurality of evaluation object images corresponding to the inspection object image and respectively including different line defects, by at least one tester and evaluating the level of the visibility of the line defect for each of the plurality of evaluation object images, and
wherein the evaluation using the statistical method is based on a multiple regression equation determined according to the evaluation results.

31. An image evaluation method comprising:
storing sample image data that represents a virtual sample image simulating a sample image included in a sample printout that is recognized as a non-defective printout;
acquiring inspection object image data by reading an inspection object image included in an inspection object printout that is obtained by printing an image corresponding to the sample image on a recording medium by a printing device using image data representing the image;
extracting a line defect including a linear pattern formed in a specific direction, from the inspection object image represented by the inspection object image data, based on a difference value between the sample image data and the inspection object image data; and
evaluating a visibility of the extracted line defect,
wherein the acquiring inspection object image data by reading an inspection object image further reads the inspection object image with a resolution of the inspection object image in the specific direction that is lower than a resolution of the inspection object image in a direction crossing the specific direction, and
wherein the extracting further extracts the line defect from the inspection object image after adjusting the resolution in the specific direction of the inspection object image represented by the inspection object image data to be the same as the resolution in the direction crossing the specific direction.

32. A non-transitory computer-readable storage medium storing a program that causes a computer to execute image evaluation processing, the image evaluation processing comprising:

storing sample image data that represents a virtual sample image simulating a sample image included in a sample printout that is recognized as a non-defective printout;

acquiring inspection object image data by reading an inspection object image included in an inspection object printout that is obtained by printing an image corresponding to the sample image on a recording medium by a printing device using image data representing the image;

extracting a line defect including a linear pattern formed in a specific direction, from the inspection object image represented by the inspection object image data, based on a difference value between the sample image data and the inspection object image data; and evaluating a visibility of the extracted line defect, wherein the acquiring inspection object image data by reading an inspection object image further reads the inspection object image with a resolution of the inspection object image in the specific direction that is lower than a resolution of the inspection object image in a direction crossing the specific direction, and wherein the extracting further extracts the line defect from the inspection object image after adjusting the resolution in the specific direction of the inspection object image represented by the inspection object image data to be the same as the resolution in the direction crossing the specific direction.

\* \* \* \* \*